(12) United States Patent
Fujita et al.

(10) Patent No.: US 6,768,519 B2
(45) Date of Patent: Jul. 27, 2004

(54) REPRODUCIBLE MATRIX SWITCH SETTINGS OF A VIDEO SIGNAL PROCESSING APPARATUS

(75) Inventors: Shinichi Fujita, Kanagawa (JP); Sensaburo Nakamura, Kanagawa (JP); Norimasa Ozaki, Kanagawa (JP); Ryosuke Hayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 433 days.

(21) Appl. No.: 09/770,964

(22) Filed: Jan. 26, 2001

(65) Prior Publication Data

US 2001/0024240 A1 Sep. 27, 2001

(30) Foreign Application Priority Data

Jan. 27, 2000 (JP) ........................................ 2000-018818

(51) Int. Cl.[7] .............................................. H04N 5/268
(52) U.S. Cl. ...................................... 348/705; 348/722
(58) Field of Search ................................ 348/705, 722, 348/706, 522; 370/357

(56) References Cited

U.S. PATENT DOCUMENTS

| | | | | |
|---|---|---|---|---|
| 4,205,344 A | * | 5/1980 | Rayner ........................ 358/160 |
| 4,573,152 A | * | 2/1986 | Greene et al. ................. 371/22 |
| 5,197,140 A | * | 3/1993 | Balmer ........................ 395/400 |
| 5,231,512 A | * | 7/1993 | Ebihara et al. ............. 358/335 |
| 5,515,512 A | * | 5/1996 | Yamamoto ............. 395/200.03 |
| 5,550,825 A | * | 8/1996 | McMullan, Jr. et al. ...... 370/73 |
| 5,933,449 A | * | 8/1999 | Meyer ........................ 375/219 |
| 6,437,831 B1 | * | 8/2002 | Windrem .................... 348/578 |
| 6,526,048 B1 | * | 2/2003 | Francis et al. .............. 370/380 |
| 2002/0056358 A1 | * | 5/2002 | Ludwig ....................... 84/738 |

* cited by examiner

Primary Examiner—Victor R. Kostak
(74) Attorney, Agent, or Firm—Frommer Lawrence & Haug LLP; William S. Frommer

(57) ABSTRACT

A video signal processing apparatus enabling reuse by a previously used internal configuration, provided with a storage device for storing the states of all or part of the intersections of a matrix switch to the output side of which inputs of video signal processing units and video signal output channels are connected and an intersection reproducing device for setting intersections of the matrix switch in accordance with the content of the storage device. When using current settings of the matrix switch, the current settings are stored in the storage device. When it is desired to reuse the apparatus after using it in different settings, the intersection reproducing device is activated. Therefore, an operator no longer has to repeat an operation for setting each and every intersection and can obtain the desired settings by activating the intersection reproducing device.

22 Claims, 67 Drawing Sheets

----- PATHS CONNECTED BY MATRIX SWITCH

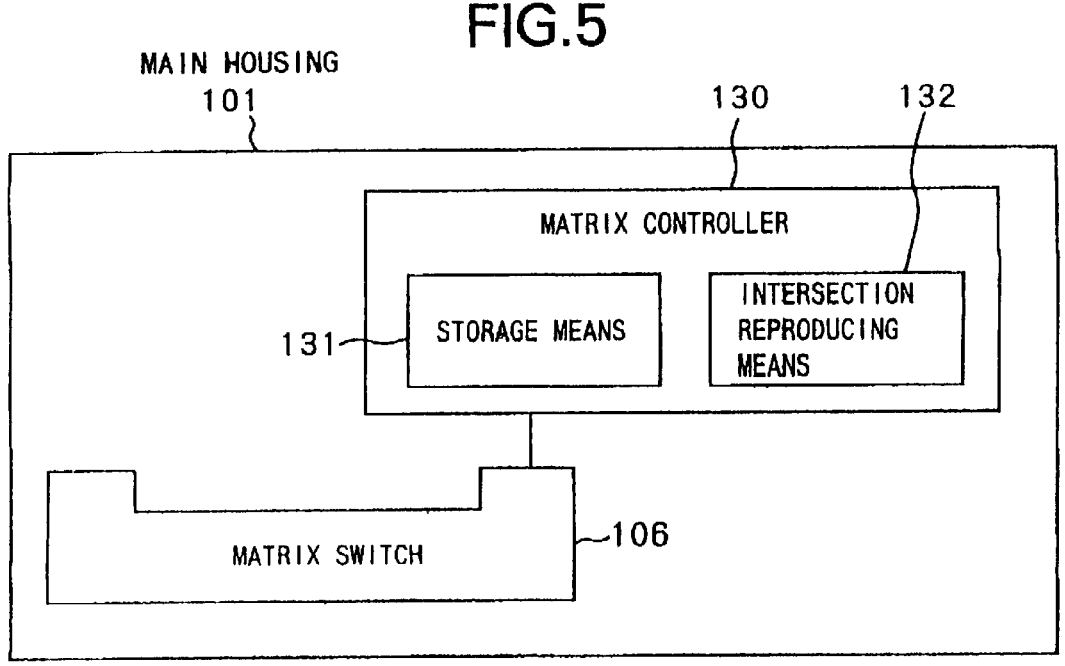
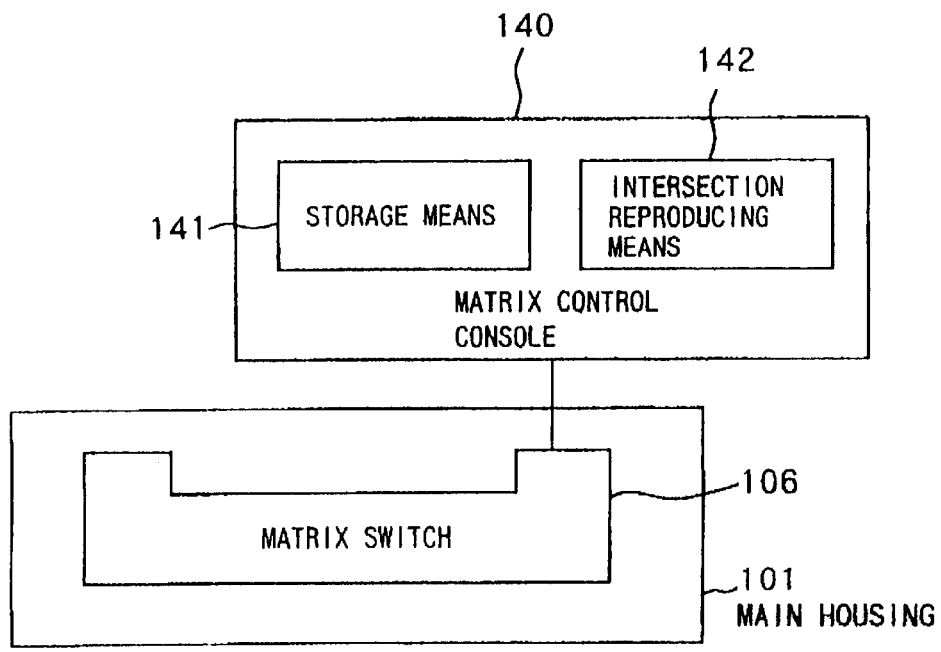

FIG.9
START
↓
INPUT SPECIFICATION OF OBJECT OUTPUT BUSES (LINES), STORAGE NUMBERS, AND STORAGE INSTRUCTIONS — S21
↓
READ STATES (SETTING) OF INTERSECTIONS OF OBJECT OUTPUT BUSES FROM MATRIX SWITCH — S22
↓
STORE STORAGE NUMBERS IN STORAGE MEANS AS INDEXES — S23
↓
END
FIG.10A
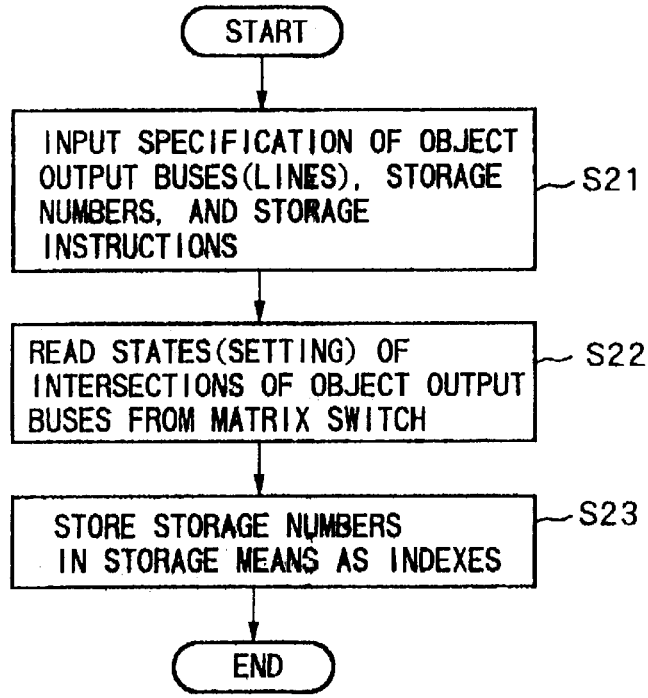
| CORRESPONDENCE | |
|---|---|
| MATRIX OUTPUT | MATRIX INPUT |
| d0 | s4 |
| d1 | s5 |
| d2 | s6 |
| d3 | s6 |
| d4 | s0 |
| d5 | s1 |
| d6 | s2 |
| d7 | s2 |
| d8 | s3 |
| d9 | none |
FIG.10B
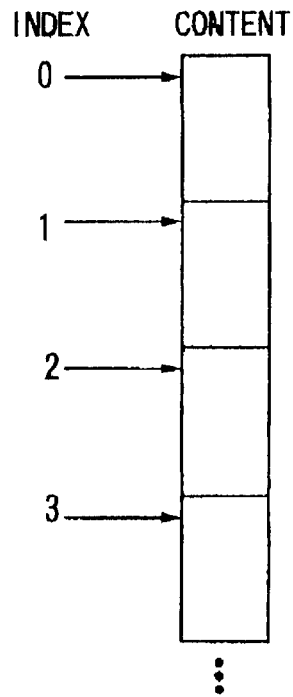
INDEX    CONTENT
0
1
2
3
⋮

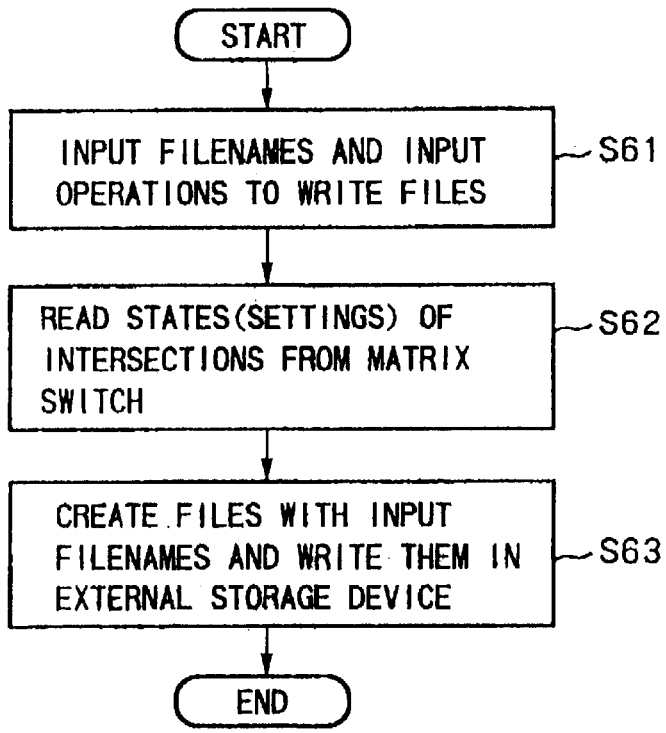
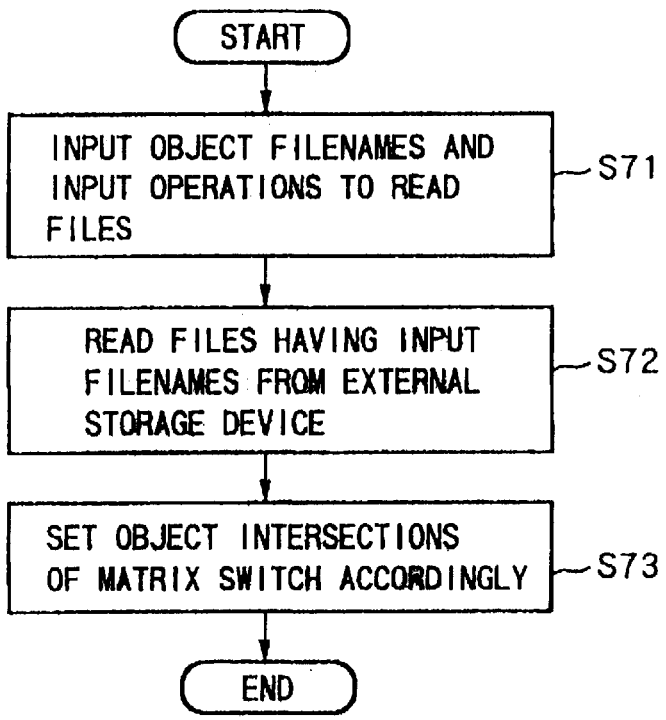

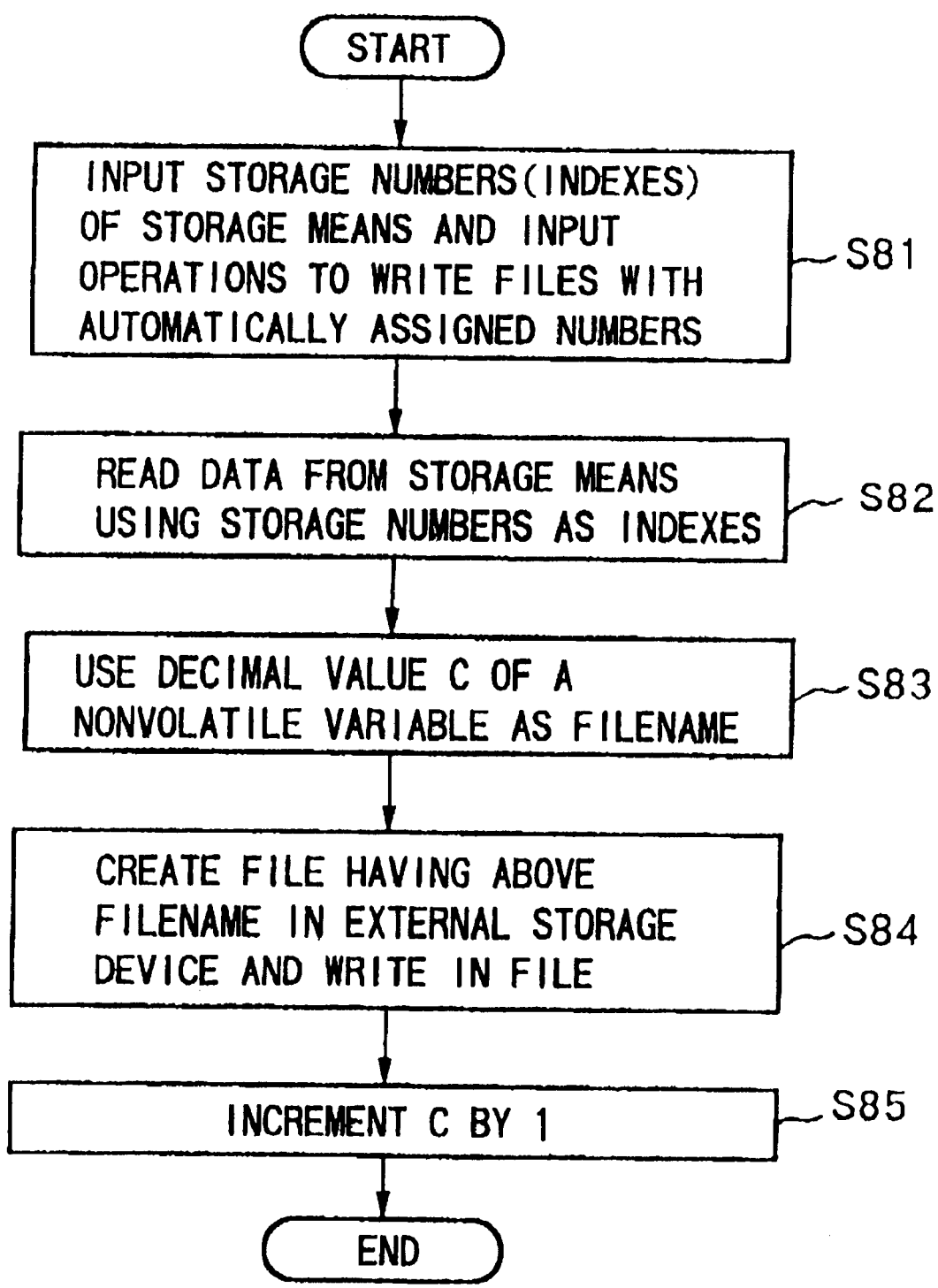

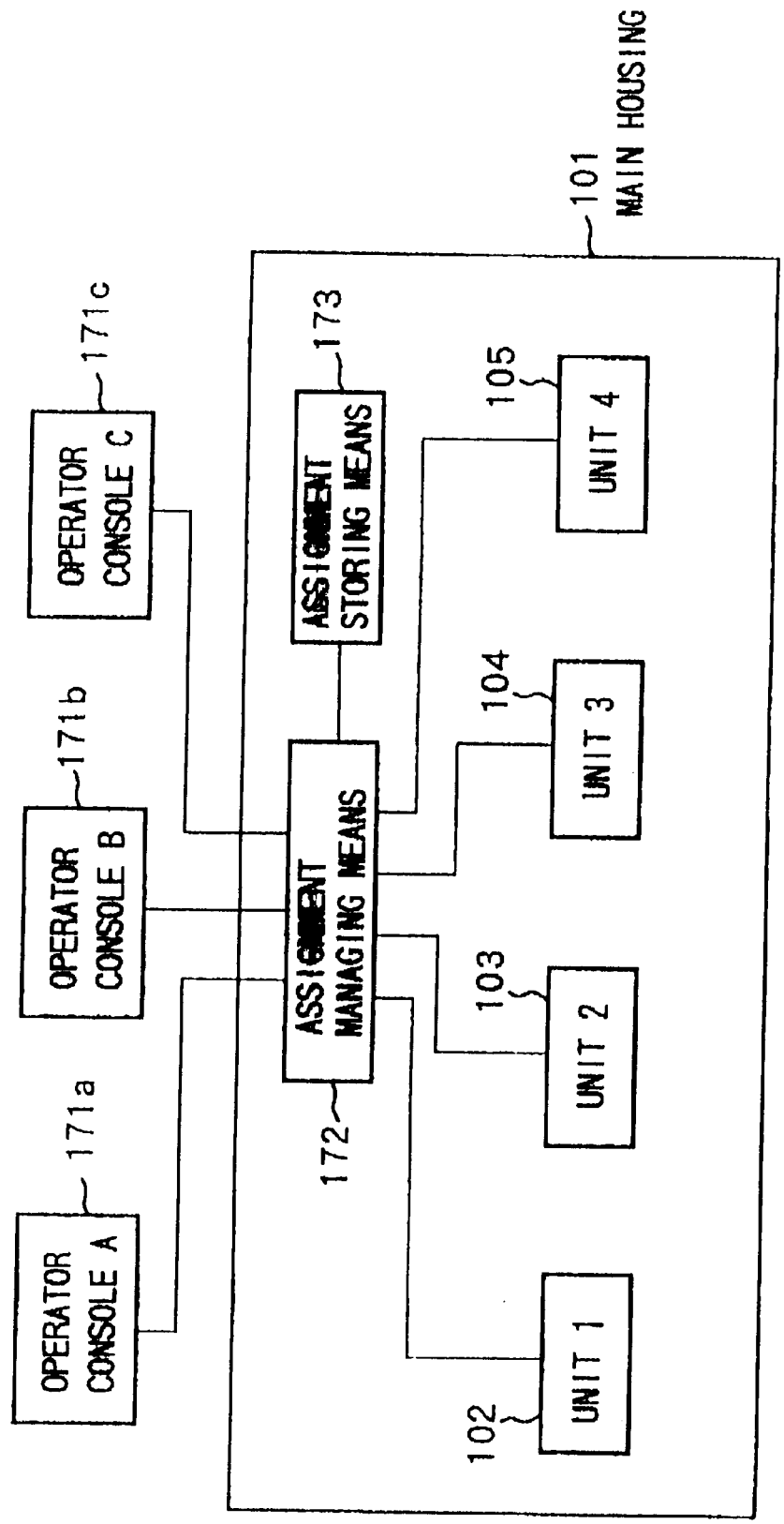

| UNIT | OPERATOR CONSOLE |
|---|---|
| 1 | A |
| 2 | A |
| 3 | B |
| 4 | C |

| UNIT | OPERATOR CONSOLE |
|---|---|
| 1 | A, B |
| 2 | A, B |
| 3 | B |
| 4 | C |

| OUTPUT CHANNEL | UNIT 1 | UNIT 2 | UNIT 3 | UNIT 4 |
|---|---|---|---|---|
| 1 | 1 | N | N | N |
| 2 | N | 1 | N | N |
| 3 | N | N | 1 | N |
| 4 | N | N | 1 | N |

FIG.36

| OUTPUT CHANNEL | OPERATOR CONSOLE |
|---|---|
| 1 | A |
| 2 | B |
| 3 | C |
| 4 | C |

FIG.37

| OUTPUT CHANNEL | OPERATOR CONSOLE |
|---|---|
| 1 | A, B |
| 2 | A, B |
| 3 | C |
| 4 | C |

FIG.43

| OUTPUT CHANNEL | UNIT 1 | UNIT 2 | UNIT 3 | UNIT 4 |
|---|---|---|---|---|
| 1 | 1 | N | 2 | N |
| 2 | N | 1 | N | N |
| 3 | N | 1 | N | N |
| 4 | N | 1 | N | N |

FIG.44

| OUTPUT CHANNEL | OPERATOR CONSOLE | UNIT 1 | UNIT 2 | UNIT 3 | UNIT 4 |
|---|---|---|---|---|---|
| 1 | A , B | A | N | B | N |
| 2 | C | N | C | N | N |
| 3 | C | N | C | N | N |
| 4 | C | N | C | N | N |

| UNIT | FUNCTION | OPERATOR CONSOLE |
|---|---|---|
| 1 | 1 | A |
| 1 | 2 | B |
| 2 | 1 | A |
| 2 | 2 | B |
| 2 | 3 | B |
| 3 | 1 | C |

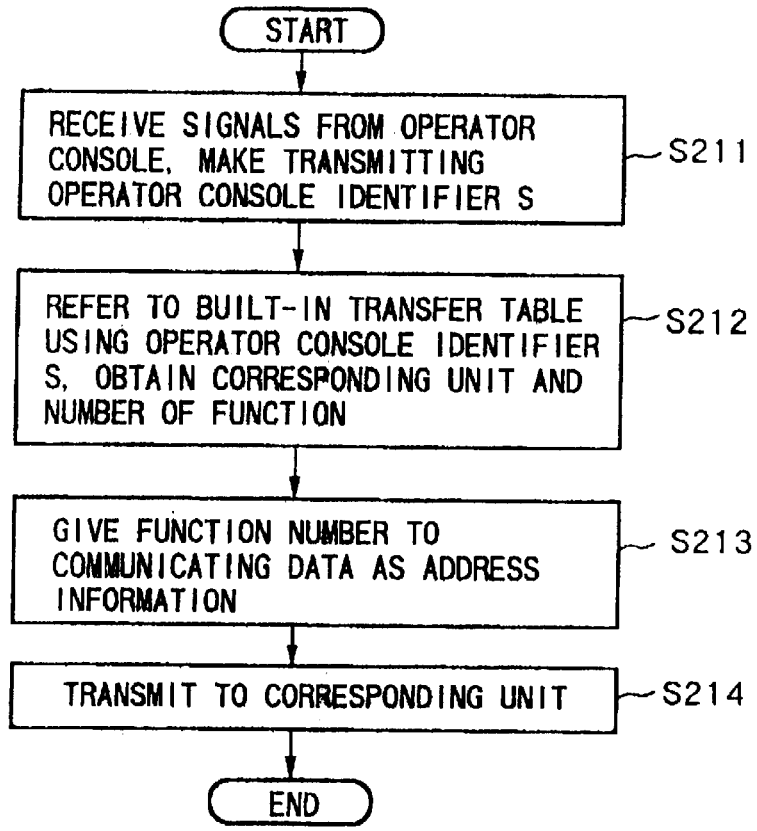
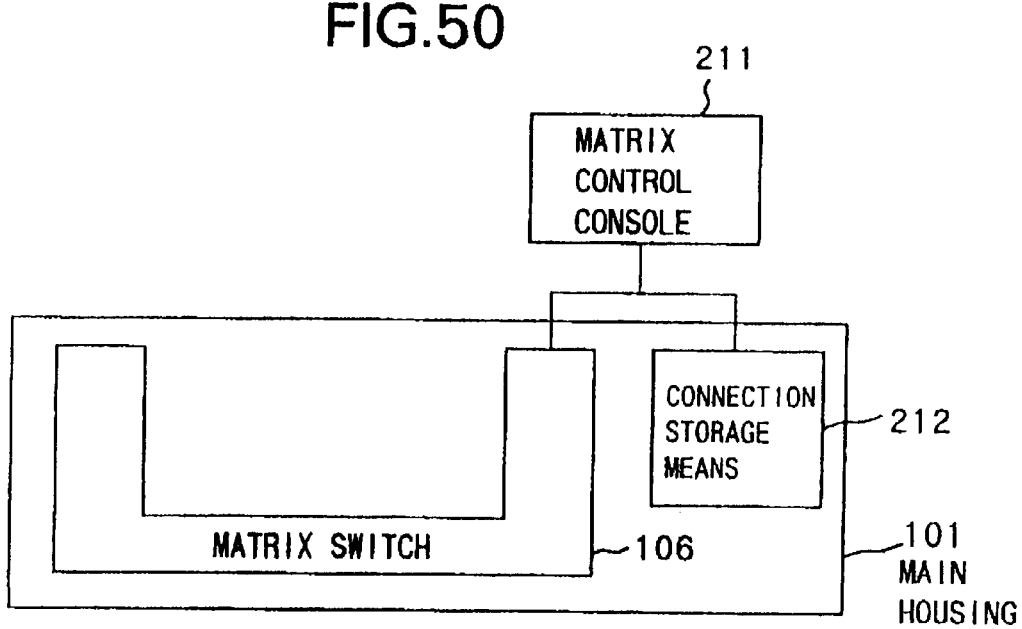

FIG.51A

| INPUT | DESTINATION OF CONNECTION |
|---|---|
| s0 | INPUT CHANNEL 1 |
| s1 | INPUT CHANNEL 2 |
| s2 | INPUT CHANNEL 3 |
| s3 | INPUT CHANNEL 4 |
| s4 | OUTPUT 1 OF UNIT 1 |
| s5 | OUTPUT 1 OF UNIT 2 |
| s6 | OUTPUT 1 OF UNIT 3 |
| s7 | OUTPUT 1 OF UNIT 4 |
| s8 | OUTPUT 2 OF UNIT 4 |
| s9 | NONE |

FIG.51B

| OUTPUT | DESTINATION OF CONNECTION |
|---|---|
| d0 | OUTPUT CHANNEL 1 |
| d1 | OUTPUT CHANNEL 2 |
| d2 | OUTPUT CHANNEL 3 |
| d3 | OUTPUT CHANNEL 4 |
| d4 | INPUT 1 OF UNIT 1 |
| d5 | INPUT 2 OF UNIT 1 |
| d6 | INPUT 1 OF UNIT 2 |
| d7 | INPUT 1 OF UNIT 3 |
| d8 | INPUT 2 OF UNIT 3 |
| d9 | INPUT 1 OF UNIT 4 |

FIG.52A

INPUT SCREEN FOR PATH CONSTRUCTION

SELECT ONE TO CONNECT TO OUTPUT CHANNEL 1

213 — ○ INPUT CHANNL1   ◉ OUTPUT 1 OF UNIT 1
       ○ INPUT CHANNL2   ○ OUTPUT 1 OF UNIT 2
       ○ INPUT CHANNL3   ○ OUTPUT 1 OF UNIT 3
       ○ INPUT CHANNL4   ○ OUTPUT 1 OF UNIT 4
                         ○ OUTPUT 2 OF UNIT 4

[CANCEL]   [CONTINUE]

INPUT SCREEN FOR PATH CONSTRUCTION

SELECT ONE TO CONNECT TO INPUT CHANNEL 2 OF UNIT 3

○ INPUT CHANNL1   ○ OUTPUT 1 OF UNIT 1
○ INPUT CHANNL2   ○ OUTPUT 1 OF UNIT 2
○ INPUT CHANNL3   ○ OUTPUT 1 OF UNIT 2
◉ INPUT CHANNL4   ○ OUTPUT 1 OF UNIT 4
                  ○ OUTPUT 2 OF UNIT 4

[CANCEL]   [CONTINUE]

| CURRENT CORRESPONDENCE | |
|---|---|
| MATRIX OUTPUT | MATRIX INPUT |
| d0 | s4 |
| d1 | s5 |
| d2 | s6 |
| d3 | s6 |
| d4 | s0 |
| d5 | s1 |
| d6 | s2 |
| d7 | s2 |
| d8 | s3 |
| d9 | none |

FIG.72

| UNIT | OPERATOR CONSOLE NETWORK ID |
|---|---|
| 1 | pan1.net0 |
| 2 | pan1.net0 |
| 3 | pan2.net0 |
| 4 | pan3.net0 |

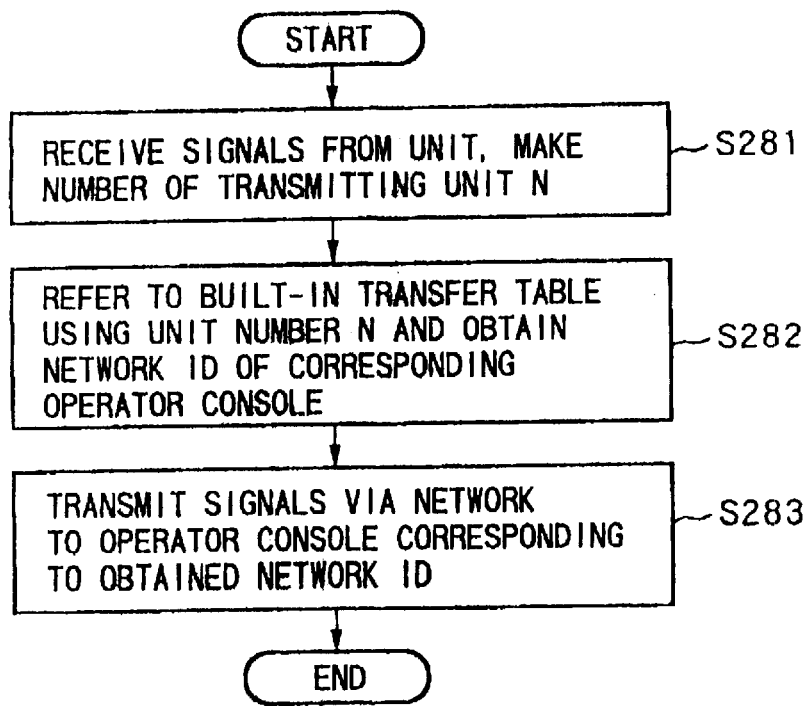
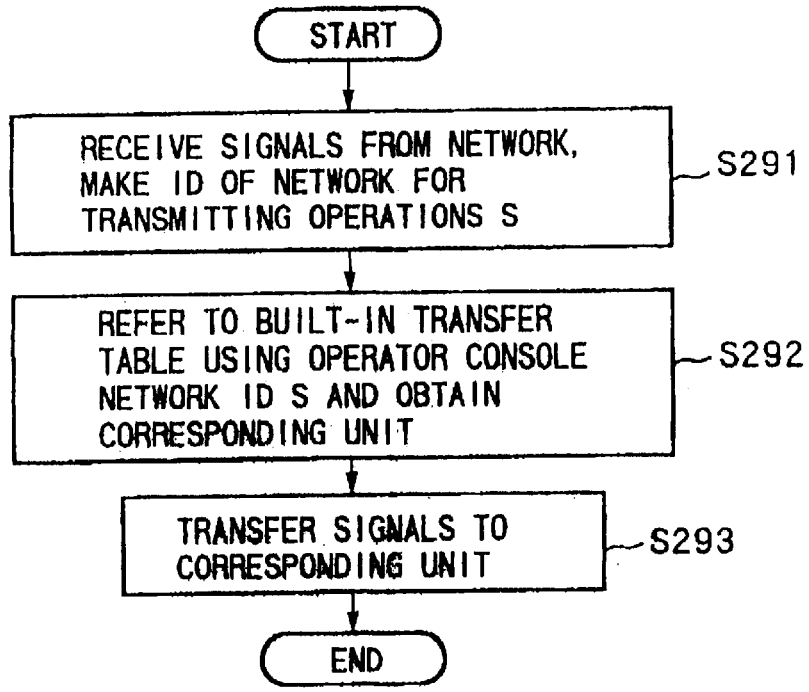

| UNIT | OPERATOR CONSOLE |
|---|---|
| 1 | A |
| 2 | A |
| 3 | B |
| 4 | C |

| SOURCE | | DESTINATION | |
|---|---|---|---|
| APPARATUS NO. | OUTPUT CHANNEL | APPARATUS NO. | INPUT CHANNEL |
| 1 | 1 | 2 | 3 |
| 1 | 2 | 2 | 4 |
| 1 | 3 | 3 | 3 |
| 1 | 4 | 3 | 4 |
| 2 | 3 | 3 | 1 |
| 2 | 4 | 3 | 2 |

| INTPUT | DISPLAYED CHARACTERS |
|---|---|
| 1 | "IN_3" |
| 2 | "IN_4" |
| 3 | "IN_5" |
| 4 | "Unit1_1" |
| 5 | "Unit1_2" |
| 6 | "Unit1_3" |
| 7 | "NONE" |

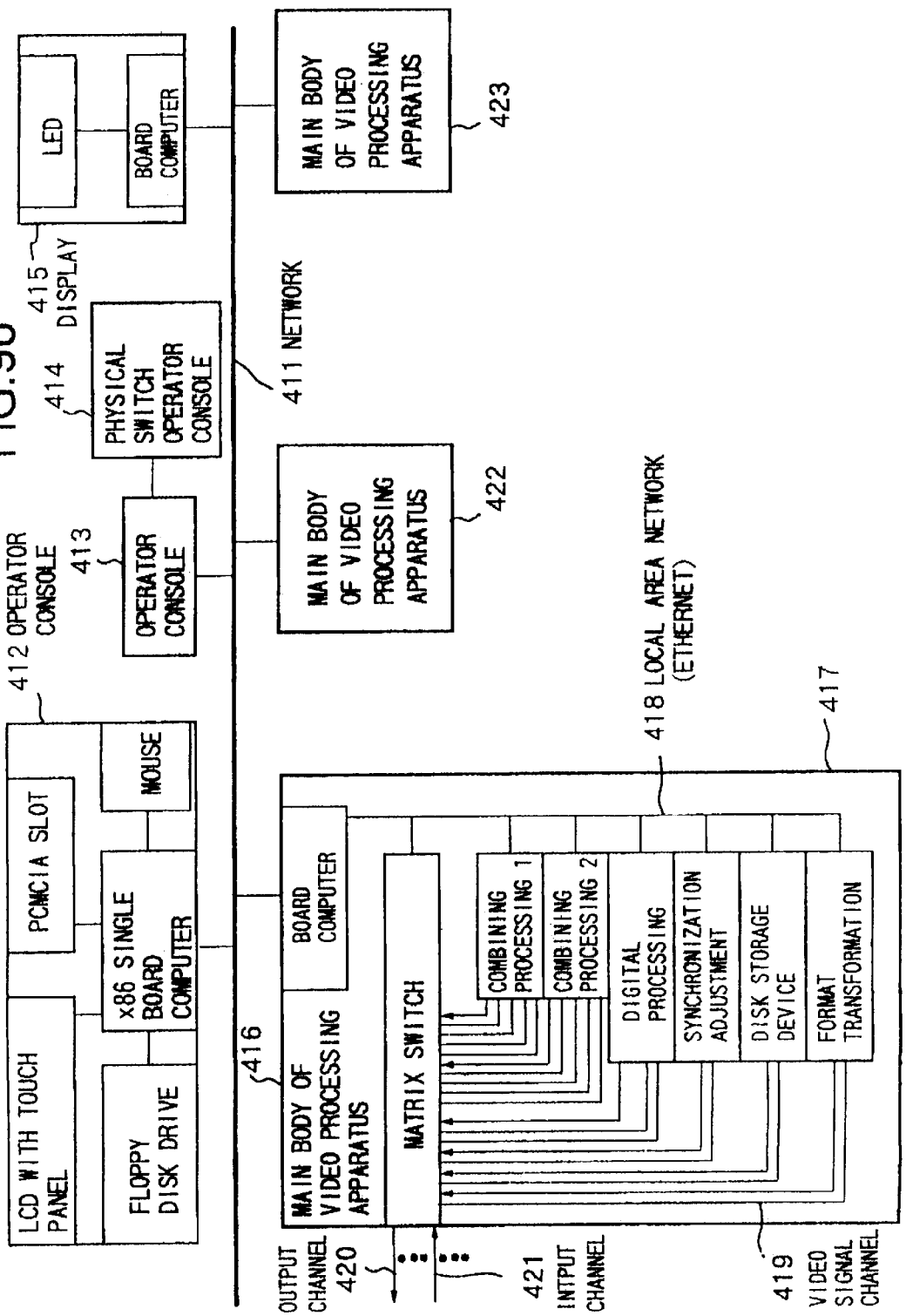

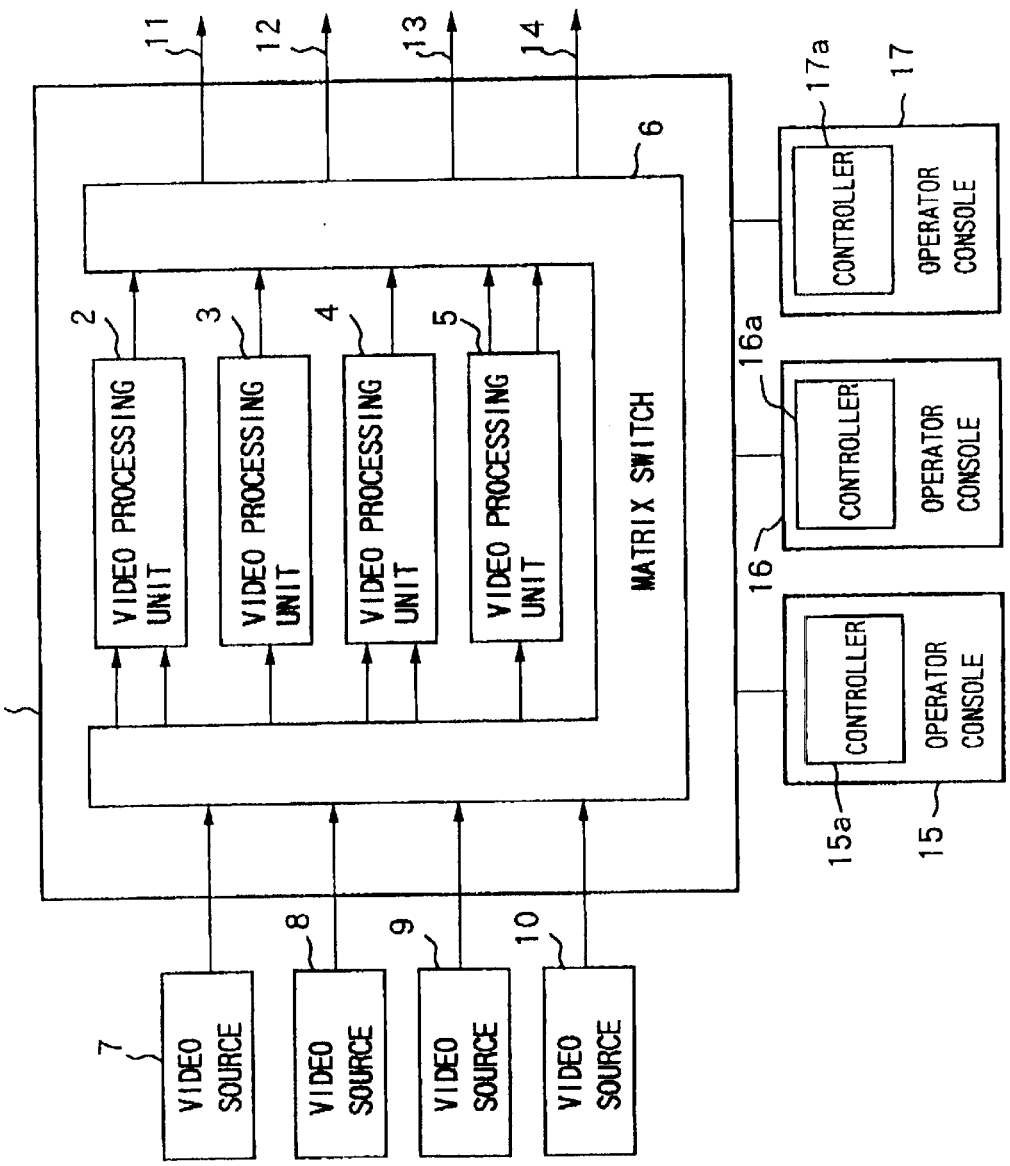

REPRODUCIBLE MATRIX SWITCH SETTINGS OF A VIDEO SIGNAL PROCESSING APPARATUS

BACKGROUND OF THE INVENTION

1. Field of the Invention

The present invention relates to a video signal processing apparatus, more particularly relates to a video signal processing apparatus arranged in a studio between a source of a video signal such as a camera or video tape recorder and a final output for switching, combining, and giving specific effects to the video.

2. Description of the Related Art

The video signal processing apparatus covered by this invention is arranged between a source of a video signal and the final output for switching, combining, giving specific effects, adjusting synchronization, correcting, converting, storing, etc. the video.

The sources of a video signal include cameras, video tape recorders, disk drives, video transmitted from remote locations, text and images generated by computer, and so on. The destinations of the final outputs of a video include broadcasting facilities, video tape recorders, etc.

Because such video signal processing apparatuses are used for diverse purposes, it is common for the signal source, final output, and operator to change for each application.

For example, even when a video signal processing apparatus is set fixed in a studio, the number of cameras, the types of the special effects being utilized, and the text generated by the computer change with each program being produced.

In addition, a number of such video signal processing apparatuses may be shared among several studios. For example, at a certain point of time, videos from cameras covering different persons in a studio A and studio B will be input into one video signal processing apparatus, processed, and broadcast as one program. At another point of time, the studio A and studio B will be used for making different programs which will be recorded by different video tape recorders.

Alternatively, a video signal processing apparatus may also be provided inside a mobile unit. In this case, depending on what is being relayed, the number of inputs and the number of video tape recorders for temporary storage will change and it will be necessary to flexibly handle various situations such as simultaneously relaying signals and recording on video tape recorders for temporary storage.

As a technique for flexibly dealing with such changes in configurations, for example, there is the television contribution signal generating apparatus disclosed in Japanese Unexamined Patent Publication (Kokai) No. 10-65965.

FIG. 97 is a schematic view of the configuration of a video signal processing apparatus of the related art.

This figure shows at the center a video signal processing apparatus 1. The video signal processing apparatus 1 is provided with video signal processing units 2, 3, 4, and 5 comprised of video effect units, text generating units, disk drives, or storage units using individual storage elements. These are the main components of the video signal processing apparatus 1. The video signal processing apparatus 1 also includes a matrix switch 6. The matrix switch 6 is also a component of the video signal processing apparatus 6. The matrix switch receives the inputs to the video signal processing apparatus and the outputs from the video signal processing units 2, 3, 4, and 5 and supplies the inputs to the video signal processing units 2, 3, 4, and 5 and the outputs from the video signal processing apparatus 1. As the inputs of the matrix switch 6, video sources 7, 8, 9, 10 are connected. The video sources 7, 8, 9, 10 can be cameras or video tape recorders and output the stock video signals. The outputs of the matrix switch 6 form the output channels 11, 12, 13, and 14. These may be outputs for broadcasting, monitoring, etc. The video signal processing apparatus 1 is also connected to operator consoles 15, 16, and 17, which comprise operator control panels 15a, 16a, and 17a, respectively, which display graphical user interfaces. The operator consoles 15, 16, and 17 are assigned for control of the video signal processing units 2, 3, 4, and 5.

In the above related art, in order to facilitate change of the configuration of the video signal processing apparatus 1, a number of the video signal processing units 2, 3, 4, and 5 which independently perform various kinds of video processing are mounted in a single housing and the inputs and outputs of the video signal processing units 2, 3, 4, 5 and the apparatus (housing) are connected to the matrix switch 6. The matrix switch 6 is controlled to connect the video signal processing units 2, 3, 4, and 5 to the input and output of the apparatus as desired or to connect the output of a certain video signal processing unit to the input of another video signal processing unit.

In order to eliminate the need for manual operation of the intersections of the matrix switch 6, the matrix switch 6 able to be controlled by control software.

The video signal processing units 2, 3, 4, and 5 could also be treated as physically independent units and be connected to the matrix switch 6 directly or via channels provided in the housing by slot connection (using insertion terminals, contacts, and connectors).

In addition, operator consoles 15, 16, and 17 including freely configurable operator control panels 15a, 16a, and 17a were provided. The operator control panels 15a, 16a and 17a could be assigned to specific video signal processing units or groups of video signal processing unit group for control.

Note that a "freely configurable operator control panel" means a graphical user interface like display and operator control screen used as opposed to physical switches.

Summarizing the problems to be solved by the invention, in the related art, various configurations were realized in a video signal processing apparatus by controlling the matrix switch. Such video signal processing apparatuses are often repeatedly used for several applications. For example, a video signal processing apparatus used for a program A and program B may be used for the program A on one day, for the program B on the next day, for the program A on the day after that, for a program C on the day after that, and for the program A on the day after that. In the related art, each time the application changed, it was necessary to change the states (on/off) of a number of intersections of the matrix switch in accordance with the new application. Therefore, a large number of setting operations were needed when an application changed and thus a problem of efficiency arose.

Further, the operator consoles or the operator control panels thereof were usually assigned to specific video signal processing units or groups of video signal processing units for each application of the video signal processing apparatus, however, the video signal processing apparatus was often used for the same application many times. In the related art, each time the application changed, it was necessary to reassign the operator consoles, and thus the efficiency was poor.

Further, at the place of use of the video signal processing apparatus, in many cases the video signal processing units are used to produce output video. Accordingly, one operator console is used for controlling the video of a specific output channel. In the related art, there was no correlation between the internal configuration of the video signal processing apparatus by the matrix switch and the assignment of the operator consoles to the video signal processing units. These were independent in control. However, considering the convenience of operation, an operator console should be assigned charge of operations related to a specific output channel. The fact that the matrix switch is set independent of the assignment of the operator consoles was a problem in terms of the efficiency of the setting operations. Namely, it was necessary to consider the assignment of the operator consoles to match with the settings of the matrix switch.

Further, different video signal processing units have different functions. Accordingly, the types and numbers of the input devices of the operator consoles required for a control operation are different. Therefore, it is desirable that operator consoles have different sizes and configurations according to the corresponding (assigned) video signal processing units. However, in the related art, operator consoles of a fixed size were assigned one at a time to the video signal processing units. Even when there were many types of complicated operations for functions associated with a certain output channel of the video signal processing apparatus, it was difficult to suitably divide those operations other than by video signal processing units and assign them to several operator consoles.

Further, in controlling the ON/OFF states of intersections of a matrix switch, it is necessary to select and turn on suitable intersections from a large number of intersections of input lines and output lines. In a video signal processing apparatus of the related art, it was necessary to first obtain a grasp of the inputs and outputs of the video signal processing units and inputs and outputs of the apparatus connected to the matrix switch, then devise connections for processing at the video signal processing units necessary for producing the desired outputs, and select suitable intersections for control. Directly designating and operating intersections in the above manner was troublesome and correct connection difficult.

Further, depending on the settings of the intersections of the matrix switch, sometimes the paths of the video signals formed were unsuitable. For example, sometimes an output of a line not connected to any input is connected to a video signal processing unit. Alternatively, sometimes only an output of a video signal processing unit requiring input is connected to the matrix switch. In addition, there may be states of intersections causing problems and conflicts in paths. Such paths are caused by mistakes in setting the intersections, but in the related art, these mistakes could not be found until the apparatus was actually operated. This prevented quick setting of the video signal processing apparatus and in some cases could damage the video signal processing units etc.

Further, in a video signal processing apparatus of the related art, changing the settings of the matrix switch was a serious matter affecting all functions of the apparatus. If inadvertently changing the settings of the matrix switch during operation or if someone other than the operator of the apparatus changes the settings while in the standby state before operation, the apparatus cannot be operated as intended. This becomes a serious problem.

Further, in the related art, the states of the intersections of the matrix switch were changed manually or by software control. However, when manually changing the intersections, it is necessary to provide a group of manual switches exclusively for the matrix switch and therefore the operational efficiency becomes poor. Further, when using software control, while the trouble involved in operating each intersection is eliminated, it is necessary to give instructions to the control software when making changes, hence a means was required for this. Namely, an input device exclusively for the control software had to be provided separate from the original configuration of the video signal processing apparatus. Thus, there was the demerit that the configuration of the apparatus became complicated.

Further, in the related art, while a matrix switch was used to freely arrange video signal paths for a number of video signal processing units and to reconfigure the video signal processing apparatus internally according to its purpose, the operator had no way of knowing how the video signal processing apparatus was internally configured by the states of the intersections of the matrix switch and the resultant paths thereof at a certain time. There was no information other than the memory or notes of the person who set the matrix switch and therefore it was impossible to confirm whether the inner configuration was correct.

In addition, in the related art, each operator console operating a video signal processing unit was connected to the body of a video signal processing apparatus via a communication channel and was assigned to a video signal processing unit, but with such connections, it was necessary to connect the same number of communication channels as the number of operator consoles to the body of the video signal processing apparatus. The number of cables connected to the body of the video signal processing apparatus rose and handling and setting became inconvenient. Therefore, it was desired to connect the body of video signal processing apparatuses and the operator consoles through a network. However, when connected through a network, the control communications from the operator consoles to assigned video signal processing units were all transmitted to the body of video signal processing apparatus through the same network, so there was a problem of crosstalk.

In addition, in the related art, the operator control panels of the operator consoles are assigned to video signal processing units. The video signal processing apparatus starts operating after the operator consoles are assigned to the video signal processing units in accordance with the applications, and the operator consoles perform control communications with the assigned video signal processing units. Depending on condition of the application, however, sometimes an operator console was disconnected or a further one connected. At this time, if the operator console was not correctly connected, erroneous control communications relative to a video signal processing unit not assigned originally could occur. If an operator performed operations from the operator console assigned originally, but there are mistaken communications from other operator consoles during operation, the control will be confused resulting in problems in operation.

In addition, in the related art, while the video signal processing apparatus could freely set paths for the video signal processing units built into it, when trying to form a complicated system using a number of video signal processing apparatuses, the connections among video signal processing apparatuses were treated as transmissions between separate devices. It was necessary to study separately on the desktop what kind of overall configuration (video signal paths) would be formed by the connections.

In addition, an operator console belongs to a video signal processing apparatus to which it is connected, hence to control units in other video signal processing apparatuses, it was necessary to use the operator consoles belonging to those video signal processing apparatuses.

In addition, in the related art, video signal processing units are controlled using operator consoles having freely configurable operator control panels. Operator consoles provided with graphical user interface-like input means have the advantages that the display is easy to understand, the operator control panels can be changed dynamically, there are no limits in physical dimensions, and the cost can be reduced by mass production. On the other hand, there are many disadvantages compared with the physical operator consoles using physical dials and other switches such as a greater burden on the eye, a worse hands on feeling in operation, difficulty of inputting fine operations, unsuitability for quick operation, and slow response time.

In the related art, further, the roles of the video signal processing units changed according to paths set by the matrix switch. Therefore the inputs to the video signal processing units changed according to the paths set and were not fixed. If just simply connecting physical operator consoles, it is not known which paths the physical dials and other switches will act on. Due to this, physical operator consoles could not be simply connected for use.

SUMMARY OF THE INVENTION

A first object of the present invention is to provide a video signal processing apparatus enabling the matrix switch to be set quickly and at a high efficiency when using a video signal processing apparatus by a previously used configuration.

A second object of the present invention is to provide a video signal processing apparatus able to be set at a high efficiency when assigning operator consoles to the video signal processing units the same as in previous assignments.

A third object of the present invention is to provide a video signal processing apparatus able to establish correspondence between the settings of the matrix switch and the assignment of the operator consoles to facilitate the assignment of the operator consoles.

A fourth object of the present invention is to provide a video signal processing apparatus enabling the operator consoles to be appropriately used according to the number of functions required by the application.

A fifth object of the present invention is to provide a video signal processing apparatus providing a control environment enabling easy realization of a desired inner configuration.

A sixth object of the present invention is to provide a video signal processing apparatus able to assist fast setting of the inner configuration and prevent damage due to erroneous setting.

A seventh object of the present invention is to provide a video signal processing apparatus able to prevent a change in the setting of the inner configuration counter to the intent of the operator and as a result to prevent obstruction in operation.

An eighth object of the present invention is to provide a video signal processing apparatus able to make the operations of the matrix switch easy while not making the configuration of the apparatus complicated.

A ninth object of the present invention is to provide a video signal processing apparatus able to provide information on paths set by using the matrix switch.

A 10th object of the present invention is to provide a video signal processing apparatus able to connect operator consoles to a network and prevent crosstalk of communications between operator consoles and the assigned video signal processing units.

An 11th object of the present invention is to provide a video signal processing apparatus able to prevent mistaken control communications and to ensure that a video signal processing unit be controlled only by the operator console correctly assigned originally.

A 12th object of the present invention is to provide a method for easy construction of desired paths when using a number of video signal processing apparatuses to construct hierarchical paths by a matrix switch.

A 13th object of the present invention is to provide a method for realizing free assignment of operator consoles not limited to specific video signal processing apparatuses when using a number of video signal processing apparatuses.

A 14th object of the present invention is to provide a method for enabling use of physical operator consoles in a reconfigurable video signal processing apparatus.

According to a first aspect of the present invention, there is provided a video signal processing apparatus comprising at least one video signal processing unit, at least one video signal input channel, at least one video signal output channel, a matrix switch to the input side of which outputs of the video signal processing units and the video signal input channels are connected and to the output side of which the inputs of the video signal processing units and the video signal output channels are connected, a storage means for storing the states of part or all of the intersections of the matrix switch, and an intersection reproducing means for setting the intersections of the matrix switch according to the contents of the storage means.

Due to such a configuration, when current settings of the matrix switch will be used later, the current settings are stored into the storage means. When desiring to reuse the apparatus at certain stored settings after use at different settings, the intersection reproducing means is set into operation.

Therefore, the operator need not repeated set each and every intersection any longer and can complete the desired settings by just activating the intersection reproducing means.

In addition, by giving the storage means a plurality of stored information, even when using several settings repeatedly, the desired settings can be completed by just selecting and specifying the stored information in the intersection reproducing means.

In addition, according to the present invention, provision is made of an external storage device using a removable and changeable storage medium, and identifiers such as a string of characters or numbers are assigned to the contents of the storage means.

Due to such a configuration, when storing the inner configuration of a video signal processing apparatus, the settings of the matrix switch are stored as a file in an external storage device. When desiring to use the stored settings, the settings are reproduced by specifying the file name (ID) and reading it from the external storage device.

Because an inexpensive nonvolatile medium can be used for the external storage device, the settings can be read from the external storage device and reproduced even if the video signal processing apparatus is turned off.

In addition, even when changing the video signal processing apparatus itself for repair etc., the same settings as before the change can be used by using the storage medium storing the settings in the new video apparatus.

As the identifier assigned to a memory, any name convenient for organizing the information can be employed. A large number of recordings of settings can be stored in an organized manner.

In addition, according to the present invention, there is provided a video signal processing apparatus comprising at least one operator console for operating a video signal processing unit, an assignment managing means for assigning each operator console to at least one video signal processing unit, and an assignment storage means for storing the assignments.

The assignment managing means assigns an operator console to a video signal processing units, stores the assignment in the assignment storage means, and reproduces the contents of the assignment storage means.

Each video signal processing unit is operated using an operator console, but their correspondence is not fixed and can be changed freely using the assignment managing means. Because the assignments of operator consoles are also stored, reproduced, and used simultaneously when storing, reproducing, and using the settings of the matrix switch, the work of assigning operator consoles can be eliminated. Further, when changing the assignments of the operator consoles according to the number of operators, the situation can be dealt with by just reproducing the contents of the assignment storage means.

In addition, according to the present invention, there is provided a video signal processing apparatus comprising at least one operator console for operating a video signal processing unit, a specific output related unit discriminating means for discriminating from other video signal processing units a video signal processing unit arranged in a path leading to each output channel, and an operation correspondence means for establishing correspondence of each of the operator consoles with an output channel.

The operation correspondence means receives input specifying a corresponding operator console and output channel. Using the operator console, the operator controls all the video signal processing units influencing the corresponding output channel.

Because the video signal processing unit arranged in a path leading to a certain output channel can be specified by using the specific output related unit discriminating means, the operation correspondence means uses this to assign operator consoles to the video signal processing units.

The specific output related unit discriminating means obtains the states (settings) of the intersections of the matrix switch and uses them to generate information of all paths. By following back a path leading to a specified output channel, it is able to specify all video signal processing units in the path.

As a result, a specified operator console is assigned to video signal processing units in the path leading to the specified output channel.

In addition, according to the present invention, there is provided a video signal processing apparatus comprising a correspondence storage means for storing the correspondence between an operator console and output channel obtained by using the operation correspondence means.

When establishing correspondence between an output channel and operator console, the correspondence is stored in the correspondence storage means if the correspondence may be used again at a later time.

When desiring to use the video signal processing apparatus by the original correspondence between output channels and operator consoles after using it by a configuration for another applications, the correspondence is read from the correspondence storage means and the operation correspondence means is operated.

In addition, by giving the correspondence storage means a plurality of stored information, even if repeatedly using a plurality of correspondences, the desired correspondence can be obtained by selecting and specifying the stored information.

In addition, according to the present invention, there is provided a video signal processing apparatus wherein the operation correspondence means establishes correspondence of a plurality of operator consoles to an output channel and assigns each video signal processing unit arranged in a path leading to a specified output channel to any of the specified plurality of operator consoles.

The operation correspondence means receives input specifying the corresponding operator consoles and output channel. The operator operates the plurality of operator consoles together so as to control all the video signal processing units influencing the corresponding output channel.

After the video signal processing units in a path leading to a specified output channel are determined, they are assigned to any of the specified plurality of operator consoles. The operation correspondence means receives the input for specifying which of the determined video signal processing units are to be assigned to which of the specified operator consoles.

As a result, control related to a path is shared by a plurality of operator consoles.

In addition, according to the present invention, there is provided a video signal processing apparatus comprising at least one operator console for operating a video signal processing unit, an assignment managing means for assigning each operator console to at least one video signal processing unit, and an assignment storage means for storing the assignments.

At least one video signal processing unit in the video signal processing apparatus is configured so that it may be controlled divided into two or more parts according to its functions. Although each video signal processing unit is treated as an independent unit due to its physical and electrical configuration, in some cases, it is appropriate to perform control in units of functions. Even though a video signal processing unit is treated as a single unit, sometimes it is controlled divided into several parts according to its functions.

For such a video signal processing unit, each function is deemed as a unit to which the assignment managing means assigns an operator console.

The assignment storage means stores the assignments to operator consoles and functions to enable reproduction of the assignments by the assignment managing means at a later time.

In addition, according to the present invention, there is provided a video signal processing apparatus comprising a connection storage means for storing and holding the objects connected to inputs and outputs of the matrix switch and a matrix control console for controlling the matrix switch.

Each of the video signal processing unit has a unique name or number. Further, inputs and outputs of video signal processing units can be designated using their numbers. Input channels and output channels of a video signal processing apparatus each have unique names and numbers as well.

The connection storage means stores the objects connected to the matrix switch using their names. The matrix control console refers to this stored information for display and receives input operations for the displayed names. The corresponding intersections of the matrix switch are controlled from the received operations.

In addition, according to the present invention, there is provided a video signal processing apparatus comprising a connection storage means for storing and holding objects connected to inputs and outputs of a matrix switch and a check means for checking paths after control for operations controlling the matrix switch and issuing warnings.

The matrix switch connects its inputs and outputs according to any setting of the matrix. Each output is connected to any of the inputs. By setting the matrix switch, paths in a video signal processing apparatus are constructed and a functional configuration can be made. Not all combinations of settings of the matrix switch lead to functional configurations operating correctly, however. In some cases, there may be settings that do not function and furthermore settings that cause the apparatus to malfunction. For example, if the output of a video signal processing unit having one input and one output is connected to the input through the matrix switch, it will form a complete recurrent loop, will exhibit no function to the outside, and in some cases can break down. Such a setting may occur due to a mistaken control operation.

In the present configuration, the control operation is not executed immediately. The check means checks whether there are problems or not before operation and executes the settings only when there are no problems. If there are any problems, it issues a warning. The check means refers the connection storage means, obtains the objects to be connected to the inputs and outputs of the matrix switch, decides the paths configured according to the result of control, and performs a check.

According to the present invention, furthermore, when the video signal processing units are removable and changeable and the types of the video signal processing unit connected to the inputs and outputs of the matrix switch are not fixed, at the time of operation, the check means identifies the video signal processing units connected to the inputs and outputs of the matrix switch and uses this information to determine and check the paths resulting from control of the matrix switch.

In addition, according to the present invention, there is provided a video signal processing apparatus comprising a matrix control console for controlling intersections of a matrix switch and a lock. A person authorized to operate the matrix switch holds a key to the lock.

Only when the lock is released using the correct key can the matrix control console be operated. A person without the key cannot operate it. In the locked state, erroneous change of the settings of the matrix switch is prevented.

In addition, according to the present invention, there is provided a video signal processing apparatus comprising a matrix control console for controlling a matrix switch and a password input means. Operation of the matrix control console is enabled only when a correct password is input into the password input means. Further, after the operation, the matrix control console returns to the state waiting for input of password and cannot be operated.

In addition, according to the present invention, there is provided a video signal processing apparatus comprising at least one operator console for operating a video signal processing unit, an assignment managing means for assigning each operator console to at least one video signal processing unit, and a mechanism provided for controlling the operation of the matrix switch at least at one operator console, namely, a mechanism equivalent to a matrix control console.

The operator console provided with the mechanism for controlling the matrix switch is able to control the matrix switch in addition to operating a video signal processing unit.

In addition, according to the present invention, the operator console displays information on the current settings (states of intersections) of the matrix switch. Alternatively, it displays information on paths constructed by the matrix switch.

The operator console is connected to the matrix switch via a communication channel directly or indirectly. The settings of the matrix switch are transmitted to the operator console and displayed there.

In addition, the operator console displays path information. Paths in which video signal processing units are arranged are constructed by the matrix switch. This information is transmitted to the operator console and displayed there.

In addition, according to the present invention, there is provided a video signal processing apparatus comprising a path information generating means for generating information on an input channel and video signal processing unit connected to a path leading to an output channel by the matrix switch for each of the output channels and an information video output means for outputting images of letters (or symbols) to each output channel.

The path information generating means reads the settings of the matrix switch and generates information of the input channel and the video signal processing unit related to each output channel. The information is sent to the information video output means. The information video output means generates images of letters or symbols and outputs the same to the output channel corresponding to the original information.

The output to the output channel either replaces the normal output completely or is superposed on the normal output (overlaid). This operation is performed only when necessary and need not be performed constantly.

In addition, according to the present invention, there is provided a video signal processing apparatus comprising an information transmitting means for transmitting information on the current settings (states of intersections) of the matrix switch or on the paths as the result thereof, a communication channel, and a display means for displaying the information.

The display means is connected to the information transmitting means. The information transmitted by the information transmitting means is sent to a display means at a distant location via the communication channel and is displayed there. It is also possible to provide a plurality of display means at several different locations and connect them via communication channels. Furthermore, each display means may also receive and display different content from the information transmitting means.

In addition, according to the present invention, there is provided a video signal processing apparatus comprising a plurality of operator consoles and a housing holding video signal processing units connected via a network and controlling the video signal processing units by the operator consoles through the network, wherein each operator console is assigned a unique network identifier, an operator console adds its own network identifier to control transmission to a video signal processing unit, and the control transmission is first received by the assignment managing means, then is sent to the video signal processing unit concerned according to the network identifier.

In addition, according to the present invention, there is provided a video signal processing apparatus comprising a plurality of operator consoles and a housing holding video signal processing units connected via a network and controlling the video signal processing units by the operator consoles through the network, wherein each video signal processing unit is assigned a unique identifier, each operator console receives and stores an identifier of the video signal processing unit assigned to it by the assignment managing means before starting a control operation, and, when the operator then operates the operator console, the operator console adds the earlier notified identifier to the control transmission to specify the destination video signal processing unit according to the identifier.

The video signal processing units and the housing holding them need not all be integral. They may be physically divided into a number of sections and connected by the network. Their positions in the network can be determined by the assigned identifiers.

The network identifier of the operator console itself is added to the control transmission from the operator console in case of reply and re-transmission due to a malfunction in the network.

In addition, according to the present invention, there is provided a video signal processing apparatus comprising a plurality of operator consoles and an assignment managing means for assigning each operator console to at least one video signal processing unit, wherein each operator console is assigned a unique identifier, each video signal processing unit is assigned a unique identifier, the assignment managing means informs of the identifier of the video signal processing unit assigned to each operator console in advance before starting a control operation, and the operator console receives and stores the identifier.

When an operator operates an operator console, the operator console adds the previously informed identifier and its own identifier to the control transmission. The control transmission is received first by the assignment managing means. The assignment managing means investigates the added identifier of the video signal processing unit and the identifier of the operator console and sends the control transmission to the video signal processing unit concerned only when that combination is that first assigned. Therefore, control from an operator console other than the assigned one is made impossible.

In addition, according to the present invention, there is provided a video processing system comprising a plurality of video signal processing apparatuses, wherein control communication can be performed between a single operator console and the matrix switches of all video signal processing apparatuses.

In a system transferring video from one video signal processing apparatus to another video signal processing apparatus and able to perform more complex processing than a single video signal processing apparatus, an inter-apparatus connection storage means is provided for storing the connections among the video signal processing apparatuses. A matrix control console and common control communication channels are provided. Control of all the matrix switches of the video signal processing apparatuses is enabled from the matrix control console through the common control communication channels. The matrix control console refers to the stored information of the inter-apparatus connection storage means and provides control operation functions based on what kind of video paths are formed overall due to the control of each matrix switch.

It is also possible to provide a plurality of matrix control consoles and give each the same functions.

In addition, according to the present invention, there is provided a video processing system comprising a plurality of video signal processing apparatuses, wherein an operator console is not limited to one exclusively used for a specified video signal processing apparatus and can be configured to enable control communication with the video signal processing units of all of the video signal processing apparatuses. Here, provision is made of an operator console and common control communication channels. The operator console controls communication with the video signal processing units of all video signal processing apparatuses through the common control communication channels. The operator console receives an instruction specifying to which video signal processing unit of which video signal processing apparatus it is assigned and performs control communication with that assigned video signal processing unit.

In addition, according to the present invention, there are provided a plurality of input units as a video signal processing unit of a video signal processing apparatus, a physical switch operator console for them, and a unit input information generating means for transmitting information of video sources of the plurality of input units.

The unit input information generating means generates information of the original video source according to the settings of the matrix switch for the input of a plurality of input units changeable due to a change of settings of the matrix switch. The original video source may be the input channel of a video signal processing apparatus or the output of another video signal processing unit. The information for determining it is generated, and then is transmitted to the physical switch operator console.

The physical switch operator console is provided with selecting switches corresponding to the input channels of the plurality of input units being operated. Further, it has the function of displaying the information received from the unit input information generating means. As a result, although the meanings of the selecting switches will change in accordance with the change of settings of the matrix switch, the meanings are supplied to the operator by this display function.

The physical switch operator console is not limited to use in operation of any specific number of input units. When there are a plurality of input units, the physical switch operator console can be assigned to any one or more of them.

BRIEF DESCRIPTION OF THE DRAWINGS

These and other objects and features of the present invention will become clearer from the following description of the preferred embodiments given with reference to the accompanying drawings, in which:

FIG. 4A is a view of a first example of video paths formed by setting the matrix switch, while

FIG. 5 is a schematic view of the characterizing portion of a first embodiment;

FIG. 6 is a schematic view of the characterizing portion of a modification of the first embodiment;

FIG. 9 is a flow chart of other processing for storing the states of the matrix switch in the storage means;

FIG. 10A is a view of an example of one stored information corresponding to the processing in FIG. 8;

FIG. 10B is a view of an example of several stored information corresponding to the processing in FIG. 8;

FIG. 17 is a flow chart of the processing for storing the states of the matrix switch in the storage means;

FIG. 18 is a flow chart of the processing, corresponding to FIG. 17, for reading data from the external storage device;

FIG. 19 is a flow chart of other processing for storing the states of the matrix switch in the external storage device;

FIG. 20 is a schematic view of the characterizing portion of a third embodiment;

FIG. 36 is a view of an example of the correspondence between operator consoles and output channels;

FIG. 37 is a view of another example of the correspondence between operator consoles and output channels;

FIG. 43 is a view of another example of units influencing output channels;

FIG. 44 is a view of an example of correspondence of a plurality of operator consoles;

FIG. 49 is a flow chart of the processing in the assignment managing means for transmitting to a unit from an operator console;

FIG. 50 is a schematic view of the characterizing portion of an eighth embodiment;

FIGS. 51A and 51B are views of examples of the stored content of the connection storage means, wherein FIG. 51A shows an example of the connection destinations of inputs and FIG. 51B shows an example of the connection destinations of outputs;

FIGS. 52A and 52B are views of examples of display using the GUI of the matrix control console, wherein FIG. 52A shows an example of the input screen for path connection and FIG. 52B shows another example of the input screen for path connection;

FIG. 72 is a view of an example of a transfer table of the assignment managing means;

FIG. 73 is a flow chart of the operation in an assignment managing means for transmitting to an operator console from a unit;

FIG. 74 is a flow chart of the operation in an assignment managing means for transmitting to a unit from a operator console ;

FIG. 96 is a schematic view of the hardware configuration of an embodiment of a video processing system to which the present invention is applied; and FIG. 97 is a schematic view of the configuration of a video signal processing apparatus of the related art.

DESCRIPTION OF THE PREFERRED EMBODIMENTS

Below, preferred embodiments of the present invention will be described with reference to the accompanying drawings. A plurality of embodiments will be presented, but before that, the common basic configuration of these embodiments will be described.

Figure 1:
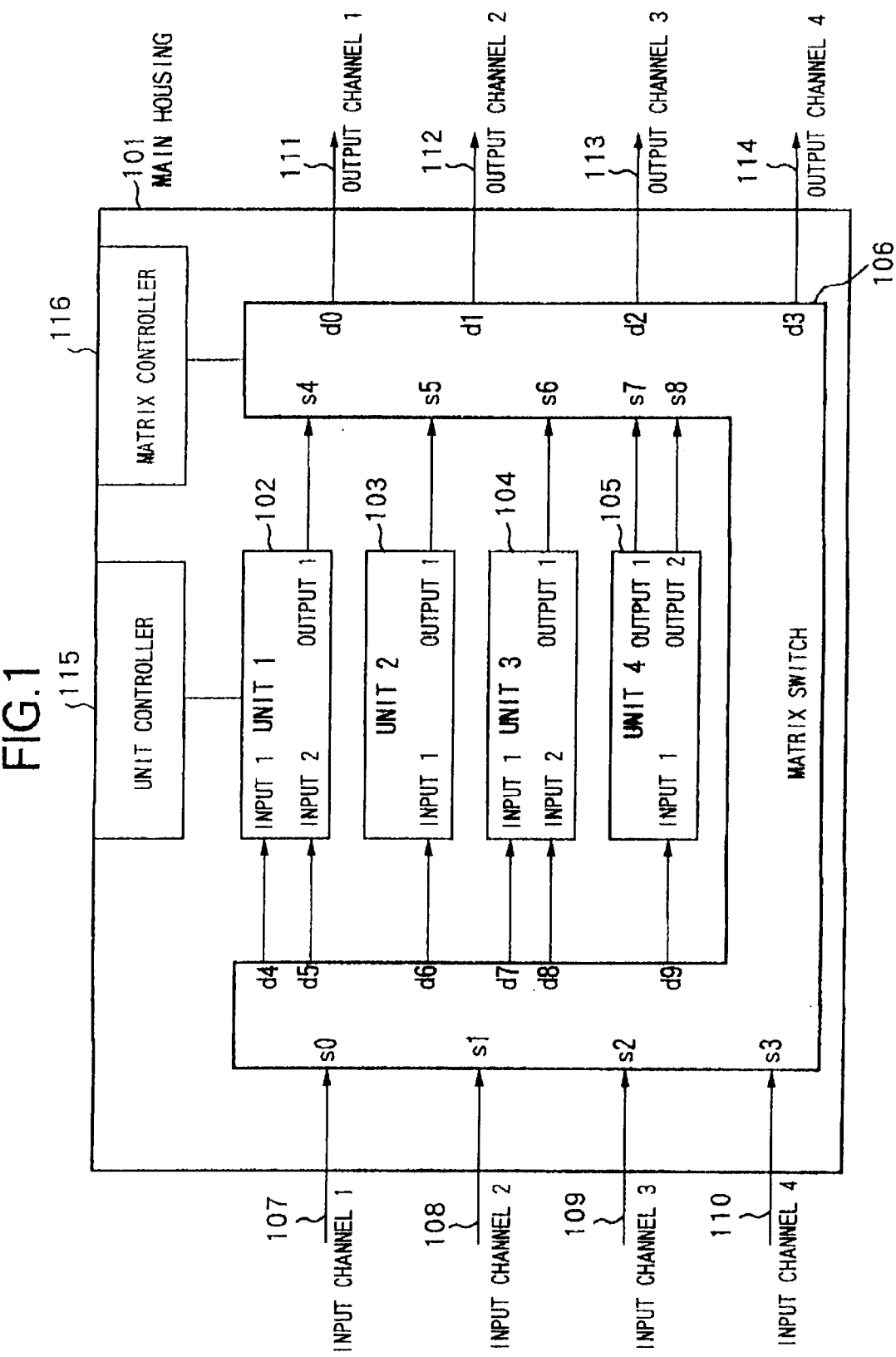
FIG. 1 is a view of a first basic configuration of a video signal processing apparatus according to the present embodiment.

FIG. 1 is a view of a first basic configuration of a video signal processing apparatus.

According to the first basic configuration, the video signal processing apparatus comprises a housing 101 storing the components of the video signal processing apparatus.

As the components, the video signal processing units (hereinafter simply indicated as unit) 102 to 105 are provided. Each unit 102 to 105 is provided with one or more video inputs and outputs. Alternatively, using a device for replaying from a changeable disk as a unit, a unit having only outputs can be provided. For convenience, the inputs of each unit are shown numbered as input 1 and input 2, and the outputs in the same manner as output 1, output 2. The units may include, by function, a video effect unit, text generating unit, or storage unit using a disk or solid-state storage elements.

The video inputs and outputs of the units 102 to 105 are connected to a matrix switch 106. The matrix switch 106 can select any of the plurality of inputs.

The matrix switch 106 is connected to input channels 107 to 110 and output channels 111 to 114. The input channels 107 to 110 are shown numbered in order as the input channel 1, input channel 2, . . . . The output channels 111 to 114 are treated in the same manner as input channels and indicated in order as the output 1, output 2, and so on.

The video signal processing apparatus is provided with a unit controller 115. This unit controller 115 receives input operations from an operator to the unit 102. Note that depending on the embodiment below, there is also a configuration in which a housing (operator console) independent from the main housing 101 is given the functions of a unit and wherein the unit controller 115 is not required.

The video signal processing apparatus is further provided with a matrix controller 116. This matrix controller 116 receives input operations to the matrix switch 106. Depending on the embodiment below, there is also a configuration in which a housing (matrix control console) independent from the main housing 101 is given the functions of a matrix switch and wherein the matrix controller 116 is not required.

Although four units, input channels, and output channels are indicated in FIG. 1, the invention is not limited to this. Further, the numbers of inputs and outputs are not necessarily the same.

Figure 2:
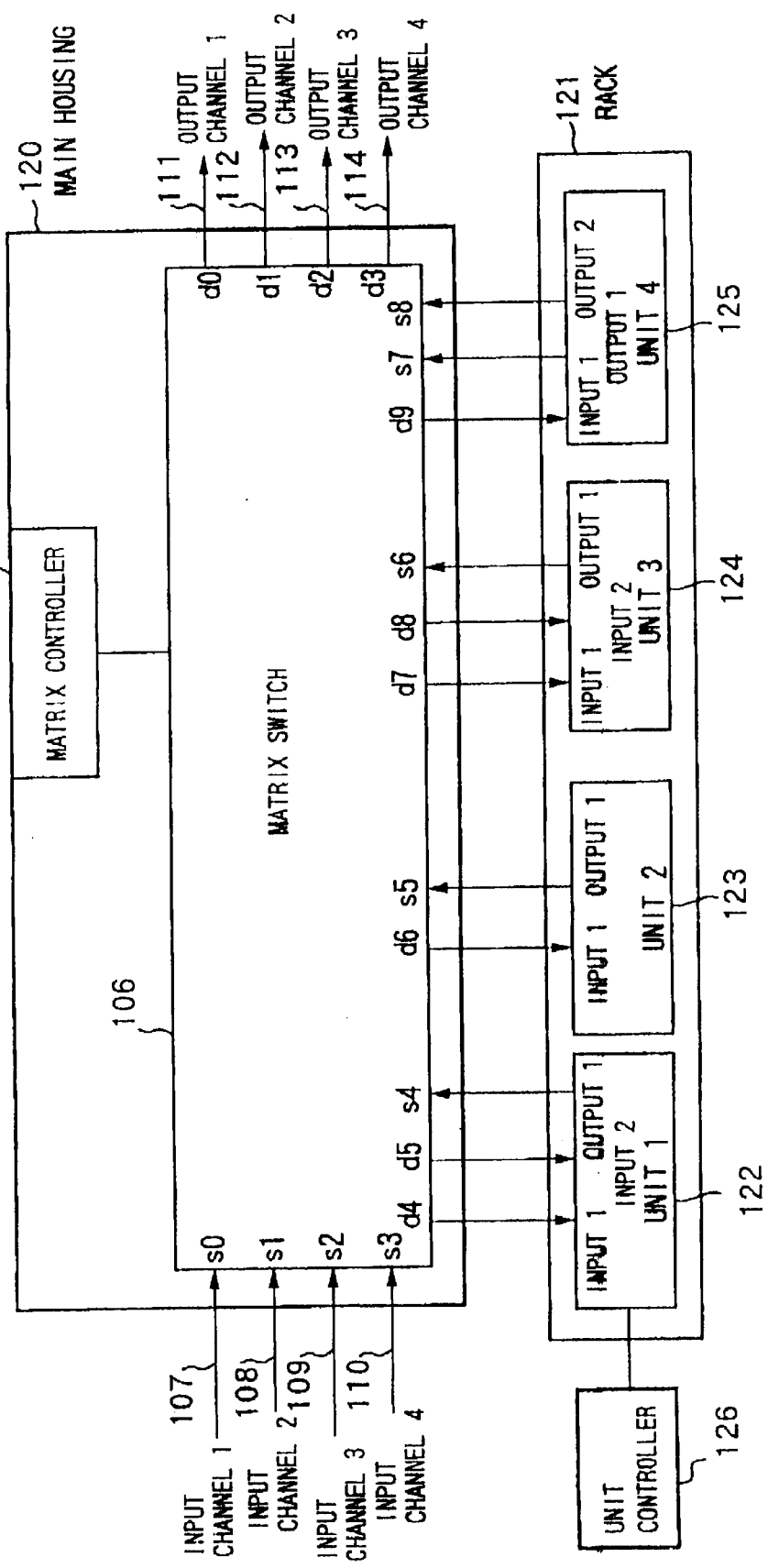
FIG. 2 is a view of a second basic configuration of a video signal processing apparatus according to the present embodiment.

FIG. 2 is a view of a second basic configuration of the video signal processing apparatus.

In FIG. 2, the same reference numerals are assigned to components the same as in FIG. 1 and explanations of these same components are omitted. In the second basic configuration, the main housing 120 accommodates a matrix switch 106 and a matrix controller 116. Units 122, 123, 124, and 125 are physically outside the main housing 120 and are held in a rack 121. The unit controller 126 receives input operations to the unit 122 from an operator. When necessary, a unit controller 126 may be provided for each unit.

As described above, in the configuration in FIG. 2, unlike in FIG. 1 the units 122, 123, 124, and 125 are configured physically independent from the matrix switch 106. In the configuration in FIG. 2, the example is shown of the units 122, 123, 124, and 125 housed in a rack 121, but the invention is not limited to this. The configuration for control and the control method that characterize the present invention are applicable so long as the units 122, 123, 124, 125 are connected under the matrix switch 106 electrically in the same way as in FIG. 1. The physical arrangement is not important as long as this condition is satisfied.

Figure 3:
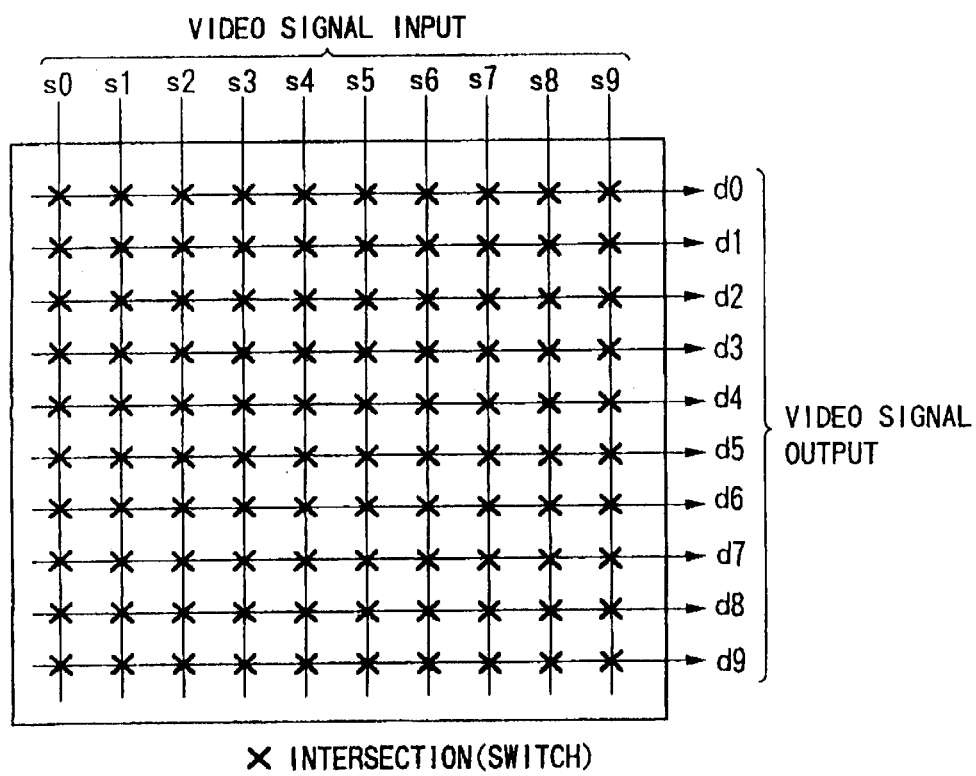
FIG. 3 is a view for illustrating a matrix switch.

FIG. 3 is a view for explaining the matrix switch.

The matrix switch 106 has 10 inputs s0 to s9 as video signal inputs and has 10 outputs d0 to d9 as video signal outputs. The X marks show the intersection switches. The intersection switches operate so as to select only one video input signal, namely so as to select and turn on the intersections, for each video signal output. In this way, any video input signal can be supplied to each video signal output.

Figure 4A:
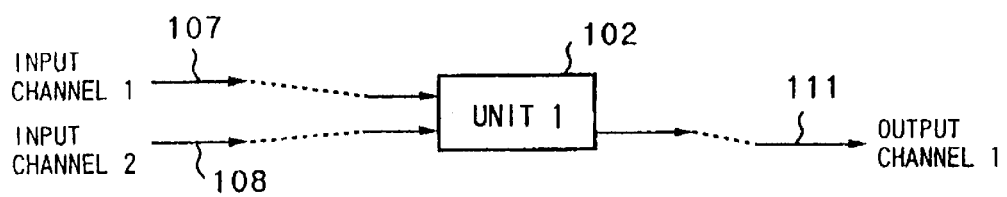
Figure 4B:
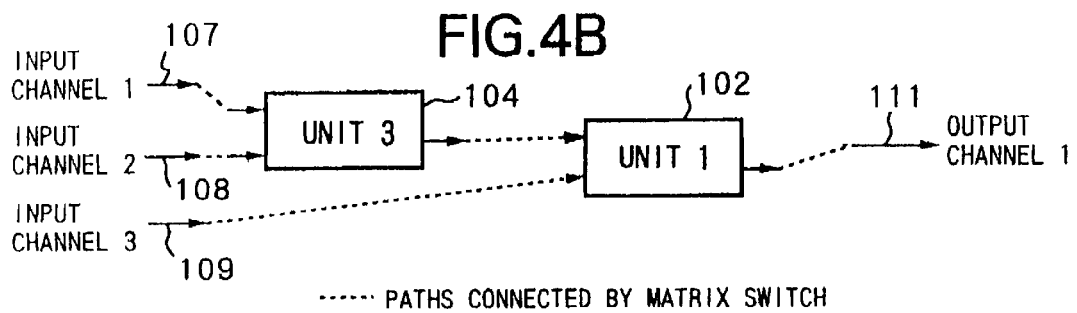
FIG. 4B shows a second example.

FIGS. 4A and 4B show examples of the video paths constructed by setting the matrix switch. FIG. 4A shows a first example, and FIG. 4B shows a second example. The connections shown by the broken lines in these figures are the connections realized by the matrix switch 106.

As a result, according to the first example of a path to the output channel 111 as shown in FIG. 4A, the input channels 107, 108 are made inputs of the unit 102 and the output of the unit 102 is connected to the output channel 111. In this case, the matrix switch 106 selects the input s0 to the output d4, s1 to d5, and s4 to d0.

In the second example of a path to the output channel 111 as shown in FIG. 4B, the input channels 107, 108 are made inputs of the unit 104, the output of the unit 104 and the input channel 109 are made inputs of the unit 102, and the output of unit 102 is connected to the output channel 111. In this case, the matrix switch 106 selects the input s0 to the output d7, s1 to d8, s4 to d5, and s4 to d0.

In this way, by just changing the settings of the intersections of the matrix switch, the video paths are changed and units and input channels influencing the output channels can be changed freely.

These settings do not require the connection of cables and therefore changing these settings can be performed easily and quickly. In addition, the output of a unit can be connected as the input of another unit. In some cases, it is also required to connect the output of a unit to one of the plurality of inputs of the same unit for operation. This kind of connection can also be realized.

Next, embodiments corresponding each of the claims will be described. In the embodiments shown below, the above basic configurations of the video signal processing apparatus are applied as they are or after partial modifications. Explanations about the portions without any modifications will be omitted. Descriptions will be omitted except for those components explicitly indicated to be removed or replaced.

In order to avoid complicating the illustrations of the embodiments, the components whose explanations are omitted are not included in the figures. Accordingly, in the figures for each embodiment, only the characterizing portions are shown.

First Embodiment

FIG. 5 is a schematic view of the characterizing portion of the first embodiment.

In a video signal processing apparatus having the first basic configuration, a matrix controller 130 is provided inside the main housing 101. The matrix controller 130 comprises a storage means 131 and an intersection reproducing means 132.

The matrix controller 130 basically comprised a microcomputer having a central processing unit (CPU), random access memory (RAM), read only memory (ROM), and input means. The various control operations relevant to the matrix switch 106 are executed by programs built in the ROM.

Of course, it is also possible to realize the same operations by hardware.

The storage means 131 is realized as a region of the RAM of the microcomputer. Alternatively, nonvolatile memories may be provided and assigned as the storage means 131. Further, a hard disk drive may be provided and part of it used as the storage means 131.

The intersection reproducing means 132 is realized as part of the operation of a program of the microcomputer.

FIG. 6 is a schematic view of the characterizing portion of a modification of the first embodiment.

This is a video signal processing apparatus having the second basic configuration where a matrix control console 140 is provided outside the main housing 101. The matrix control console 140 comprises a storage means 141 and an intersection reproducing means 142.

In the configuration as shown in FIG. 6, there is no matrix controller 130 as shown in FIG. 5. The same functions are achieved by the matrix control console 140.

The matrix control console 140, in the same way as the matrix controller 130 in FIG. 5, basically comprises a microcomputer. The matrix control console 140 in FIG. 6 however employs a housing independent from the main housing 101 and is connected with the main housing by a communication channel, so can be operated at a distant location.

The matrix control console 140 acts in completely the same manner and provides the same functions as the matrix controller 130 in FIG. 5.

Below, the operation of the present embodiment will be explained with reference to the configuration in FIG. 5.

Figure 7:
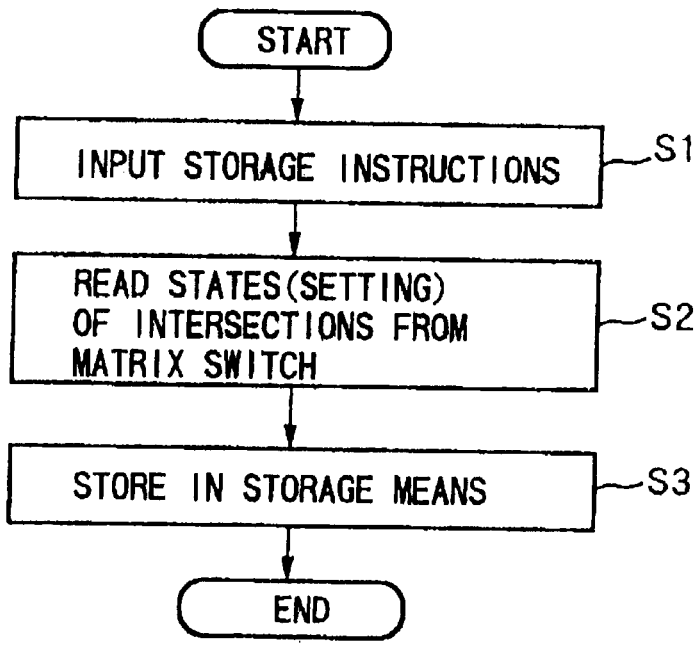
FIG. 7 is a flow chart of the processing for storing the states of the matrix switch in the storage means.

FIG. 7 is a flow chart of the processing for storing the states of the matrix switch 106 in the storage means 131.

At step S1, the input operation from an operator for instructing storage is received. At step S2, the states of intersections are read from the matrix switch 106. At step S3, the read states of intersections are written into the storage means.

Figure 8:
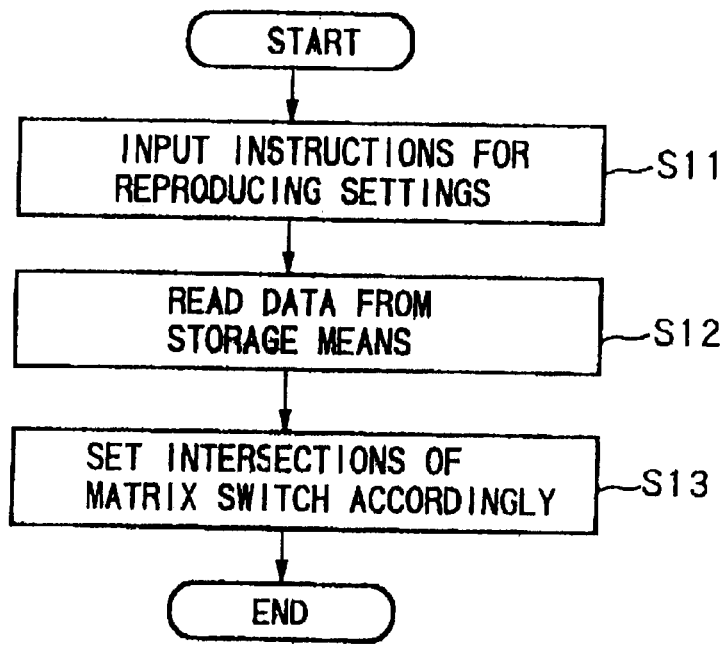
FIG. 8 is a flow chart of the processing for reproducing the settings from the storage means.

FIG. 8 is a flow chart of the processing for reproducing settings from the storage means 131.

In the intersection reproducing means 132, at step S11, the input operation from an operator for instructing reproduction is received. At step S12, the stored states of intersections are read from the storage means. At step S13, the intersections of the matrix switch 106 are set according to the read contents.

Note that the processing shown in FIG. 7 and FIG. 8 showed storage of one combination of settings of the matrix switch 106 as a whole in the storage means 131. However, as shown below, the storage means 131 is also able to store several combinations of settings.

FIG. 9 is a flow chart of other processing for storing states of the matrix switch 106 in the storage means 131.

In this processing, it is possible to designate what is to be stored. Further, several settings are stored in the storage means using indexes.

At step S21, designation of a plurality of output buses (lines) to be stored and input of a storage number from an operator are received. The designation of output buses (lines) designates any of the outputs d0 to d9 of the matrix switch 106 in FIG. 3. The storage number is used as an index to discriminate among several storage information.

At step S22, the states of the intersections are read from the matrix switch 106. Next, at step S23, using the storage number as an index, the read settings of the intersections are stored in the storage means 131.

FIGS. 10A and 10B are views of examples of stored information corresponding to the processing in FIG. 8. FIG. 10A is an example of one set of stored information, FIG. 10B shows an example of a plurality of sets of stored information.

First, in the example of one set of stored information shown in FIG. 10A, settings relevant to all the output buses are stored in a table manner. Note that the correspondence of d9 is given as none, which means it is not selected by any input. In this case, video signals are not output at d9. Alternatively, a default signal of the device may be output through the matrix switch 106.

In addition, when storing only settings relevant to part of the output buses, the other rows in the table are left empty and not written in.

Next, in the case of several stored information, as schematically shown in FIG. 10B, settings are stored in an array in the storage means 131. When accessing each of these, one is selected by using the index number.

Here, while the method is shown of storing the information in an array, there are also other methods for storing several sets of information such as management with a linear list using a pointer or other known methods of data management.

Figure 11:
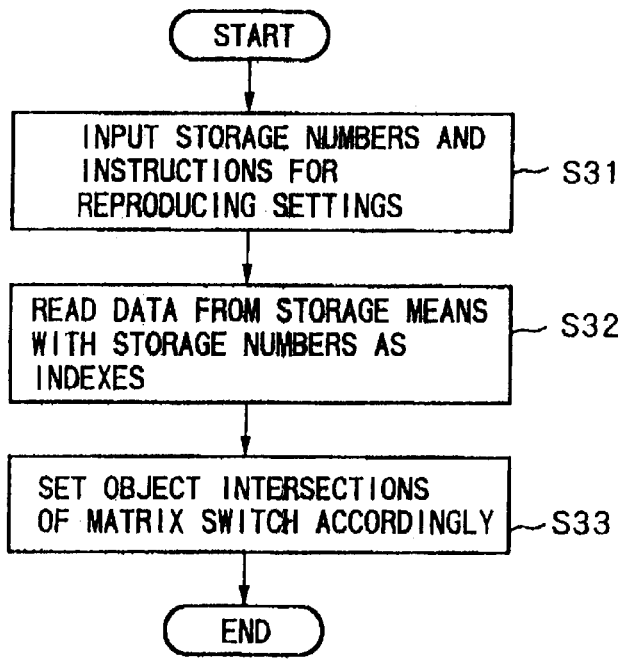
FIG. 11 is a flow chart of the processing for reproducing the settings from the storage means.

FIG. 11 is a flow chart of the processing for reproducing the settings from the storage means 131.

The flow chart in FIG. 11 shows the processing in which the intersection reproducing means 132, corresponding to the storage processing, reproduces the settings from the storage means 131.

At step S31, an input operation of a storage number is received from an operator. Also, an instruction for reproducing settings is also received. At step S32, the settings are read from the storage means using the storage number as an index. At step S33, the matrix switch 106 is set according to the read contents.

If the contents read are as shown in FIG. 10A, the intersections are set so that the input s4 is connected to output d0, s5 is connected to output d1, etc.

According to the first embodiment described above, the settings of the matrix switch performed at some time are stored to the storage means and can be reproduced when used at a later time.

Therefore, the operator need not repeatedly set each intersection any longer and can set a plurality of intersections into the desired states by just reproducing the stored settings.

In addition, even when a plurality of settings are used repeatedly, by making the storage means store the plurality of settings, the desired settings can be obtained by just instructing the intersection reproducing means to select the stored settings.

In addition, it is possible to store and reproduce the settings for only a part of the intersections and therefore reset part of the intersections to previous states without changing the settings of other intersections.

If a nonvolatile memory or hard disk drive is used as the storage means, even after the power is once turned off, the settings stored can be reproduced when the power of the device is turned on again to operate the apparatus.

Second Embodiment

Figure 12:
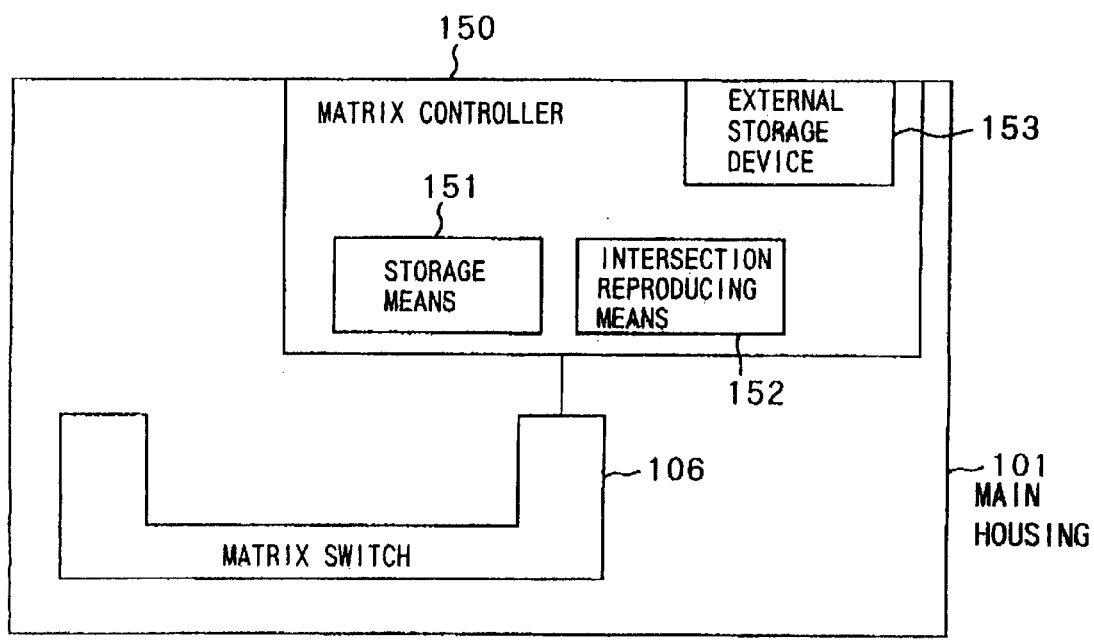
FIG. 12 is a schematic view of a characterizing portion of a second embodiment.

FIG. 12 is a schematic view of the characterizing portion of a second embodiment.

This is a video signal processing apparatus having the first basic configuration where a matrix controller 150 is provided inside the main housing 101. The matrix controller 150 comprises a storage means 151, an intersection reproducing means 152, and an external storage device 153.

The storage means 151 and reproducing means 152 have the same functions as described in the first embodiment.

The external storage device 153 employs a removable and changeable storage medium. The external storage device 153 employs a file system that manages the storage areas of the medium, uses files to contain the stored contents, and identifies and specifies files by giving a file a string of characters as the name of the file.

As the external storage device 153, a known floppy disk is used, but the invention is not particularly limited to this. Optomagnetic disks, small memory cards, etc. may also be similarly used so long as they can be managed by file systems.

Figure 13:
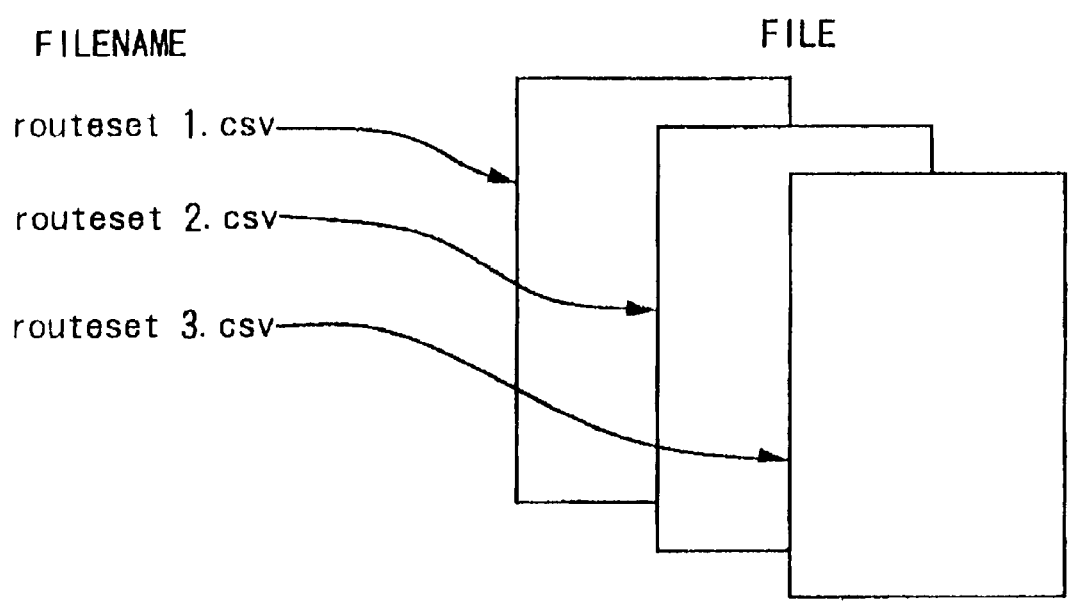
FIG. 13 is a view illustrating the storing method of an external storage device.

FIG. 13 is a view illustrating the storing method of the external storage device.

The stored contents are held as files, and file names are used to identify them. The correspondence between filenames and the contents of files is stored in a specially prepared area in the storage medium.

Figure 14:
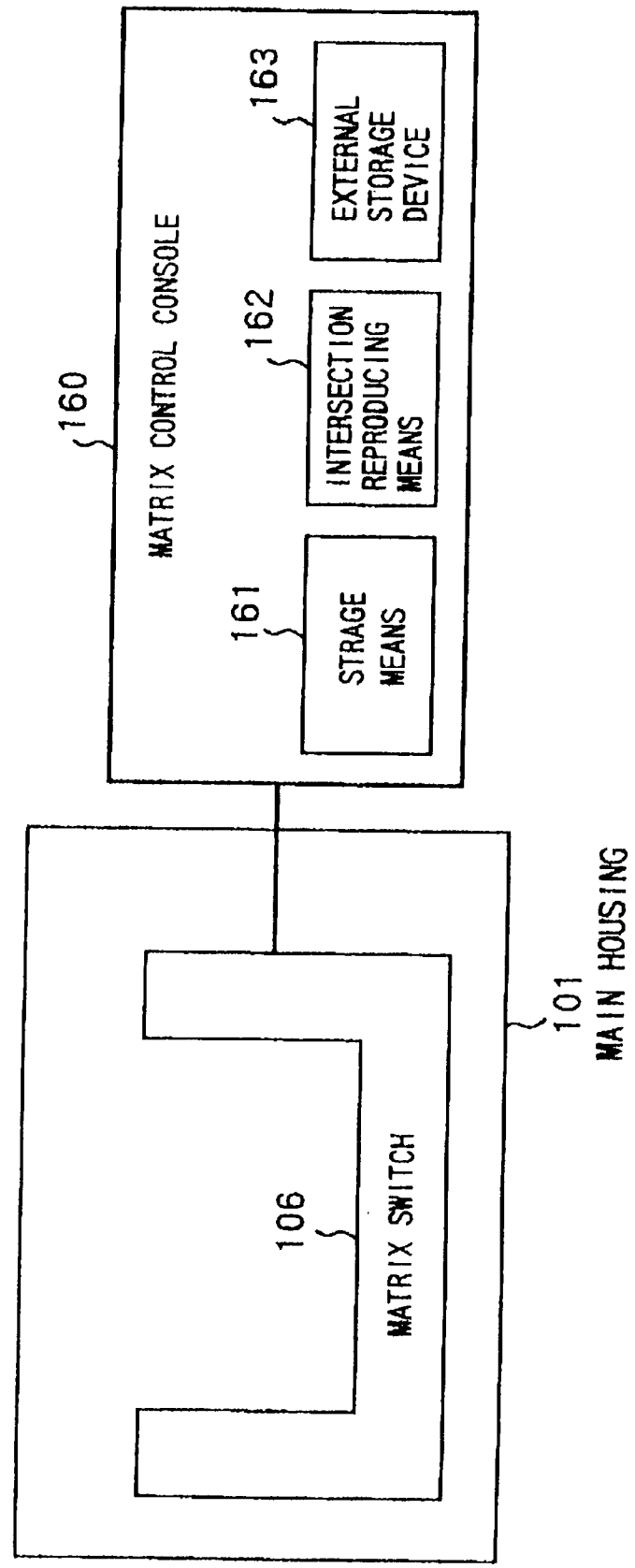
FIG. 14 is a schematic view of the characterizing portion of a modification of the second embodiment.

FIG. 14 is a schematic view of a characterizing portion of a modification of the second embodiment.

This is a video signal processing apparatus having the second basic configuration where a matrix control console 160 is provided outside the main housing 101. The matrix control console 160 comprises a storage means 161, an intersection reproducing means 162, and an external storage device 163.

In the configuration as shown in FIG. 14, there is no matrix controller 150 as shown in FIG. 12. The same functions are achieved by the matrix control console 160.

The matrix control console 160 employs a housing independent from the main housing 101, is connected with the main housing by a communication channel, and can therefore be operated at a distant location.

The matrix control console 160 is operated in completely the same manner and provides the same functions with the matrix controller 150 in FIG. 12.

Next, the operation of the present embodiment will be explained with reference to the configuration in FIG. 12.

Figure 15:
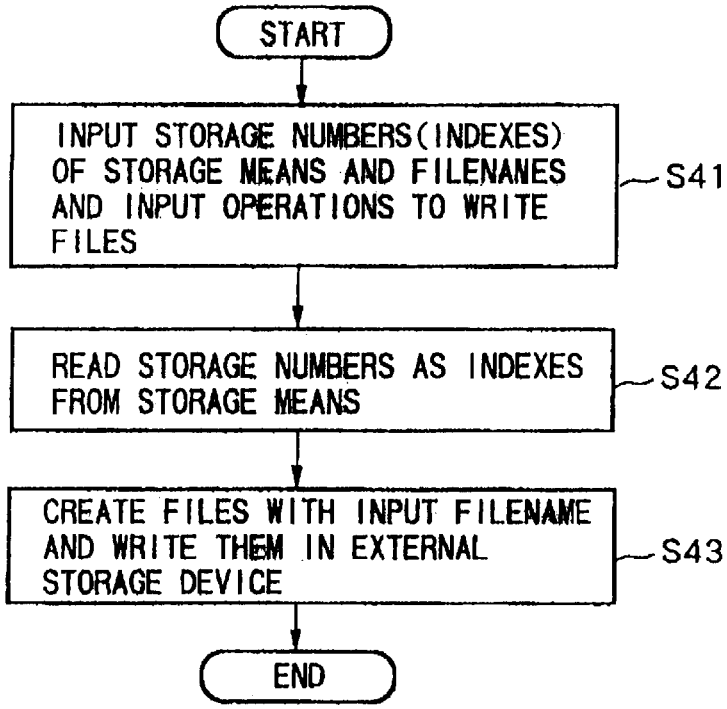
FIG. 15 is a flow chart of the processing for storing the states of the matrix switch in an external storage device.

FIG. 15 is a flow chart of the processing for storing the states of the matrix switch 106 in the storage means 151.

Assume the storage means 151 stores information in arrays with specified indexes as shown in FIG. 10B. Information specified among that is stored in the external storage device as files.

At step S41, input of a storage number of the storage means and a filename is received from an operator. An instruction for writing this file is also received. At step S42, information is read from the storage means 151 from using the storage number as an index. At step S43, a file having the specified filename is created in the external storage device, and the content read at step ST42 is stored in the file.

Figure 16:
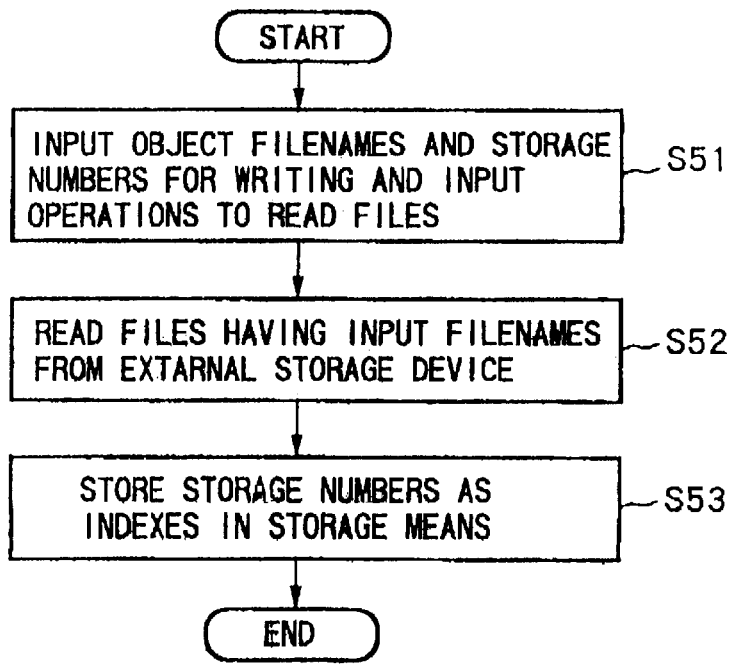
FIG. 16 is a flow chart of the processing, corresponding to the processing in FIG. 15, for reading data from the external storage device.

FIG. 16 is a flow chart of the processing, corresponding to the processing in FIG. 15, for reading data from the external storage device.

At step S51, input of an object file name and a write storage number is received from an operator. An instruction for reading this file is also received. At step S52, the contents of the file having the filename are read from the external storage means 153. At step S53, the contents read at step S52 are stored in the storage means 151 by using the storage number as an index.

FIG. 17 is a flow chart of the processing for storing the states of the matrix switch in the storage means.

This flow chart shows a method for transmitting the setting information directly between the matrix switch 106 and the external storage device 153 without going through the storage means 151. For such a configuration, in many cases a buffer memory for the external storage device is used. Here, the details of this well known technique will be omitted.

At step S61, input of a file name is received from an operator. An instruction for writing this file is also received. At step S62, the states (current settings) of the intersections are read from the matrix switch 106. At step S63, a file having the filename input at step S62 is created, and the contents read at step S62 are written in the files.

FIG. 18 is a flow chart of the processing corresponding to FIG. 17 for reading data from the external storage device.

At step S71, input of an object file name is received from an operator. An instruction for reading this file is also received. At step S72, the file having the object filename is read from the external storage means 153. At step S73, the intersections of the matrix switch 106 are set according to the contents read at step S72.

FIG. 19 is a flow chart of other processing for storing states of the matrix switch in an external storage device.

In the processing shown in FIG. 19, information is read from the storage means 151 and written to files in the external storage device 153 in the same way, but the file names are automatically generated. The operator does not need to input the file name.

At step S81, input of a storage number of the storage means 151 is received from an operator. An instruction for writing files with automatically generated file numbers is also received. At step S82, the contents of the storage means 151 are read by using the storage number as an index. At step S83, the value of a prepared nonvolatile count variable C is decimally transformed to a character string. This string is used as a file name. At step S84, a file having such a file name is created in the external storage means, and the contents read at step S82 are written thereto. At step S85, the count variable C is incremented by one in preparation for next operation.

It is preferable that the file name created at step S83 be displayed to the operator while it is being saved.

According to the present embodiment, when desiring to use the settings stored in the external storage device 153, the settings can be reproduced by specifying a file name (identification) and reading the file from the external storage device 153.

According to the above second embodiment, an inexpensive nonvolatile medium can be used in the external storage device, so even after the video signal processing apparatus is turned off once, the settings can be read from the external storage device and reproduced.

In addition, even when the video signal processing apparatus itself is changed for repair etc., if the storage medium storing the settings is used in the new video apparatus, the same settings as before the change can be used.

As the identifier assigned to stored information, any name convenient in organizing information can be employed. Further, a large number of recordings of settings can be stored in an organized manner.

Third Embodiment

FIG. 20 is a schematic view of the characterizing portion of a third embodiment.

The video signal processing apparatus according to the third embodiment comprises a number of operator consoles 171a, 171b, and 171c outside the main housing 101 an assignment managing means 172 and an assignment storing means 173 the main housing 101.

The operator consoles 171a, 171b, and 171c provide functions for operating the units 102, 103, 104, and 105 in the video signal processing apparatus.

The assignment managing means 172 includes a microcomputer containing a CPU, RAM, ROM, and an input means. The various control operations are executed by a program built in the ROM.

The assignment managing means 172 assigns operator consoles 171a, 171b, and 171c to the units, stores the assignments in the assignment storing means 173, and reproduces the contents of the assignment storing means 173.

Figures 21, 22, 23:
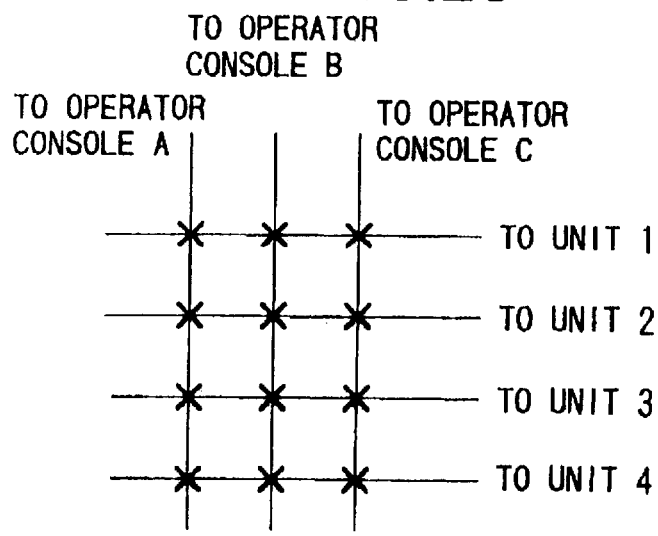
FIG. 21 is a view of another stored information of the assignment storage means.
FIG. 22 is a view of another stored information of the assignment storage means.
FIG. 23 is a view showing the principle of the switching mechanism of the assignment managing means using the matrix switch.

FIG. 21 is a view of an example of the processing for storing in the assignment storing means.

According to the example of stored information shown in FIG. 21, the case is shown of storing assignments whereby the unit 102 (unit 1) is made to be operated by the operator console 171a (operator console A), the unit 103 (unit 2) by the operator console 171a (operator console A), the unit 104 (unit 3) by the operator console 171b (operator console B), and the unit 105 (unit 1) by the operator console 171c (operator console C).

The operator consoles assigned to the units are not limited to one and may be more than one. Namely, in some cases, the same unit may be operated from a number of operator consoles.

FIG. 22 is a view of another example of stored information of the assignment storing means 173.

According to this example, the example is shown of assigning a number of operator consoles to the same unit. In the example in FIG. 21, the case is shown of storage of assignments whereby the unit 102 (unit 1) is operated by the operator consoles 171a (operator console A) and 171b (operator console B), the unit 103 (unit 2) by the operator consoles 171a (operator console A) and 171b (operator console B), the unit 104 (unit 3) by the operator console 171b (operator console B), and the unit 105 (unit 1) by the operator console 171c (operator console C).

FIG. 23 shows an example of assignment and switching thereof by the assignment managing means 172.

FIG. 23 is a view showing the principle of the switching mechanism of the assignment managing means 172 using the matrix switch.

As shown in FIG. 23, the communication channels to each operator console and the communication channels of each unit are connected to the matrix switch, and intersections are set so that the communication channels to units are connected with the communication channels of the assigned operator consoles.

In this example, although a single communication channel shown, in practice it of course is comprised of the number of channels and intersections (switches) necessary for communication.

Figure 24:
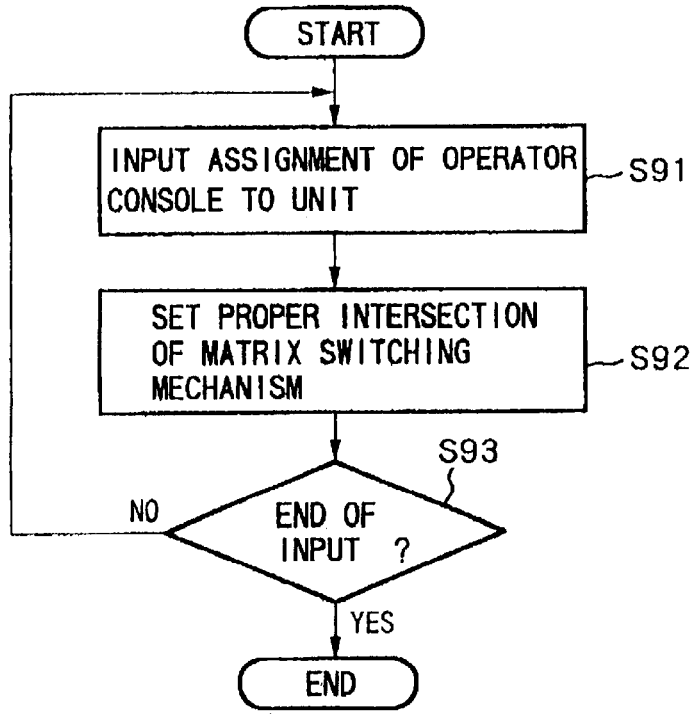
FIG. 24 is a flow chart of the assignment operation of the assignment managing means using the matrix switch.

FIG. 24 is a flow chart of the assignment operation of the assignment managing means using the matrix switch.

In the initial state, all intersections are initialized to an OFF state.

At step S91, an input for instructing assignment of operator consoles to units is received from an operator. At step S92, suitable intersections of the matrix mechanism are set. At step S93, judgment is made as to if there is still input for assignment. If there is, the routine returns to step S91.

Figure 25:
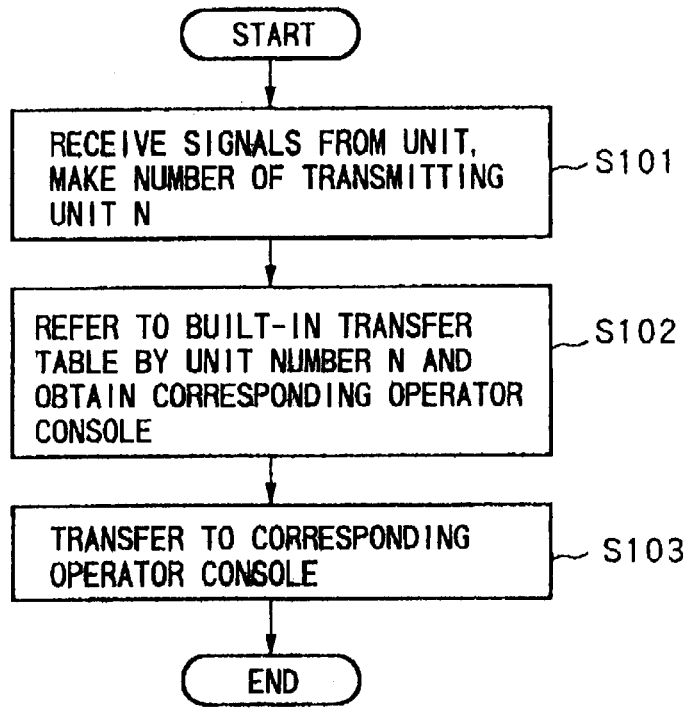
FIG. 25 is a flow chart of the processing for transmission to an operator console from a unit.
Figure 26:
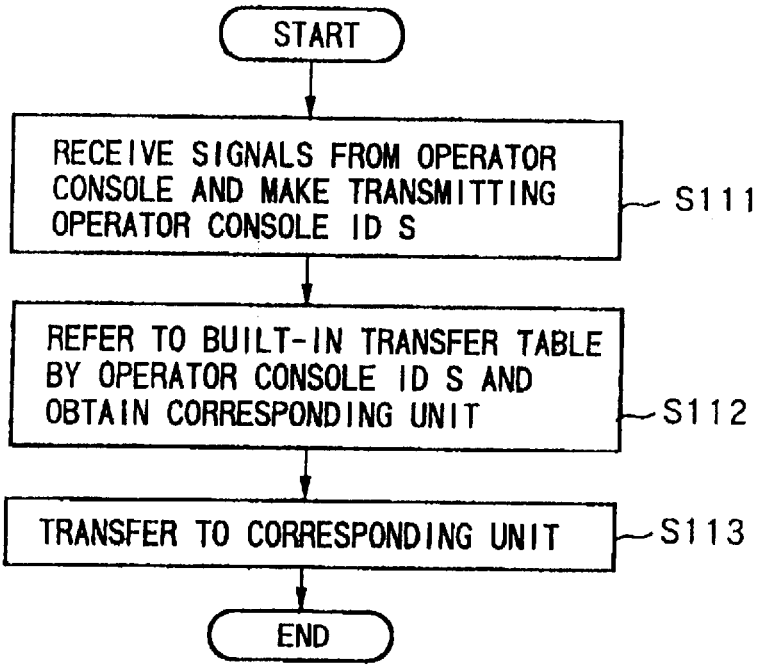
FIG. 26 is a flow chart of the processing for transmission from a unit to an operator console.

As another example of assignment and its switching by the assignment managing means 172, exchange of communication by software is explained in FIG. 25 and FIG. 26. Note that although a transfer table is built in the assignment storing means 173 for exchange using the assignment managing means 172, the transfer table, for example, is assumed to have the same contents as the table shown in FIG. 21. The assignment managing means 172 is operated while referring to this transfer table.

FIG. 25 is a flow chart of the processing for transmission to an operator console from a unit.

At step S101, a signal is received from the unit side and the unit number of the source of transmission is made N. At step S102, the built-in transfer table is referred to and an operator console corresponding to the unit number N is obtained. At step S103, the communication received at step S101 is transmitted to the corresponding operator console. If there are a number of corresponding operator consoles, transmission is performed to all of them.

FIG. 26 is a flow chart of the processing of transmission from a unit to an operator console;

At step S111, a signal is received from an operator console and the operator console of the source of transmission is represented as S. At step S112, the built-in transfer table is referred to and the unit number corresponding to the operator console identifier S is obtained. At step S113, the communication received at step S101 is transmitted to the corresponding unit. If there are a number of corresponding units, transmission is performed to all of them.

Here, when the control instructions (commands) are transmitted to a number of units simultaneously, the contents of the control instructions that are irrelevant to certain units are ignored by those units. Accordingly, the control instructions (commands) simultaneously transmitted to a number of units having completely different functions are processed by only those units having the relevant functions.

Figure 27:
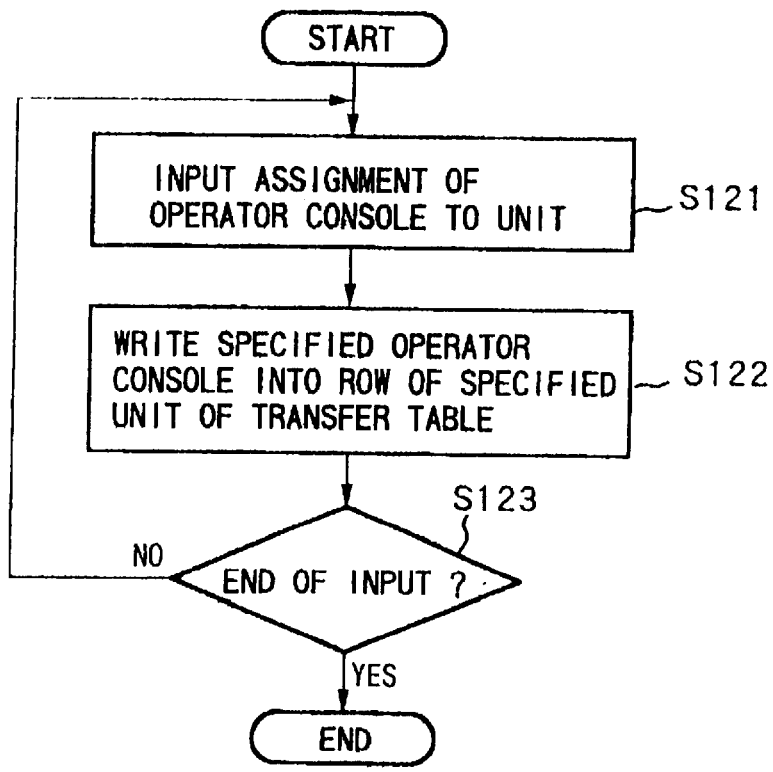
FIG. 27 is a flow chart of the operation for determining assignment according to a transfer table.

FIG. 27 is a flow chart of the operation for determining an assignment according to a transfer table.

In the initial state, the operator console column is initialized to be empty.

At step S121, an input for instructing an assignment of an operator console to a unit is received from an operator. At step S122, the identifier of the specified operator console is entered into the row of the specified unit in the transfer table. At step S123, a judgment is made as to if there is still input for assignment. If there is, the routine returns to step S121.

Figure 28:
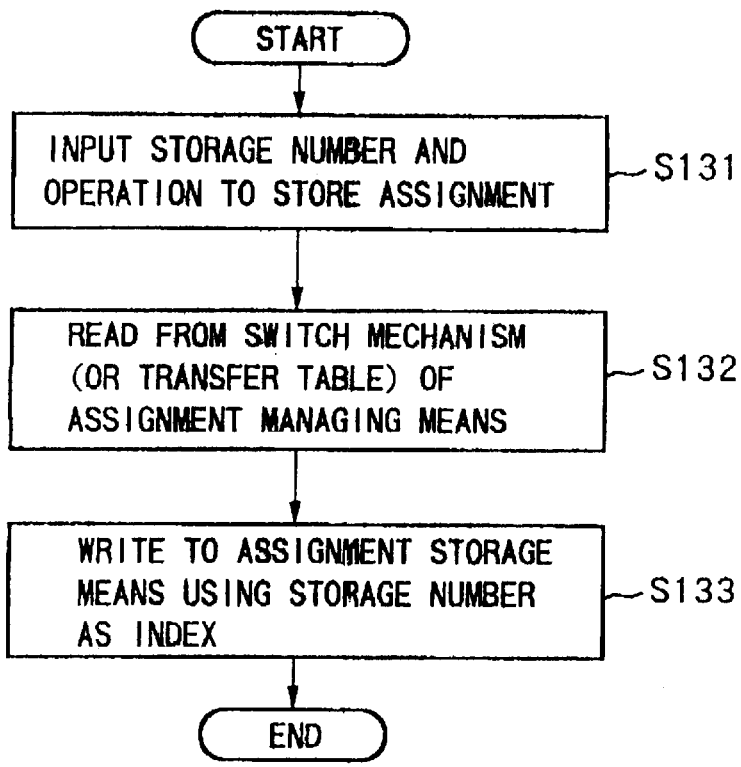
FIG. 28 is a flow chart of the operation in which the assignment managing means stores an assignment of an operator console.

FIG. 28 is a flow chart of the operation by which the assignment managing means 172 stores an assignment of an operator console.

At step S131, input of a storage number is received from an operator. Input for instructing storage of the assignment is also received. At step S132, if the switching mechanism of the assignment managing means 172, namely, the matrix switch, is used, the states of intersections are read. If software is used for exchange, the current assignment is read from the transfer table. At step S133, the contents read at step S132 are written into the assignment storage means 173 with the storage number as an index.

Figure 29:
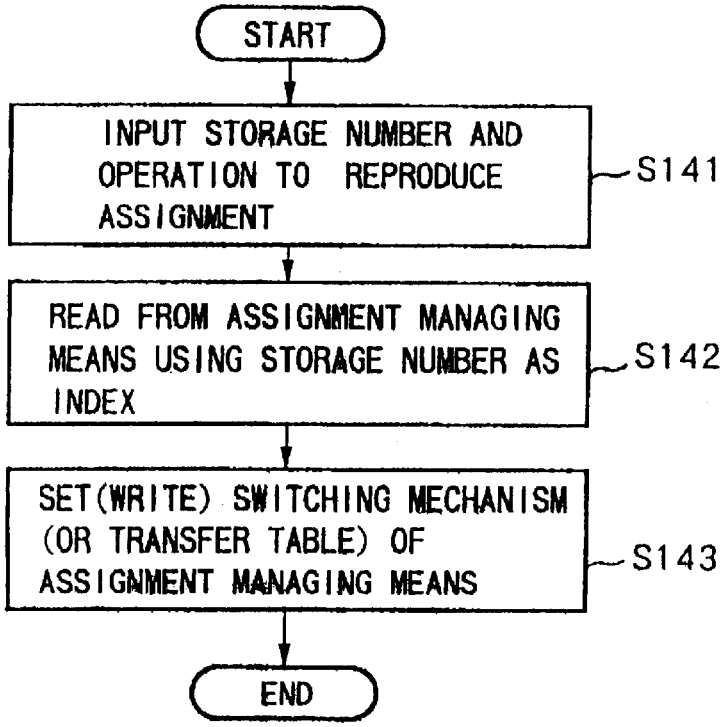
FIG. 29 is a flow chart of the operation in which the assignment managing means reproduces an assignment of an operator console.

FIG. 29 is a flow chart of the operation by which the assignment managing means 172 reproduces assignment of an operator console.

At step S141, input of a storage number is received from an operator. Input for instructing reproduction of assignment is also received. At step S142, the assignment is read from the assignment storing means 173 with the storage number as an index. At step S143, the switching mechanism (matrix switch or transfer table) of the assignment managing means 172 is set according to the content read at step S142.

Figure 30:
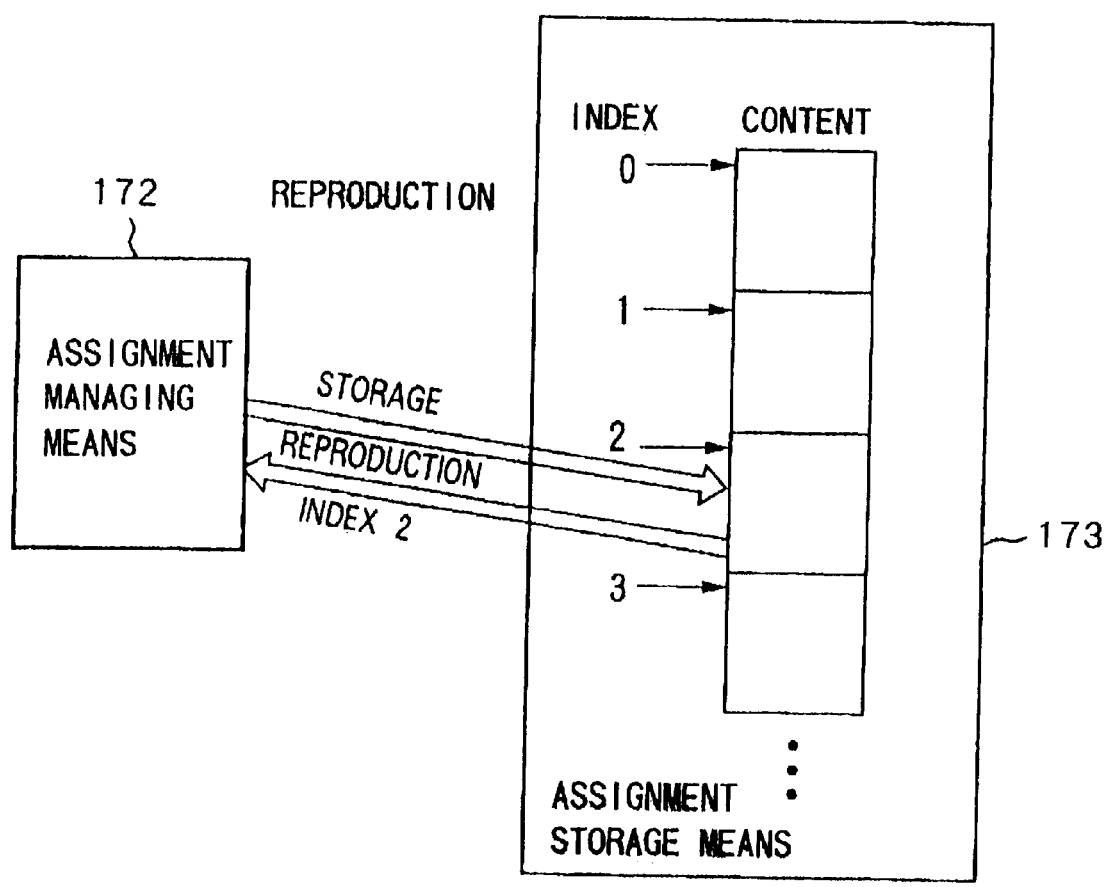
FIG. 30 is a view illustrating the processes of storing and reproducing assignments.

FIG. 30 is a view illustrating the processing for storing and reproducing an assignment.

The assignment storing means 173 stores a plurality of assignments in an array and can be accessed by indexes. The assignment managing means 172 accesses the inside of the assignment storing means 173 by indexes for storage or reproduction.

According to the third embodiment, the correspondence between video signal processing units and operator consoles is not fixed and can be changed freely using the assignment managing means 172. By simultaneously storing and reproducing for use assignments of operator consoles when storing and reproducing for use the settings of the matrix switch at the location where the video signal processing apparatus is operated, the work involved in assigning operator consoles can be eliminated. Further, by just reproducing the previously stored contents of the assignment storing means when changing assignment of the operator consoles according to the number of operators, it is possible to quickly deal with the situation.

Fourth Embodiment

Figure 31:
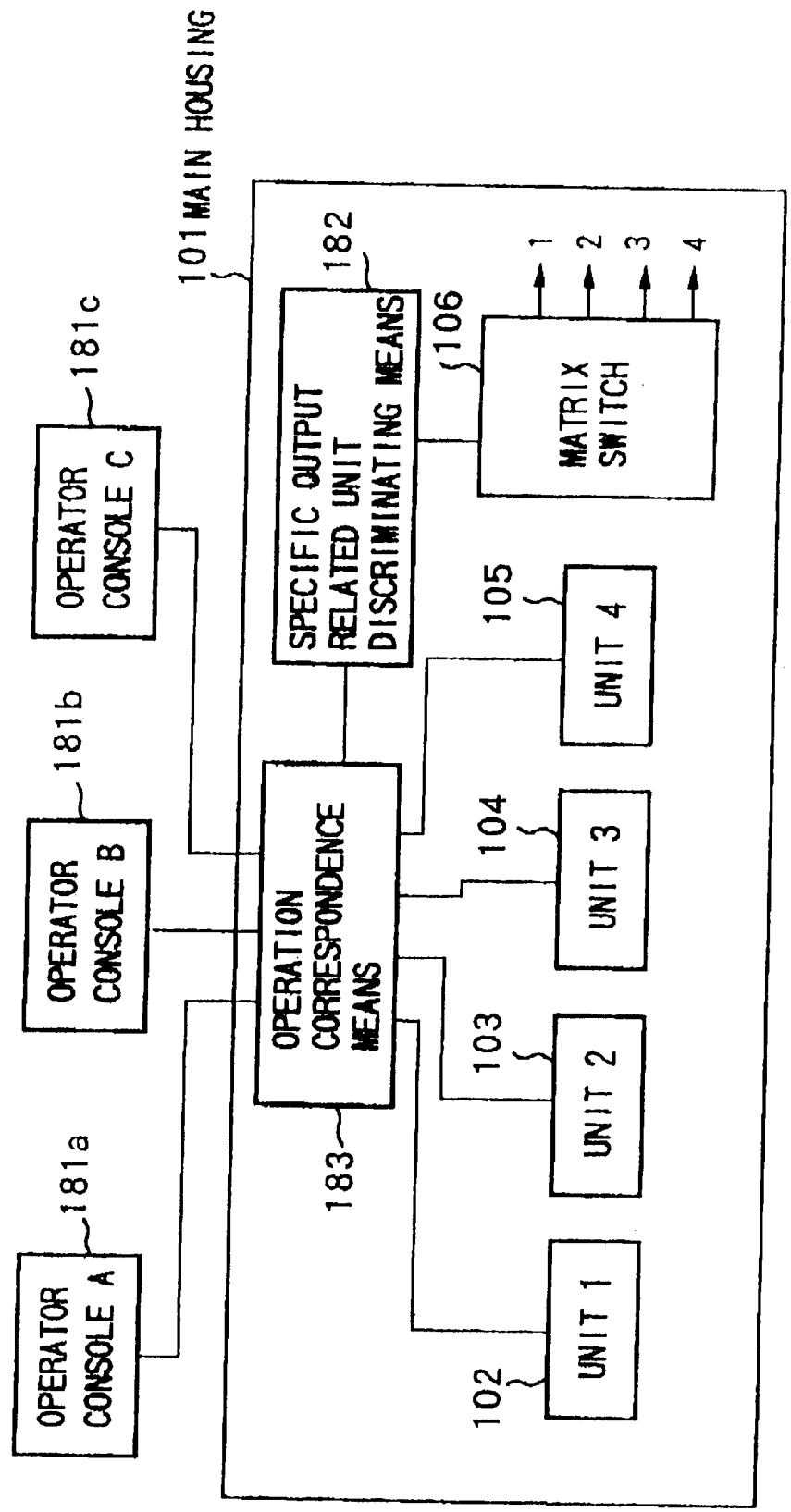
FIG. 31 is a schematic view of the characterizing portion of a fourth embodiment.

FIG. 31 is a schematic view of the characterizing portion of a fourth embodiment.

The video signal processing apparatus according to the fourth embodiment comprises a number of operator consoles 181a, 181b, and 181c outside the main housing 101 and a specific output related unit discriminating means 182 and an operation correspondence means 183 inside the main housing 101.

The operator consoles 181a, 181b, and 181c provide functions for operating the units 102, 103, 104, and 105 in the video signal processing apparatus. The specific output related unit discriminating means 182 distinguishes the video signal processing units arranged in paths leading to each output channel. The operation corresponding means 183 establishes correspondence of operator consoles 181a, 181b, and 181c to the output channels. Namely, the operation corresponding means 183 assigns the operator consoles 181a, 181b, and 181c to a unit relevant to a certain output channel for operation.

Figure 32:
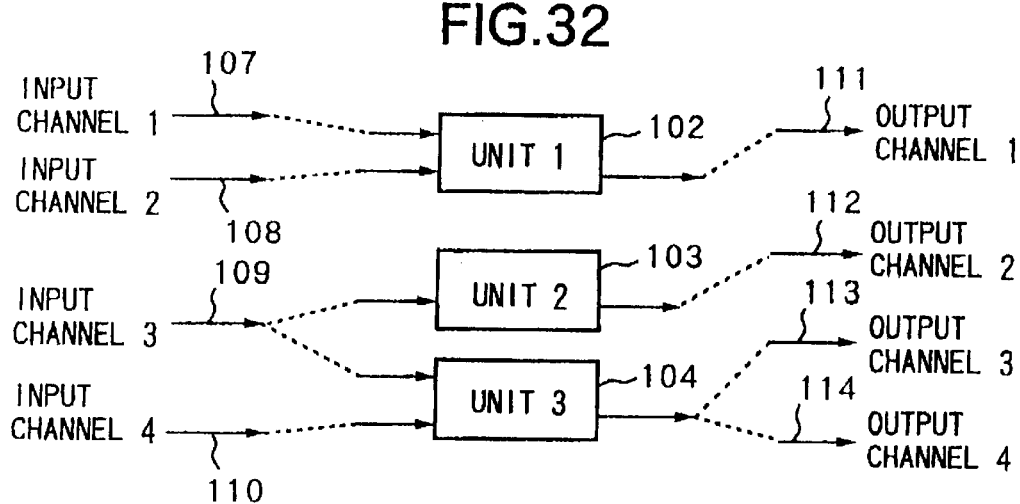
FIG. 32 is a view of an example of a path leading to an output channel.

FIG. 32 is a view of an example of paths leading to output channels.

The connections shown by the broken lines in the figure are the connections made by the matrix switch 106.

In FIG. 32, the unit relevant to the output channel 111 is unit 102, accordingly, if the operator console 181a is set to correspond to the output channel 111, the operation of the unit 102 is assigned to the operator console 181a.

The specific output related unit discriminating means 182 and the operation correspondence means 183 are comprised of microcomputers.

Figure 33:
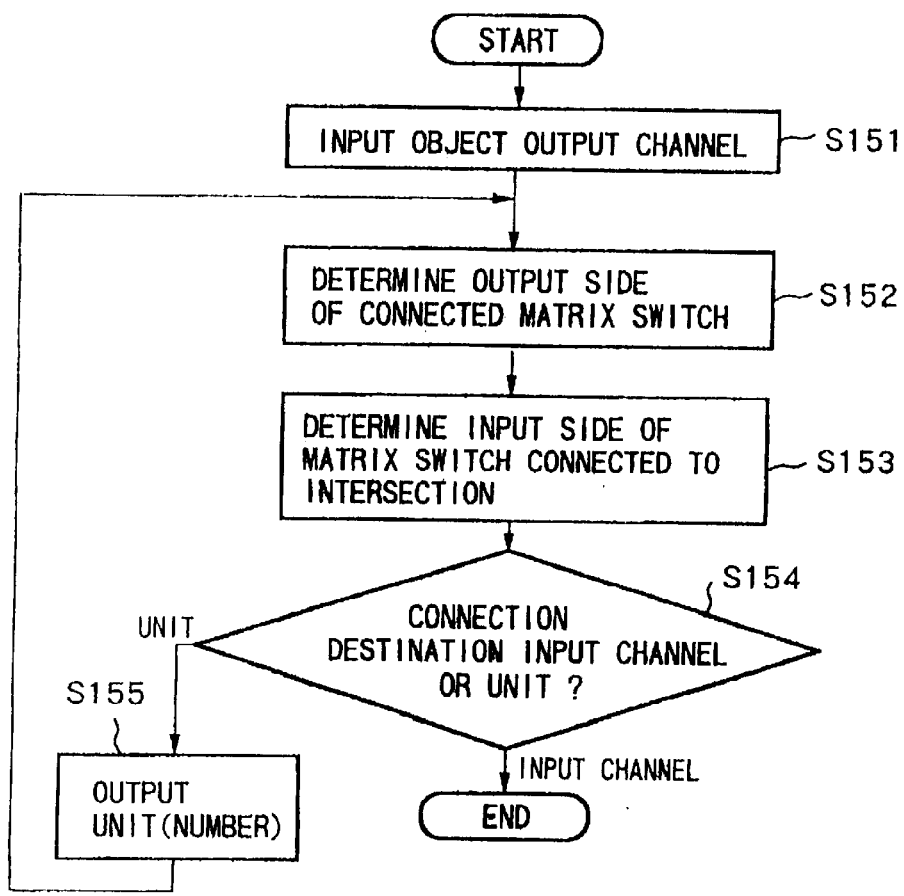
FIG. 33 is a flow chart of the function of the specific output related unit discriminating means.

FIG. 33 is a flow chart of the functions of the specific output related unit discriminating means.

At step S151, an input of an object output channel is received. At step S152, the output side of the matrix switch 106 connected to the starting position (the output channel that is first input) is determined. At step S153, the connected input side of the matrix switch 106 is determined. At step S154, it is checked if the input side is connected to an input channel. If it is, the processing ends. If is not, namely, the input side is connected to a unit, the routine proceeds to step S155. At step S155, the number of the unit being connected is output. Then, the routine takes note of the input side of the unit and moves to step S152.

If a unit has a number of inputs, the processing from step S152 in FIG. 33 is repeated for each input. All units concerned are specified.

Figures 34, 35:
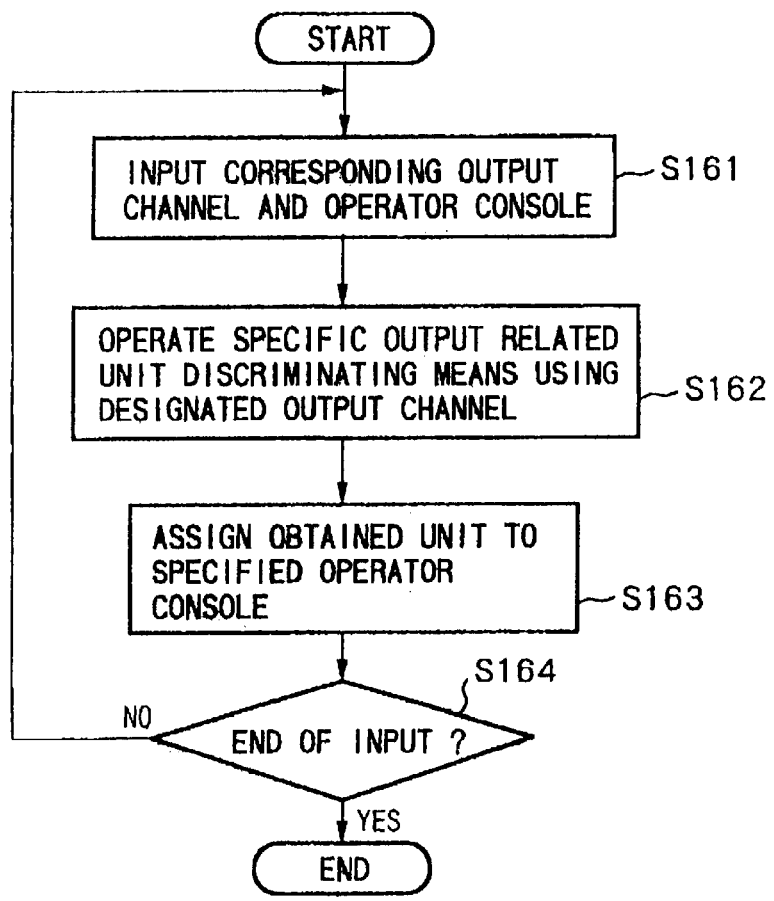
FIG. 34 is a flow chart of the operation of the operation correspondence means.
FIG. 35 is a view of an example of units influencing output channels.

FIG. 34 is a flow chart of the operation of the operation correspondence means 183.

At step S161, input of an operator console and the corresponding output channel is received from an operator. The input means may be provided on an operator console, and communication from there taken by the operation correspondence means 183.

At step S162, the specified output channel of step S161 is input to the specific output related unit discriminating means 182 to make it operate as shown in FIG. 33. At step S163, units are obtained as a result and the operator console specified at step S161 is assigned to these units. At step S164, a judgment is made as to if there is still input. If there is (establishing correspondence), the routine returns to step S161.

FIG. 35 is a view of examples of units influencing output channels.

This table shows examples of units that influence the output channels for the paths presented in FIG. 32. N in the table stands for no relation, units that have "1" in the rows of the output channels are those which influence the output channels.

FIG. 36 is a view of an example of the correspondence between operator consoles and output channels.

In the examples shown in FIG. 36, the output channel 111 (output channel 1) corresponds to the operator console 181a (operator console A), the output channel 112 (output channel 2) corresponds to the operator console 181b (operator console B), and the output channels 113 (output channel 3) and 114 (output channel 4) correspond to the operator console 181c (operator console C).

Here, comparing the tables in FIGS. 35 and 36, it is found that the operator console 181a (operator console A) is assigned for operation of the unit 102 (unit 1), the operator console 181b (operation B) is assigned for operation of the unit 103 (unit 2), and the operator console 181c (operation C) is assigned for operation of the unit 104 (unit 3).

FIG. 37 is a view of another example of the correspondence between operator consoles and output channels.

As shown in FIG. 37, a number of operator consoles are able to be set corresponding to the same output channel. In the example in this figure, for example, the output channel 111 (output channel 1) is set to correspond to two operator consoles 181a and 181b (operator console A and operator console B).

According to the above fourth embodiment, operator consoles are able to be assigned to control videos of specific output channels. Because the purpose of operation of the units is to generate videos, reasonable assignments can be realized easily.

Fifth Embodiment

Figure 38:
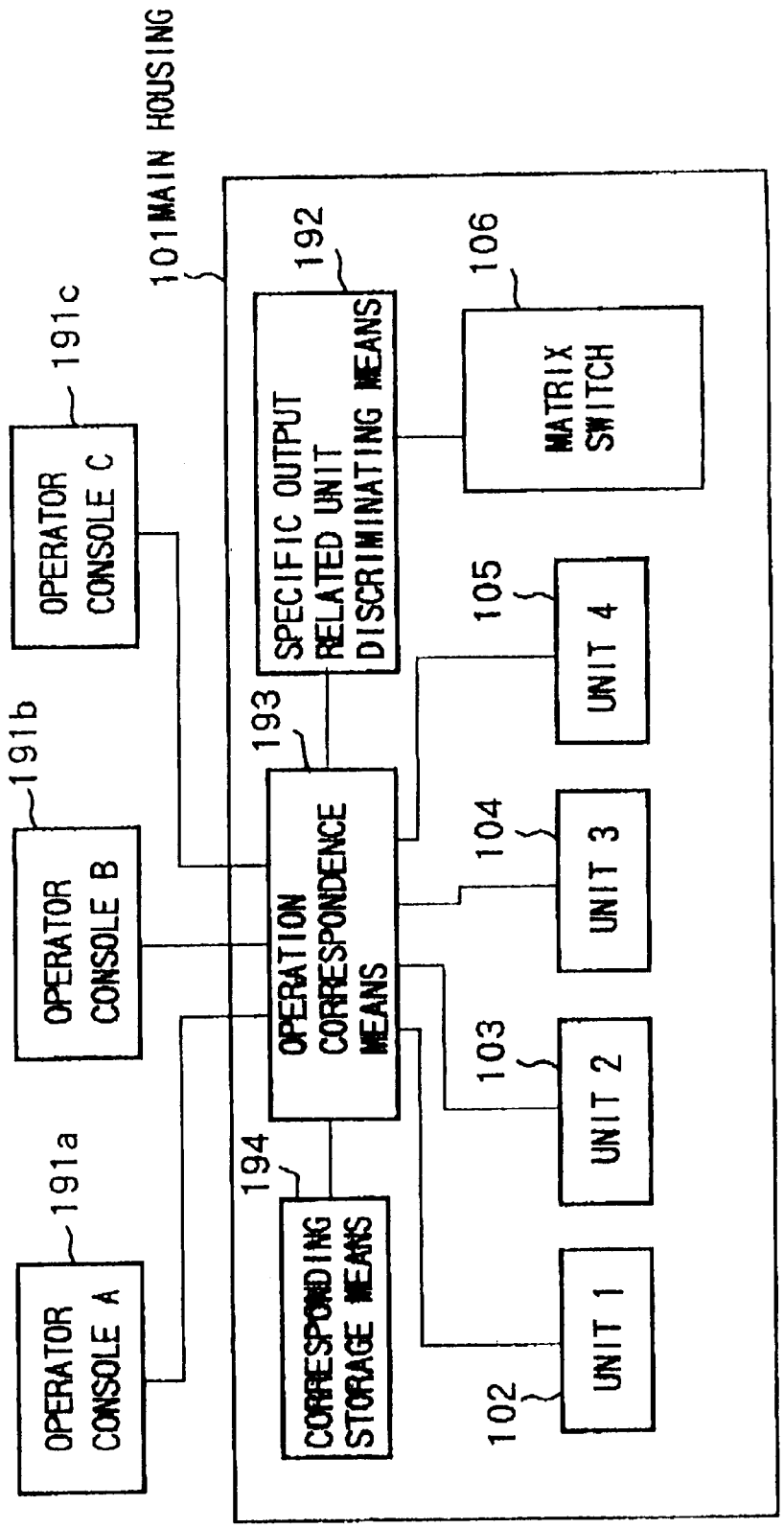
FIG. 38 is a view of a characterizing portion of a fifth embodiment.

FIG. 38 is a schematic view of the characterizing portion of a fifth embodiment.

A video signal processing apparatus according to the fifth embodiment comprises a number of operator consoles 191a, 191b, and 191c outside the main housing 101 and a specific output related unit discriminating means 192, an operation corresponding means 193, and a correspondence storing means 194 inside the main housing 101. In the present embodiment, a correspondence storing means is provided in addition to the components in the fourth embodiment.

The correspondence storing means 194 stores the correspondence between operator consoles and output channels. As an example of the contents stored by the correspondence storing means 194, for example, illustration can be made of the correspondence table shown in the aforesaid FIG. 36. By storing a number of such correspondences in an array, the correspondence between the operator consoles and the output channels can be accessed by an index.

Figure 39:
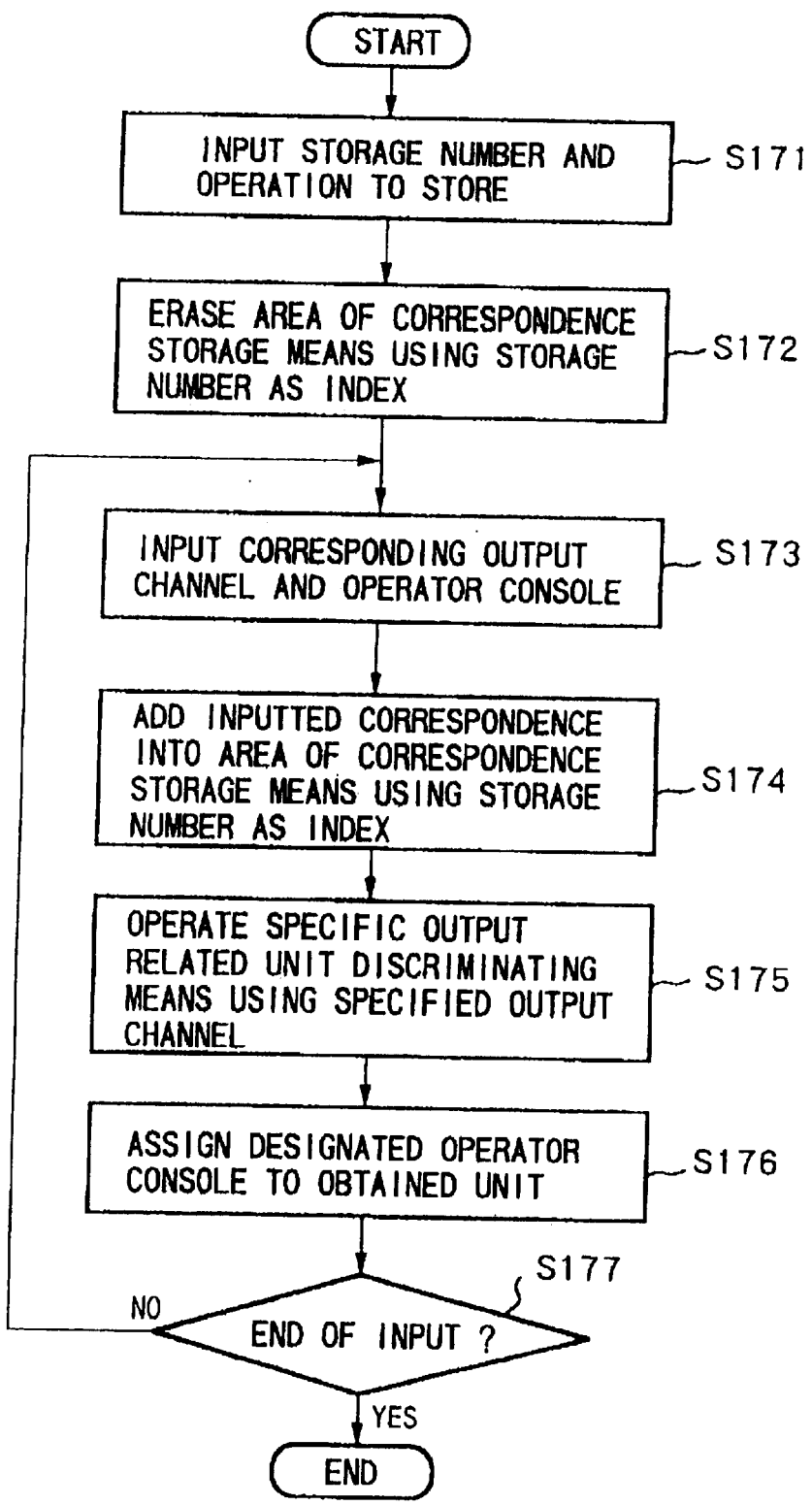
FIG. 39 is a flow chart of operation in which the operation correspondence means stores correspondence in the correspondence storage means.

FIG. 39 is a flow chart of the operation for storage from the operation corresponding means 193 to the correspondence storing means 194.

At step S171, input of a storage number is received from an operator. Input of an instruction for storage is received as well. The input means may be provided on an operator console, and the operation corresponding means 193 may be used to receive communications therefrom.

At step S172, the correspondence storing means 194 is accessed using the storage number as an index, and the area in question is initialized (erased).

At step S173, input for operating an operator console and the corresponding output channels is received from the operator. The input operation may be performed from an operator console just as at step S171.

At step S174, the correspondence input at step S173 is written into the suitable area of the correspondence storing means 194 with the storage number as an index.

At step S175, a specified output channel is input to the specific output related unit discriminating means 192 to make it operate. At step S176, a specified operator console is assigned to the unit obtained as the result of step 175. At step S177, a judgment is made as to if the input operation to the pair of the operator console and output channel is finished. If there is still input, the routine proceeds to step S173. If not, the processing ends.

Figure 40:
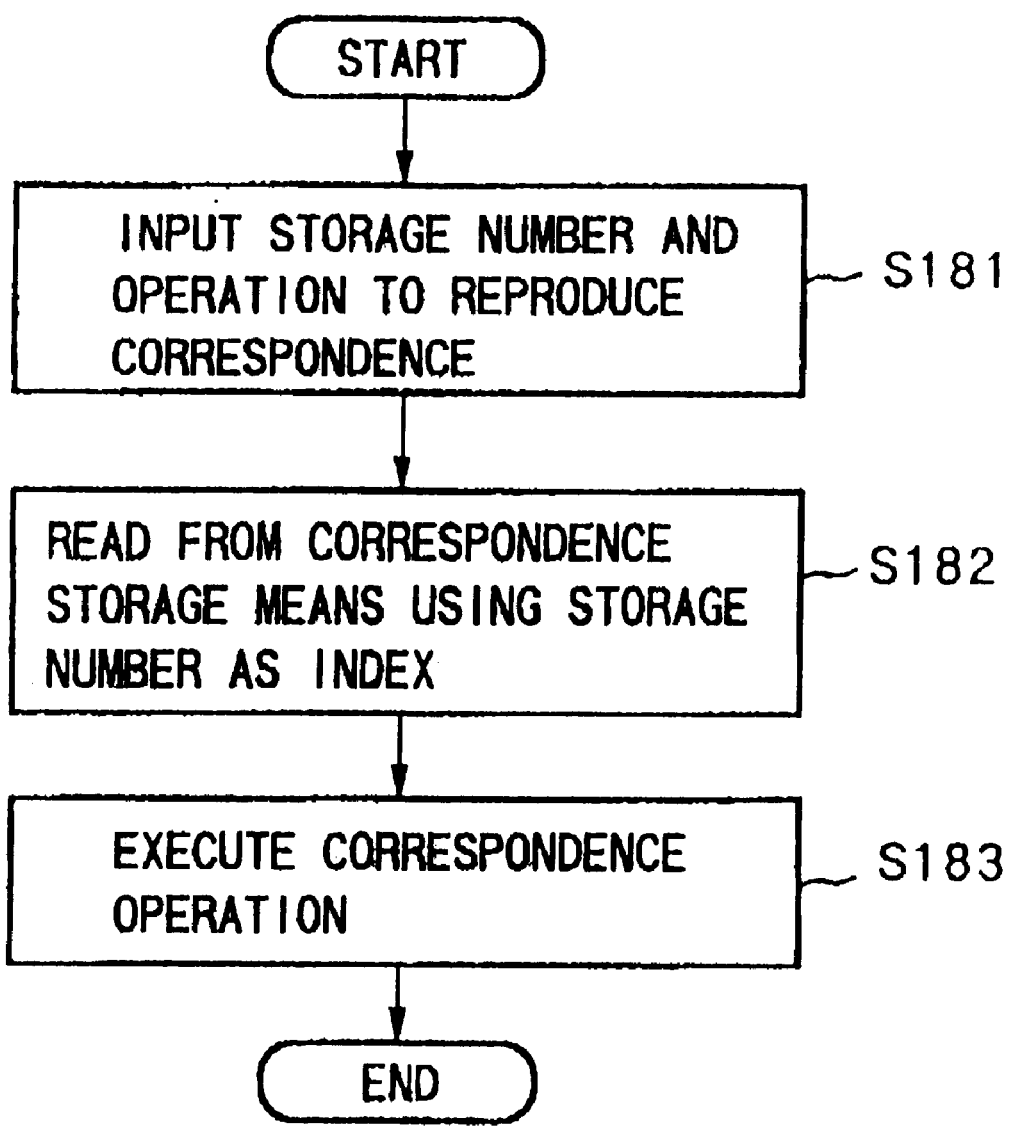
FIG. 40 is a flow chart of the operation in which the operation correspondence means reproduces correspondence from the correspondence storage means.

FIG. 40 is a flow chart of the operation by which the operation corresponding means 193 reproduces correspondence from the correspondence storing means 194.

At step S181, input of a storage number is received from an operator. At step S182, the correspondence is read from the correspondence storing means 194 with the storage number as an index. At step S183, an operator console is assigned in accordance with the read correspondence.

Examples of the correspondence stored in the correspondence storing means 194 include those shown in FIG. 36 and FIG. 37.

According the fifth embodiment described above, when desiring to use a video signal processing apparatus by the original correspondence between output channels and operator consoles again after using it by a configuration for another application, the correspondence previously stored in the correspondence storing means 194 is read and the operation corresponding means 193 operated.

In addition, by making the correspondence storing means 194 store a plurality of correspondences, even when a plurality of correspondences are used repeatedly, the desired correspondence can be obtained by selecting and specifying the stored information.

Sixth Embodiment

The sixth embodiment relates to a modification of the operation of the operation correspondence means 183 in the configuration of the fourth embodiment described previously. Namely, in the sixth embodiment, when establishing corresponding between the operation of units influencing a certain output channel and operator consoles, the correspondence is not set for all units from one operator console, but divided among a number of operator consoles in units of units.

Figure 41:
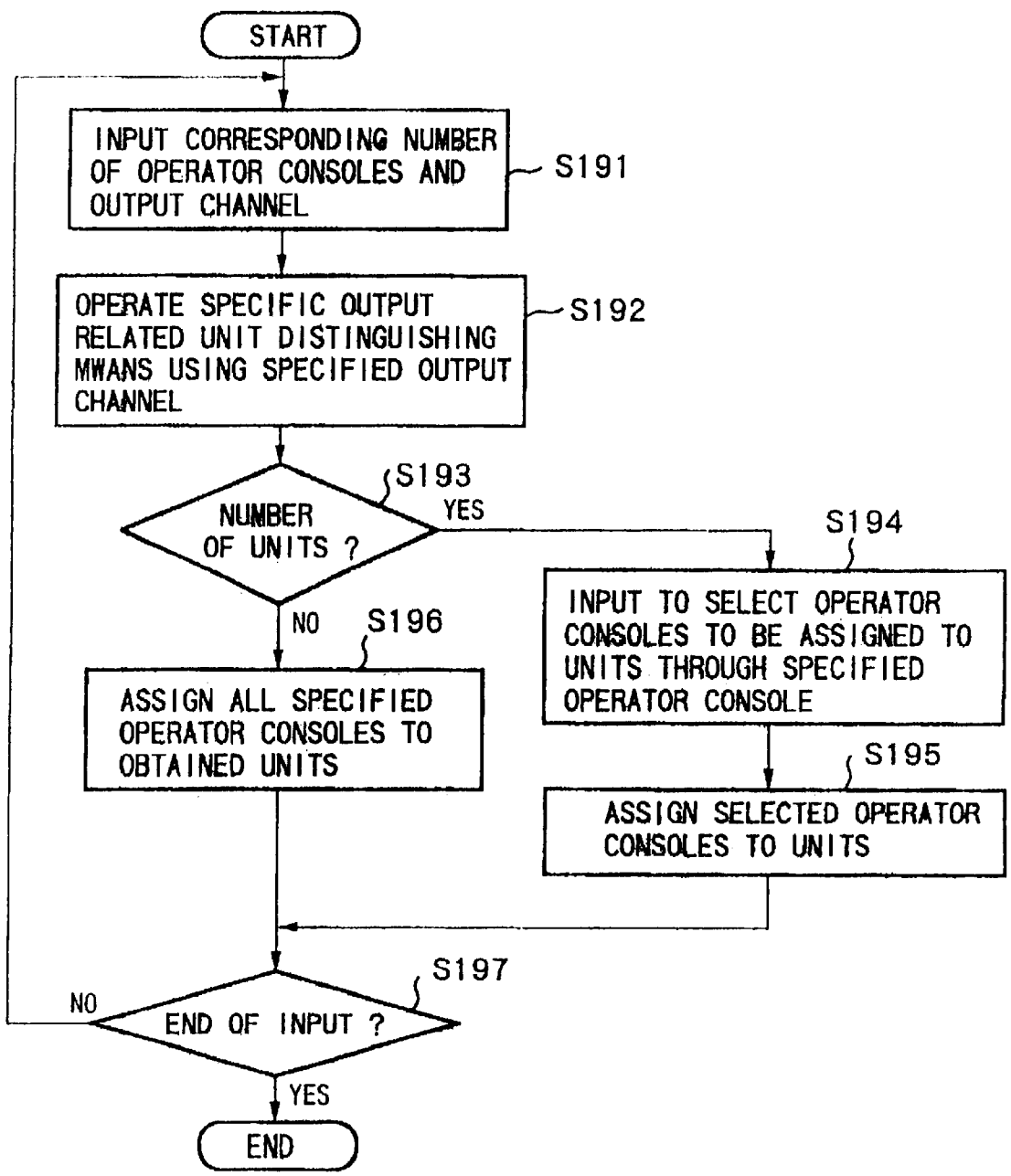
FIG. 41 is a flow chart of the operation of the operation correspondence means for establishing correspondence.

FIG. 41 is a flow chart of the operation of the operation corresponding means for establishing correspondence.

At step S191, input of at least one operator console and the output channel is received from an operator. The input means may be provided on an operator console, and the operation corresponding means 183 may be used to receive the communications therefrom.

At step S192, the output channel specified at step S191 is input to the specific output related unit discriminating means 182 to make it operate as shown in FIG. 33. At step S193, a judgment is made as to if there are several units obtained. If just one, the routine proceeds to step S196, and all the specified operator consoles are assigned to the unit.

If there are several units that influence the output channel, the routine proceeds to step S194 from step S193. At step S194, the operator is made to input which of the operator consoles input formerly should be assigned to each of those units. At step S195, operator consoles are assigned to units according to the input at step S194.

At step S197, a judgment is made as to if the input of the operator is finished. If there is still input (establishing correspondence), the routine returns to step S191. If not, the operation for establishing correspondence by operator consoles ends.

Next, an example of assignment of the results of the operations in the sixth embodiment will be shown.

Figure 42:
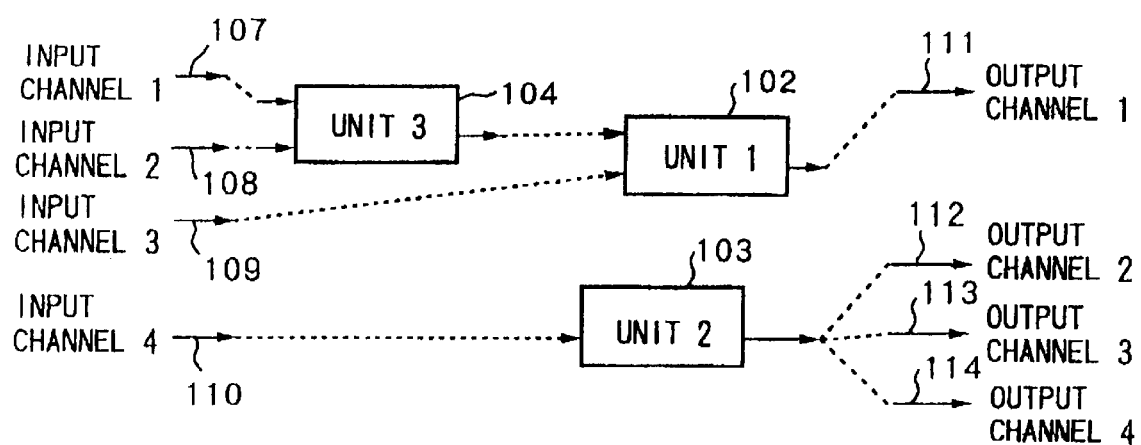
FIG. 42 is a view showing another example of paths leading to output channels.

FIG. 42 is a view of another example of paths leading to each output channel. FIG. 43 is a view of another example of units influencing output channels.

In the table of FIG. 43, units influencing output channels are shown in the columns with a number. The numbers represent the order counted from the output side. Since these numbers themselves are not be used later, the same numbers are used for each output channel.

FIG. 44 is a view of an example of correspondence of a number of operator consoles.

FIG. 44, corresponding to FIG. 43, shows an example of establishing correspondence for a number of operator consoles. According to the example in the figure, two operator consoles 181a and 181b (operator consoles A and B) are set corresponding to the output channel 111 (output channel 1), and the operator console 181c (operator console C) is set corresponding to the output channels 112, 113, and 114 (output channel 2, output channel 3, and output channel 4). Since the output channel 111 (output channel 1) is related to the units 102 and 104 (unit 1, unit 3), the operator console 181a (operator console A) is assigned to the unit 102 (unit 1), and the operator console 181b (operator console B) is assigned to the unit 104 (unit 3).

Here, although two units are shown related to an output channel, the same applies even with a greater number. It is also possible to assign these larger numbers of units to one operator console.

According to the operation of the operation corresponding means as described in FIG. 41 above, the objects to be assigned to operator consoles are limited to units influencing specified output channels and assignment to part of these units is enabled.

Due to the above assignment, control relevant to a path is shared by a number of operator consoles. This enables easier realization of a more user-friendly environment as compared with assigning a number of operator consoles without any standard.

Seventh Embodiment

The seventh embodiment relates to a modification of the operation of the assignment managing means 172 in the configuration of the third embodiment described previously. It is given the function enabling operator consoles to be assigned to units according to their functions.

Figure 45:
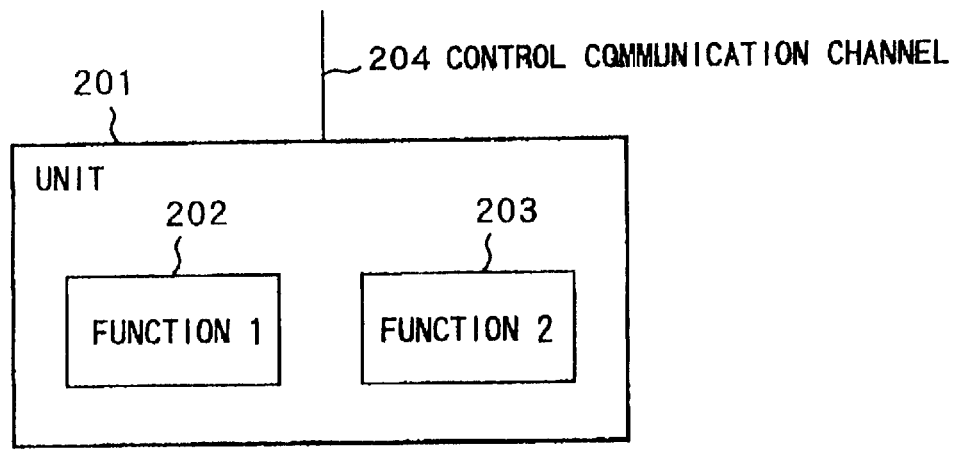
FIG. 45 is a view illustrating the plurality of functions in a unit.

FIG. 45 is a view illustrating a plurality of functions in a unit.

The unit 201 in FIG. 45 can be controlled by dividing unit 201 into two functions. Reference numerals 202 and 203 in the figure represent two functions of the unit 201.

The unit 201 is controlled by a microcomputer operated communicating with the control communications channel 204. The two tasks running in the CPU thereof correspond to the function 202 (function 1) and function 203 (function 2).

Alternatively, even the functions 202 and 203 are not separate as tasks, and therefore it is possible to connect different hardware (ports) to each function of the microcomputer and differentiate them.

Alternatively, the functions 203 and 204 may be independent inside the unit even if not from the viewpoint of the CPU. For example, the control communications channel may be connected to an internal bus after the necessary conversion, a number of hardware connected to the inner bus, one used for switching operation, one used for writing data, and so on. This is also covered by the present invention.

The present embodiment relate to a physically single unit that is controlled divided according to a number of functions thereof.

Figure 46:
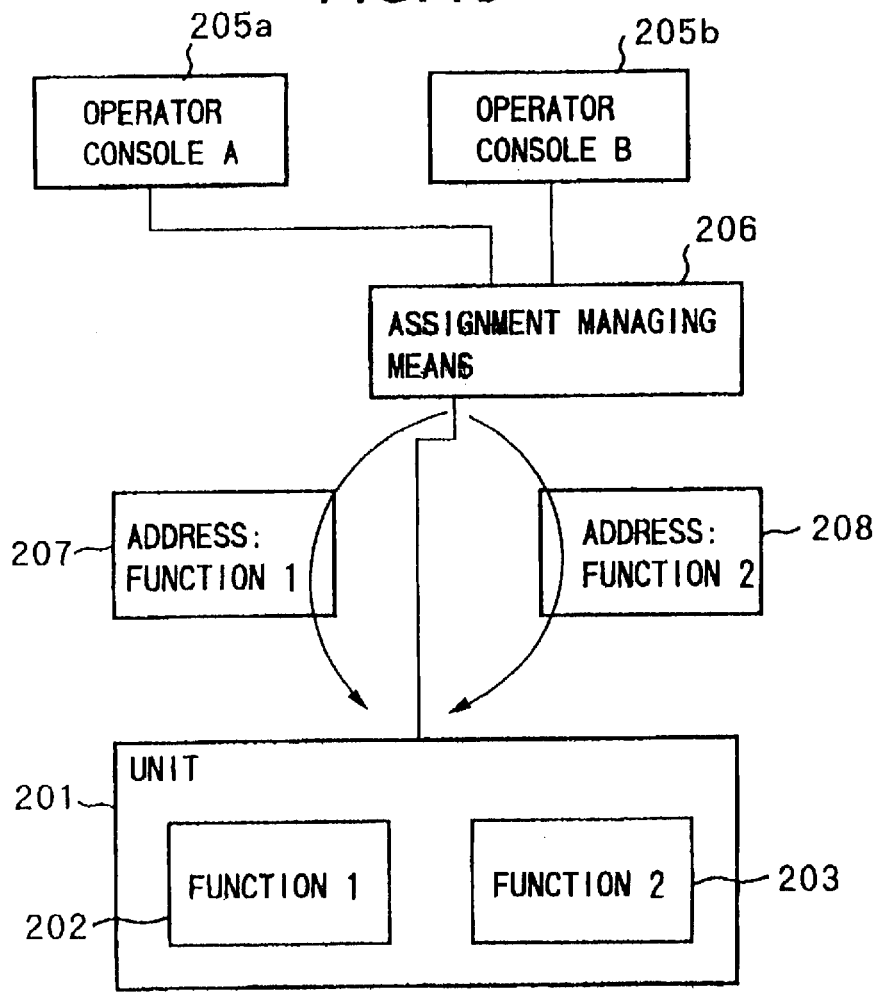
FIG. 46 is a view illustrating the plurality of functions in a unit, the assignment of operator consoles thereto, and the control communication thereof.

FIG. 46 is a view illustrating the plurality of functions in a unit, the assignment of operator consoles thereto, and the control communications thereof.

For example, two operator consoles 205a and 205b (operator consoles A and B) are connected to the assignment managing means 206, respectively. The assignment managing means 206 assigns each of the operator consoles 205a and 205b to the unit 201 or to the functions 202 and 203 in the unit 201. Reference numerals 207 and 208 show the image of contents of the control communication. Reference numeral 209 represents the communication channel from the assignment managing means 206 to the unit 201.

Here, assume the assignment managing means 206 assigns the operator console 205a (operator console A) to the function 202 (function 1) in the unit 201 and assigns the operator console 205b (operator console B) to the function 203 (function 2) in the unit 201. The assignment managing means 206, according to these assignments, sends communication from the operator console 205a to the function 202 and from the operator console 205b to the function 203.

Communication from the operator console 205a is transmitted to the unit 201 through the communication channel 209 as the contents of the control communication 207, but the assignment managing means 206 adds "function 1" as an address to its start. Similarly, communication from the operator console 205b, as the content of the control communication 208, is appended with "function 2" as an address to its start.

When the unit 201 receives the contents of control communication, the address written at its start is read, a judgment is made as to which function the communication is for, and the contents of control communication are routed according.

Similarly, communication from a function of the unit 201 to an operator console also includes information showing the source of transmission and is transmitted to the proper operator console by the assignment managing means 206.

Figures 47, 48:
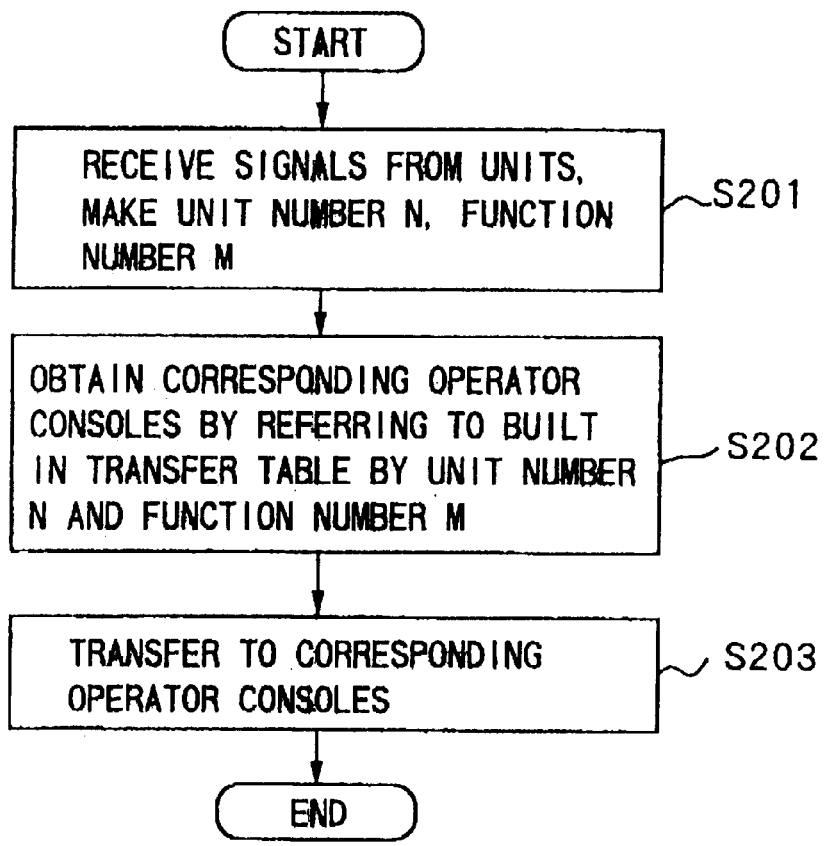
FIG. 47 is a view of an example of a transfer table built in an assignment managing means.
FIG. 48 is a flow chart of the processing in the assignment managing means for transmitting to an operator console from a unit.

Next an explanation will be given of exchange of control communications for assignments by the assignment managing means FIG. 47 is a view of an example of a transfer table built in an assignment managing means.

According to this transfer table, there are three units. Function 1 and function 2 are assigned to the unit 1, function 1, function 2, and function 3 are assigned to the unit 2, and function 1 is assigned to the unit 3. Operator consoles are assigned to these functions. There are three operator consoles A, B, and C. The operator console A is assigned to the function 1 of the unit 1, while the operator console B is assigned to the function 2. The operator console A is assigned to the function 1 of the unit 2, the operator console B is assigned to the function 2, and the operator console B is assigned to the function 3. Further, the operator console C is assigned to the function 1 of the unit 3.

In this example, the same operator console is assigned to a number of functions, but depending on the configuration, all the functions may also be assigned to different operator consoles.

FIG. 48 is a flow chart of the processing in which transmission from units to operator consoles is processed by the assignment managing means.

At step S201, data is received from a unit. The unit number of the source of transmission is made N, and the function number is made M. At step S202, the transfer table is referred to using N and M, and the corresponding operator consoles are obtained. At step S203, the received contents at step S201 are transmitted to the obtained operator consoles.

FIG. 49 is a flow chart of the processing in which transmission from operator consoles to units is processed by the assignment managing means.

At step S211, data is received from an operator console. The operator console identifier of the source of transmission is made S. At step S212, the transfer table is referred to using S, and the corresponding unit and function numbers are obtained. At step S213, numbers functioning as an address are appended to the transmission data. At step S214, data is transmitted to the corresponding unit.

The assignment storing means stores the assignments to the operator consoles and functions. These can be reproduced later by the assignment managing means. The information stored has the same content as the transfer table shown in FIG. 47. The operations of storage and reproduction are the same as the third embodiment.

According to the seventh embodiment described above, even there are a number of independent functions in a unit, operator consoles can be assigned to the functions to create a more user-friendly environment. Further, by storing and reproducing the assignments, the work of repeat assignment can be eliminated.

Eighth Embodiment

FIG. 50 is a schematic view of the characterizing portion of an eighth embodiment.

In FIG. 50, a matrix control console 211 is provided outside the main housing 101, and a connection storing means 212 inside the main housing 101. The matrix control console 211 provides functions of operations for controlling the intersections of the matrix switch 106. Here, a user interface is provided using a graphical user interface (GUI).

The connection storing means 212 stores and holds the destinations connected to inputs and outputs of the matrix switch 106. The connection destinations are inputs and outputs of units or the input channels or the output channels.

FIGS. 51A and 51B are views of examples of the stored contents of the connection storing means 212, where FIG. 51A shows an example of connection destinations of input and FIG. 51B shows an example of connection destinations of output.

According to the examples of the stored contents shown in FIGS. 51A and 51B, the matrix switch 106 has 10 inputs s0 to s9. The connection destinations for each of them are stored. As s9 has no connection destination, NONE is stored.

Similarly, the matrix switch 106 has 10 outputs d0 to d9. The connection destinations for each of them are also stored.

The video signal processing apparatus of the related art had no connection storing means 212. Therefore, to operate the intersections of the matrix switch 106, it was necessary to designate the intersections by name of the inputs and outputs of the matrix 106. For example, it was necessary to select input s4 for output d0 etc.

In contrast, in the present embodiment, by referring to the connection storing means 212, an operation environment easily understood by operators can be provided.

FIGS. 52A and 52B are views of examples of SUI displays of the matrix control console 211, where FIG. 52A shows an example of the input screen for path connection and FIG. 52B shows another example of the input screen for path connection.

FIG. 52A shows the screen for selecting the objects to be connected to the output channel 1. In this input screen, GUI radio buttons 213 are provided. Here, the system is set so that only one of the nine buttons can be selected. In addition, the GUI input button 214 for "CANCEL" and the GUI input button 215 for "CONTINUE" are provided on the input screen. The input button 214 is operated (clicking on the button on the GUI) when canceling processing. The input button 215 is operated when continuing processing.

In the state shown in FIG. 52A, the radio button for the output 1 of the unit 1 is selected. From this, if the input button 215 for "CONTINUE" is clicked, the intersections of the matrix switch 106 are controlled so that the output 1 of the unit 1 is connected to the output channel 1.

According to the example shown in FIG. 51, the output channel 1 is connected to the output d0 of the matrix switch 106, while the output 1 of the unit 1 is connected to the input s4 of the matrix switch 106. Therefore, the intersections are controlled so that the input s4 is connected to the output d0.

FIG. 52B shows a screen for selecting the objects to be connected to the input 2 of the unit 3. The components on the screen are the same as in FIG. 52A.

In FIG. 52B, the input channel 4 is selected. From this, if it is continued, the input channel 4 is connected to the input 2 of the unit 3.

According to the examples shown in FIGS. 51A and 51B, the input 2 of the unit 3 is connected to the output d8 of the matrix switch 106, while the input channel 4 is connected to the input s3 of the matrix switch 106. Therefore, the intersections are controlled so that the input s3 is connected to the output d8.

By providing the connection storing means 212 in this way, a control operation of the matrix switch 106 is possible while displaying the specific connection destinations.

Figure 53:
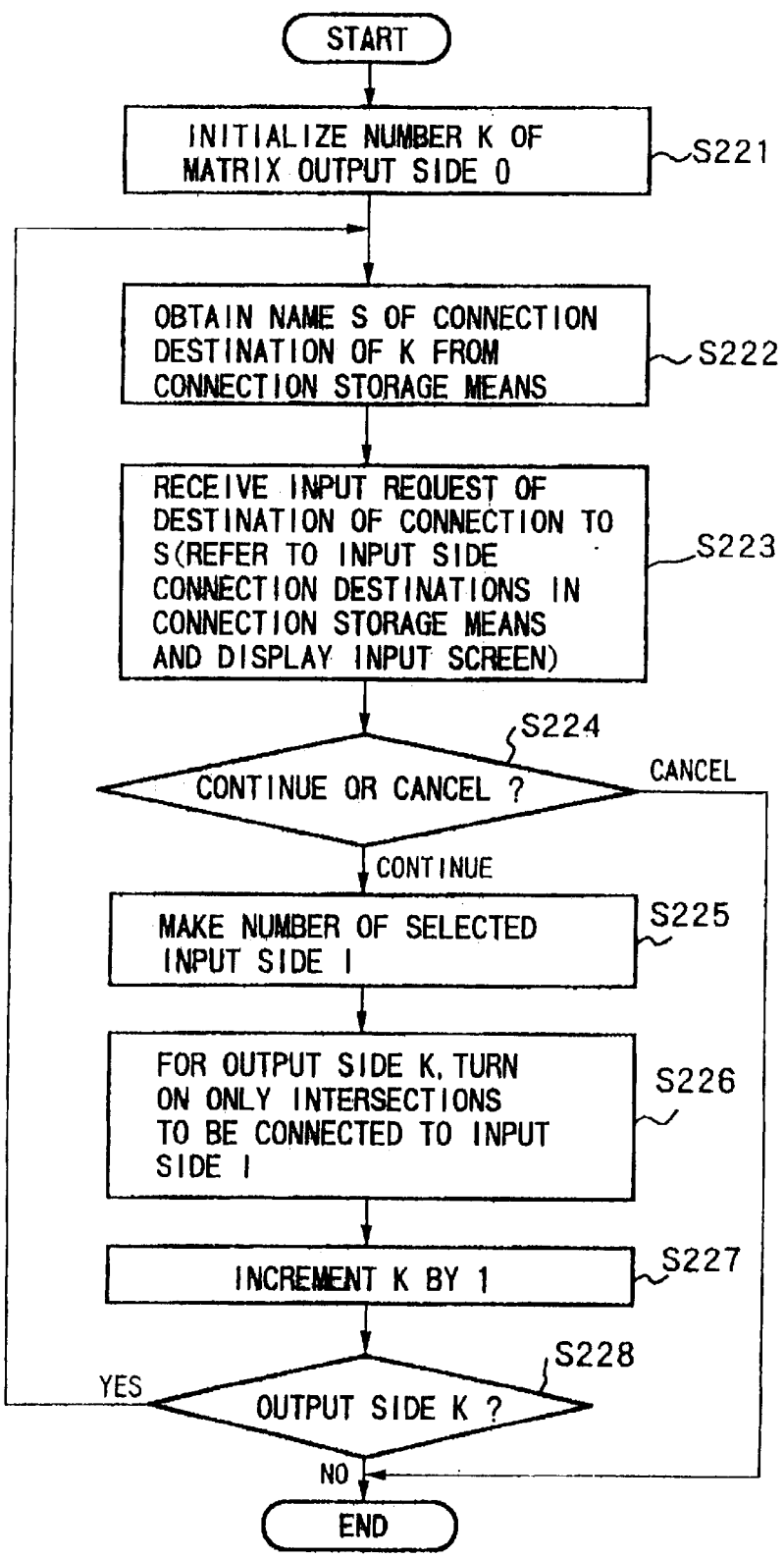
FIG. 53 is a flow chart of the operations of input and control at a matrix control console.

FIG. 53 is a flow chart of the operational input and control operations in a matrix control console.

At step S221, a variable K indicating the number of the output side of the matrix switch 106 is initialized.

At step S222, reference is made to the connection storing means 212 and the name of the destination connected to dK is made S. dK is d0 when K=0.

At step S223, a request of input for connecting to S is received. Namely, all connection destinations of the input side of the connection storing means 212 are referred to and an input screen as shown in FIG. 52 is displayed. In the input screen, for selection of the radio buttons, all destinations on the input side are displayed as candidates. An operator views the display and selects the radio buttons to cancel or continue with the processing.

At step S224, the processing branches into two depending on the whether the "CONTINUE" or "CANCEL" button is clicked. If selecting "CANCEL", the processing ends, while if selecting "CONTINUE", the processing proceeds to step S225.

At step S225, the selected input side is expressed by a number I. For example, in the example in FIG. 51, as s4 is for the output 1 of the unit 1, I becomes 4.

At step S226, the matrix switch 106 is controlled so that only the intersection of the input side I is turned on for the output side K. For example, if K is 0 and I is 4, control should be made so that s4 is connected to d0.

At step S227, K is incremented by 1.

At step S228, a judgment is made as to if the number K on the output side exists. If it does, the processing proceeds to step S222. If it does not, the processing ends. In the examples in FIG. 1 and FIG. 5, since the output side has numbers 0 to 9, the processing ends when K becomes 10. Namely, selection of the input side for all output sides is finished.

According to the eighth embodiment described above, even if the operator has no knowledge of the state of connections of the matrix switch 106, the connection destinations can be selected easily, hence the operability is raised.

In the above explanation, a GUI operation environment is provided for the matrix control console 211, but the present invention is not limited to this. For example, display of characters and functions of selection can also be achieved by combining LEDs etc. used to display character strings in physical switches.

Ninth Embodiment

Figure 54:
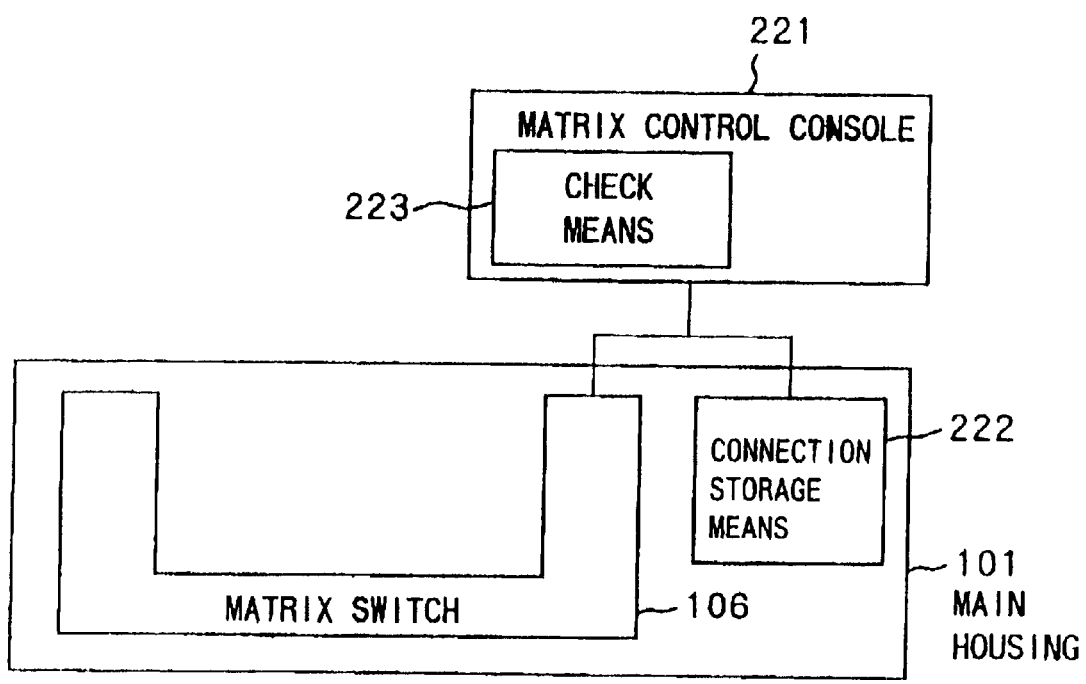
FIG. 54 is a schematic view of the characterizing portion of a ninth embodiment.

FIG. 54 is a schematic view of the characterizing portion of a ninth embodiment.

In FIG. 54, a matrix control console 221 is provided outside the main housing 101 and a connection storage means 222 inside the main housing 101. The matrix control console 211 is provided with a check means 223.

The matrix control console 221 provides functions of operations for controlling the intersections of the matrix switch 106. Here, a GUI (Graphical User Interface) user interface is provided.

The connection storage means 222 stores and holds the destinations connected to inputs and outputs of the matrix switch 106. The connection destinations are inputs and outputs of units or input channels or output channels.

The check means 223 represents a function of the matrix control console 221. It has the function of checking if there is a problem in the paths constructed as a result of control operations of the matrix switch using the matrix control console 221 and giving a warning if there is a problem.

The matrix switch 106 connects its inputs and outputs according to any setting of the matrix. Each output is connected to any of the inputs. By setting the matrix switch, paths in a video signal processing apparatus are constructed.

Not all combinations of settings of the matrix switch 106 lead to correctly operating paths, however. In some cases, there may be settings that do not function and furthermore settings that cause the apparatus to malfunction. For example, if the output of a video signal processing unit having one input and one output is connected to the input through the matrix switch, it will form a complete recurrent loop, will exhibit no function to the outside, and in some cases can break down. Such a setting may occur due to a mistaken control operation.

In the present configuration, the control operation is not executed immediately. The check means checks whether there are problems or not before operation and executes the settings only when there are no problems. If there are any problems, it issues a warning. The check means refers the connection storage means 222, obtains the objects to be connected to the inputs and outputs of the matrix switch 106, decides the paths configured according to the result of control, and performs a check.

Figure 55:
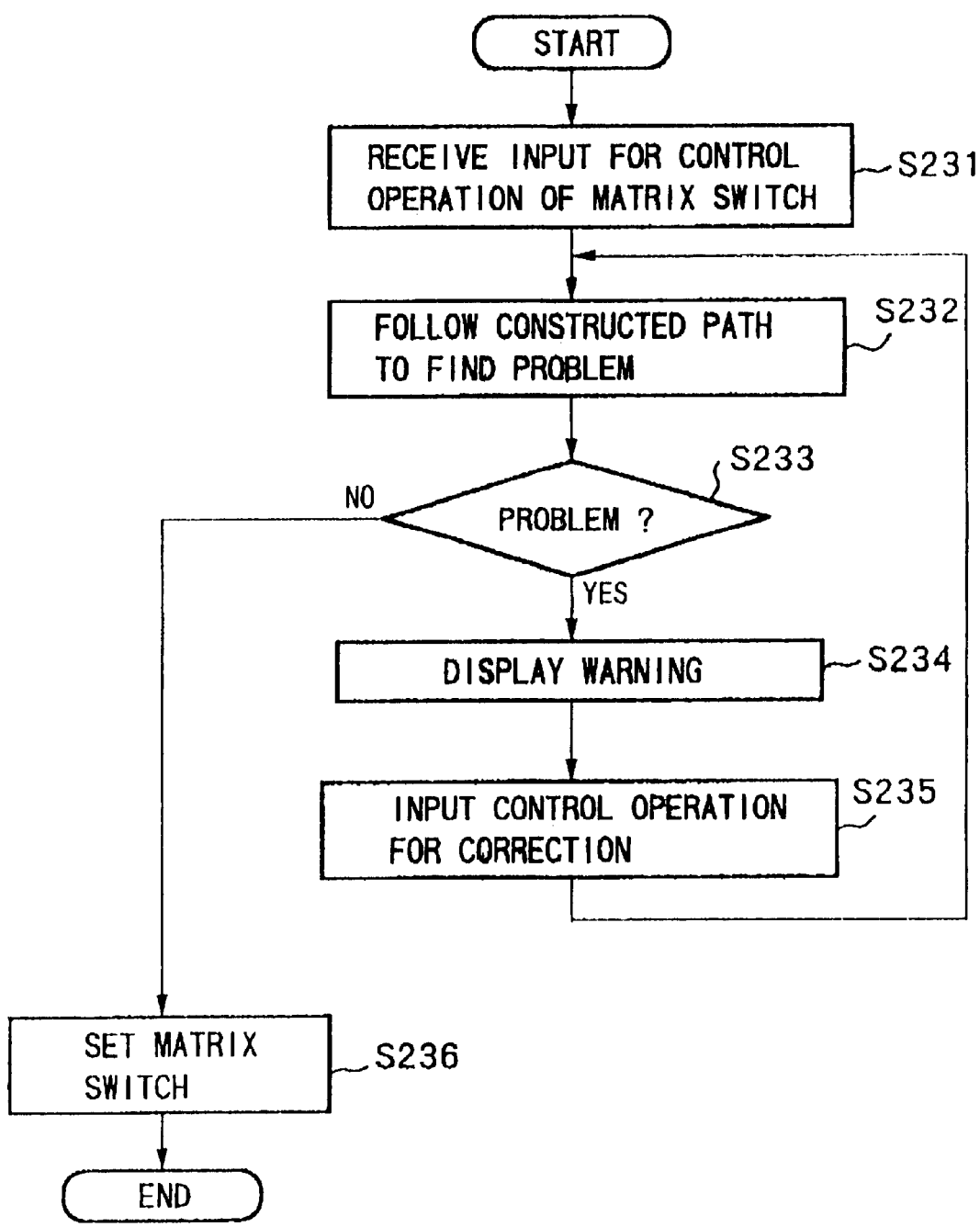
FIG. 55 is a flow chart of the functions of the check means.

FIG. 55 is a flow chart of the functions of the check means 223.

At step S231, a control operation is received from the matrix control console 221. At step S232, the path constructed as a result of the operation is logically followed back to check if there is problem. At step S233, a judgment is made if there is a problem.

If there is no problem, the routine proceeds to the step S236, where the matrix switch 106 is set.

If there is a problem, the routine proceeds to step S234, where a warning is displayed. When using a GUI, a warning screen is displayed. The nature of the warning is displayed by words or images. At step S235, input for a correction operation to deal with the warning is received.

After the correction operation, the routine is repeated from step S232 again. If there is no problem in the constructed paths, at step S236, the matrix switch 106 is set in that way.

There are various kinds of problems warned about depending on the configuration of the apparatus. In the case of a unit that does not give an output without an input, if the output is used, a warning will be given if the input is absent.

In addition, attempts to use inputs and outputs of the matrix switch 106 that have not been connected will also trigger a warning.

In addition, if the formats of the video signals being transmitted are different for each unit or each input channel and output channel, connection of a path having a different format will cause a problem and will be warned about.

When a warning is given, it is helpful to the operator to display the details of the problem and its solution, but if the apparatus is made at a low cost, the effect of the present invention is still able to be exhibited by just providing a warning by a buzzer or a light and omitting any explanations.

Alternatively, a warning need not be given explicitly, but the apparatus configured so that problematic control operations themselves are not accepted at all. A similar effect can be achieved by this as well. The effect can also be achieved by selecting and enabling input of only control operations that do not cause problems.

According to the ninth embodiment described above, by preventing execution of erroneous settings and giving an operator a chance to reset them, an apparatus superior in operability and safety is able to be achieved.

10th Embodiment

The 10th embodiment is based on the ninth embodiment but making the units removable and changeable. When a unit is mounted, the unit is connected to the matrix switch via the main housing through contacts or directly.

In this structure, since the units connected to the matrix switch are not fixed, the operation of the check means, namely, the check of problematic paths, cannot be performed based on information on fixed units.

As a result, at the time of check, the mounted units are identified and the paths are checked based on the identified information.

Figure 56:
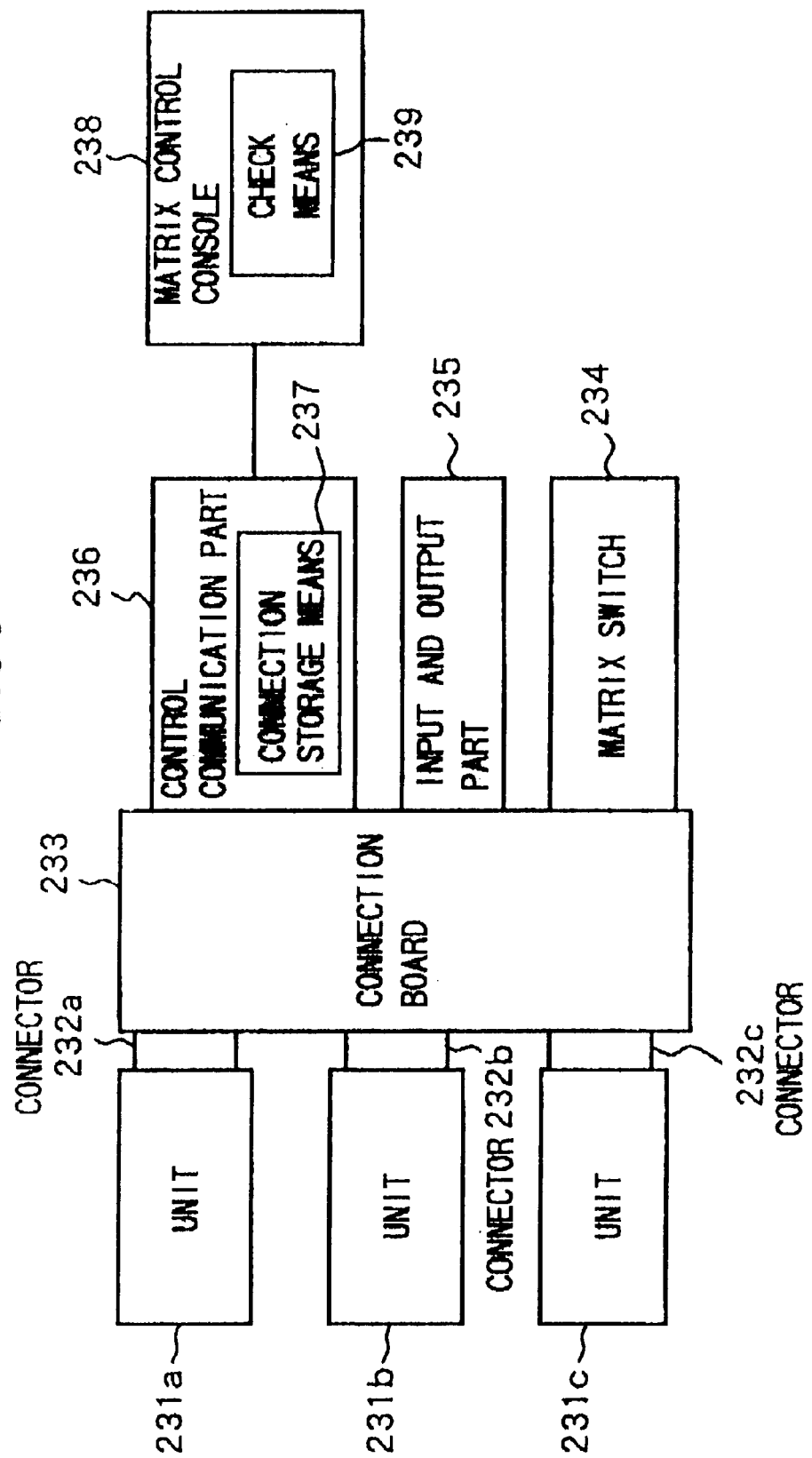
FIG. 56 is a schematic view of the configuration of a video signal processing apparatus with removable units characteristic of a 10th embodiment.

FIG. 56 is a schematic view of the configuration of a video signal processing apparatus with removable units characterizing the 10th embodiment.

In FIG. 56, removable units 231a, 231b, and 231c are provided. These are connected to a connection board 233 through connectors 232a, 232b, and 232c, respectively. A matrix switch 234, input-output unit 235, and the control communication unit are also connected to the connection board 233.

The input-output unit 235 is in charge of the connection of the input channels and the output channels to the outside (holding connectors).

The control communication unit 236 has a communication function and includes a connection storage means 237. The connection storage means 237 stores the information on the connections to input channels and output channels of the matrix switch 234 and to connectors 232a, 232b, and 232c.

The control communication unit 236 is connected to the matrix control console 238 through a communication channel. The matrix control console 238 includes a check means 239 that has a check function characteristic of the present embodiment.

Figure 57:
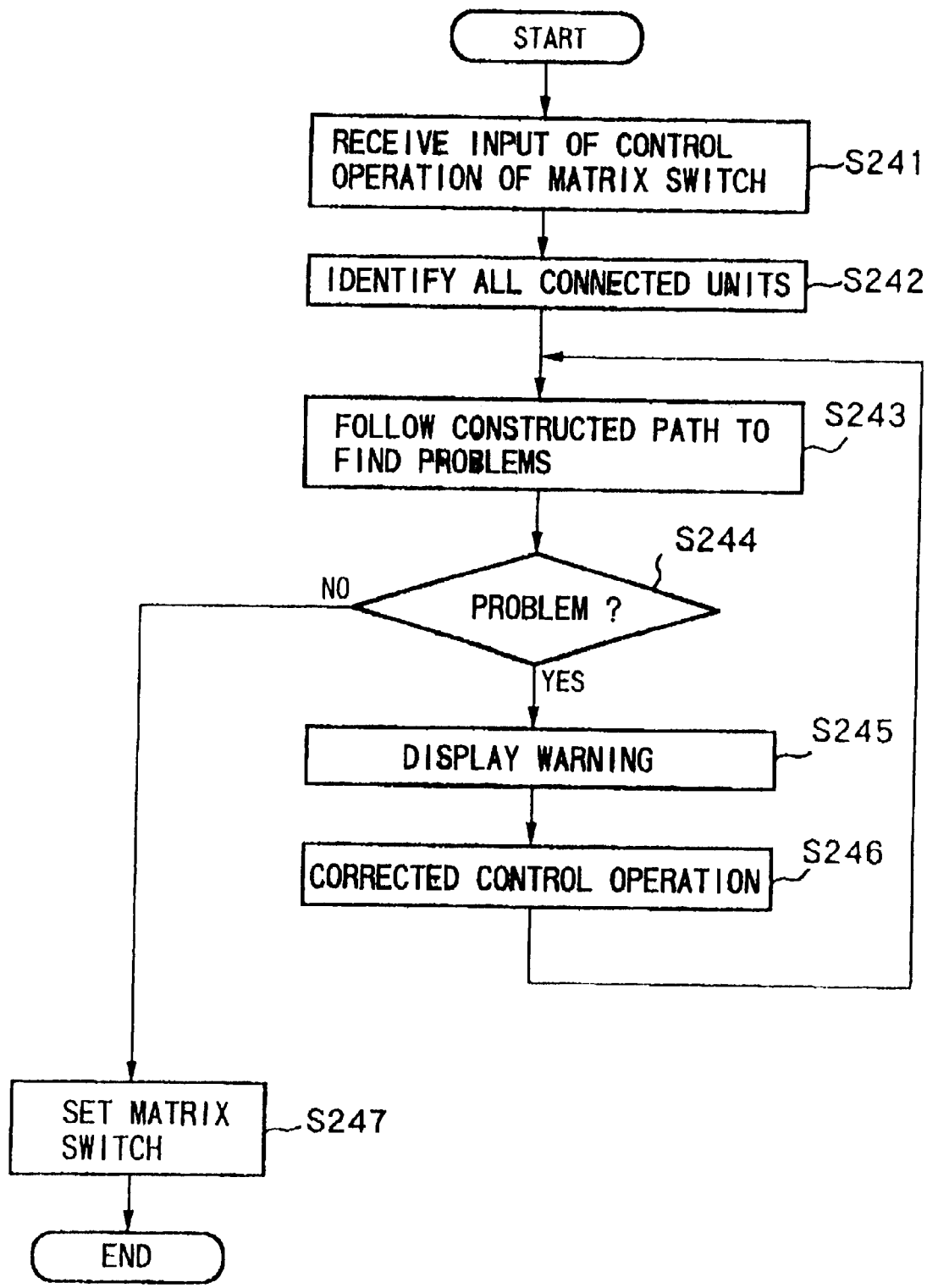
FIG. 57 is a flow chart of processing in which the check means identifies the units being connected and issues a warning to the control of the matrix switch.

FIG. 57 is a flow chart of the function of the check means 239 of identifying the connected units and giving a warning to the control of the matrix switch.

At step S241, a control operation for the matrix switch is received from the matrix control console 238.

At step S242, all presently connected units are identified. This identification is performed in the control communication unit 236 in the video signal processing apparatus, but the results are sent to the check means 239 of the matrix control console 238.

At step S243, using the unit information obtained at step S242, the paths resulting from the operation are logically followed back to check if there is any problem. At step S244, it is judged if there is a problems If there is no problem in the constructed paths, the routine proceeds to step S247, where the matrix switch 234 is set.

If there is a problem, the routine proceeds to step S245, where a warning is displayed. When using a GUI, a warning screen is displayed. The nature of the warning is displayed by words or images. At step S246, input for a correction operation to deal with the warning is received.

After the correction operation, the routine is repeated from step S243 again. If there is no problem in the constructed paths, at step S247, the matrix switch 234 is set in that way.

Figure 58:
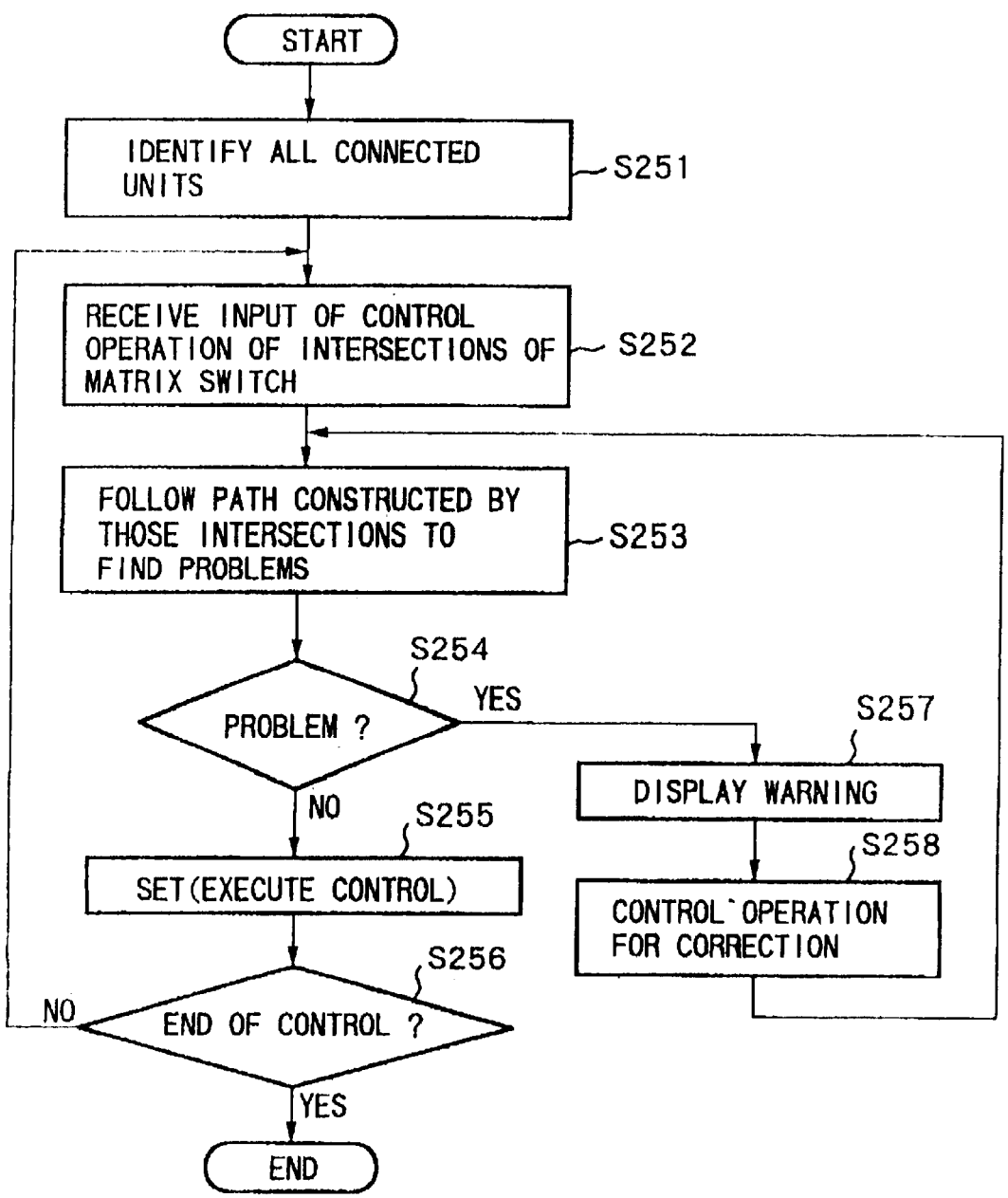
FIG. 58 is a flow chart of other processing in which the check means issues a warning to the control of the matrix switch.

FIG. 58 is a flow chart of other processing in which a warning is given to the control of the matrix switch 234.

In this flow chart, the check is not performed after the input of the control of the matrix switch 234 is finished. Instead, the paths are checked every time a control operation of an intersection is input.

At step S251, all presently connected units are identified.

At step S252, input of a control operation of one intersection of the matrix switch 234 is received.

At step S253, the path resulting from the control operation of the intersection is logically followed back to check if there is a problem. If there is no problem, the routine proceeds to step S257.

At step S255, the control input at step S252 is executed.

At step S256, it is judged if the control is finished. If not finished, the routine proceeds to step S252.

At step S257, a warning is displayed. At step S258, input of corrections to deal with the warning is received.

According to the 10th embodiment described above, even in an apparatus in which units are changeable, in the unit configuration at the time of operation, execution of erroneous settings is prevented and an operator is given a chance to reset, therefore an apparatus that is superior in operability and safe is able to be achieved.

11th Embodiment

Figure 59:
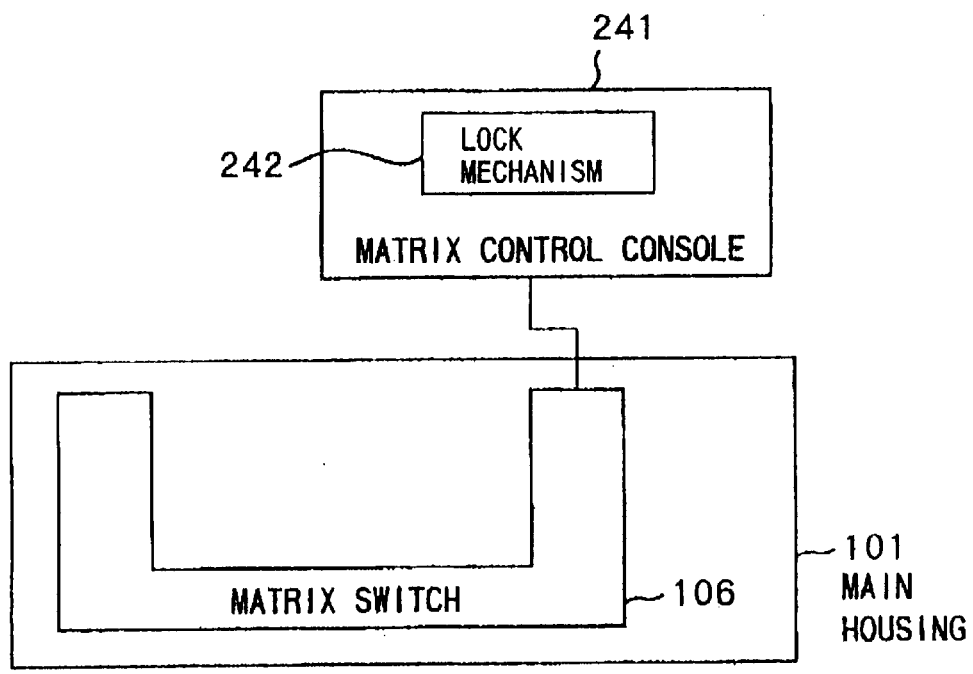
FIG. 59 is a schematic view of the characterizing portion of an 11th embodiment.

FIG. 59 is a schematic view of the characterizing portion of an 11th embodiment.

In FIG. 59, a locking mechanism 242 is installed in the matrix control console 241 connected to the matrix switch 106. A switch is set inside the locking mechanism 242 and is interlocked with the operation of the locking mechanism 242. The information on locking and unlocking is input into the microcomputer of the matrix control console.

Utilizing this input of the information on locking and unlocking, the matrix control console 241 receives operations and operates only when the locking mechanism 242 is unlocked. When the locking mechanism 242 is locked, the matrix control console 242 does not receive any operations and becomes non-operative.

Under this configuration, persons authorized to operate the matrix control console 241 are given and hold keys to the locking mechanism 242. Other persons are therefore prevented from changing the settings of the matrix switch 106.

A cylinder lock using metal keys may be used as the locking mechanism 242. Alternatively, if a card reader that reads magnetic cards is used, magnetic cards instead of keys may also be used. Further, the same configuration of the locking mechanism can also be realized for other types of cards.

12th Embodiment

Figure 60:
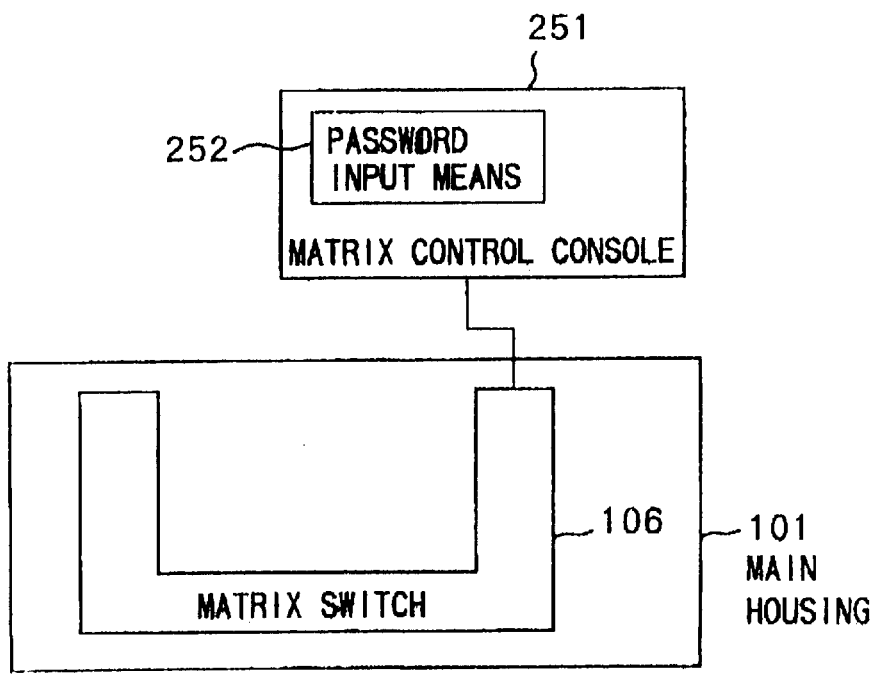
FIG. 60 is a schematic view of the characterizing portion of a 12th embodiment.

FIG. 60 is a schematic view of the characterizing portion of a 12th embodiment.

In FIG. 60, a password input means 252 is installed in the matrix control console 251 connected to the matrix switch 106.

The installation position of the password input means 251 is not restricted to that in FIG. 60. It is may even be a housing independent from the matrix control console 251.

The password input means 252 is a keyboard for inputting an alphabetic password, but may also be a keyboard for inputting a password including only numbers. The effect of the present invention remains the same even with other known input mechanisms.

In the present embodiment, only when a correct password is input into the password input means 252 is the operation of the matrix control console 251 enabled.

Figure 61:
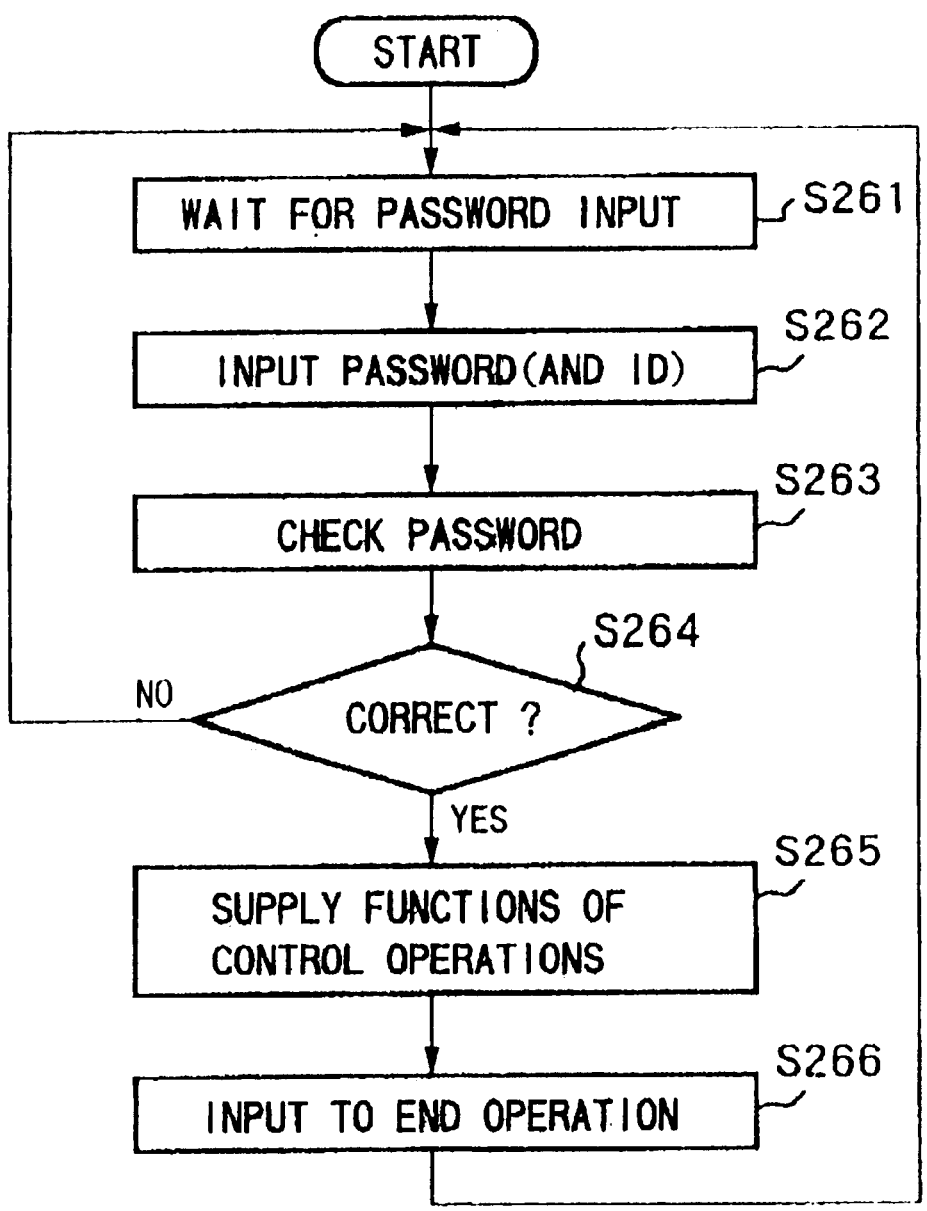
FIG. 61 is a flow chart of processing for authorizing operation of the matrix control console by using a password.

FIG. 61 is a flow chart of processing for authorizing operation of the matrix control console 251 by using a password.

At step S261, the console is in a state waiting for input of a password. In this state, operation of the matrix control console 251 is not enabled.

At step S262, input of a password is received. Alternatively, an identifier including a series of characters or numerals and a password are received.

At step S263, a judgment is made if the password is correct. When an identifier is also input, the correctness of the identifier is also judged. Here, a known algorithm for processing passwords is employed.

At step S264, if the password is correct, the routine proceeds to step S265. If the password is incorrect, the routine proceeds to step S261.

At step S265, use of the control operation functions of the matrix control console 251 by an operator is enabled.

At step S266, input of the end of the operation is received from the operator is received. Next, the routine proceeds immediately to step S261.

According to the 12th embodiment described above, the operation of the matrix control console 251 can be restricted to persons who know the password, so unauthorized persons are prevented from operating the matrix control console 251.

13th Embodiment

Figure 62:
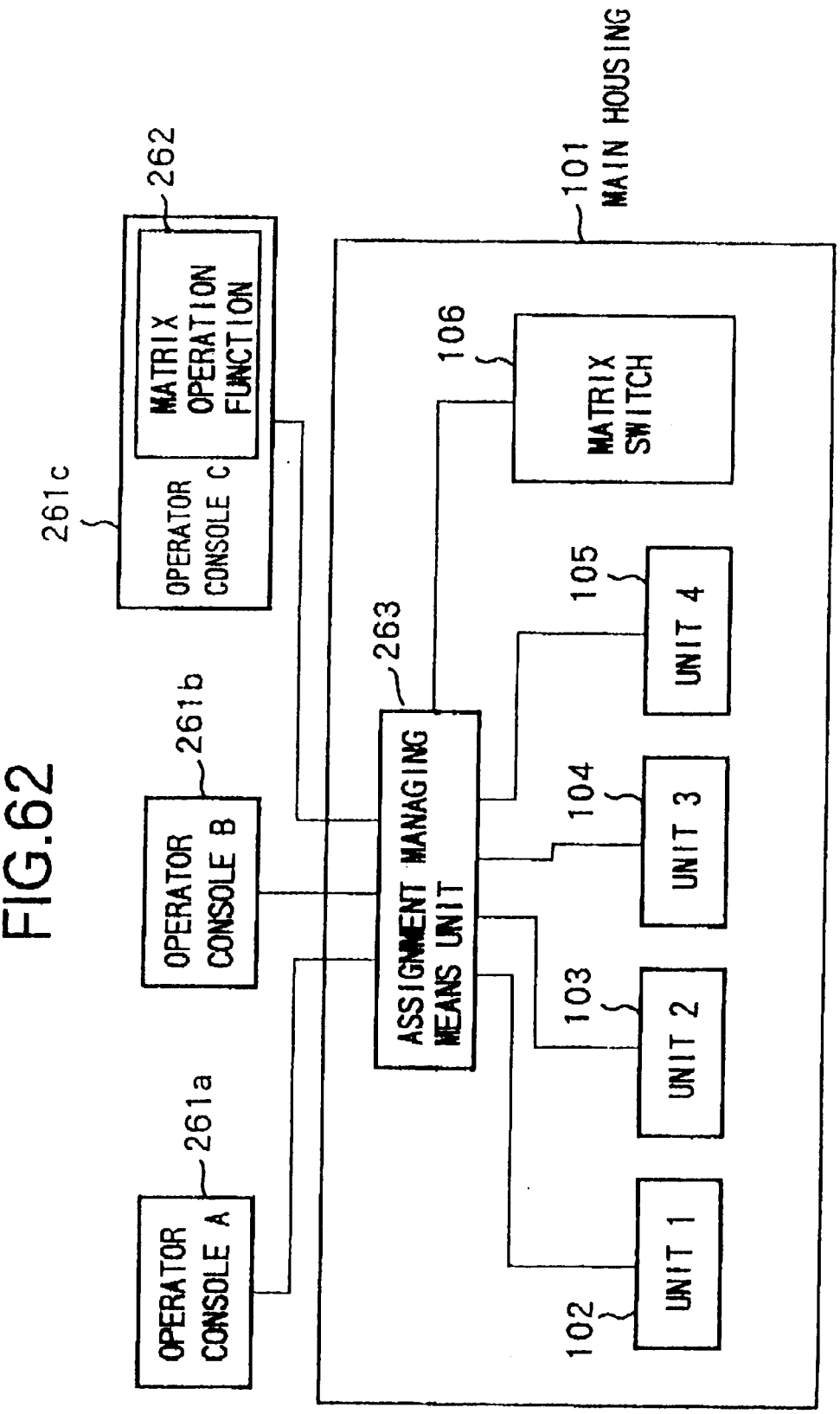
FIG. 62 is a schematic view of the characterizing portion of a 13th embodiment.

FIG. 62 is a schematic view of the characterizing portion of a 13th embodiment.

According to the 13th embodiment, outside the main housing 101, provision is made of operator consoles 261a, 261b that have operational functions of units in a video signal processing apparatus and an operator console 261c including a matrix control mechanism 262 in addition to the operational functions of the units 102 to 105, while inside the main housing 101, provision is made of an assignment managing means 263.

The assignment managing means 263 has the function of assigning operator consoles 261a, 261b, and 261c to the units 102 to 105 and the function of relaying/transmitting/ transferring communication from the operator console 261c to the matrix switch.

Figure 63:
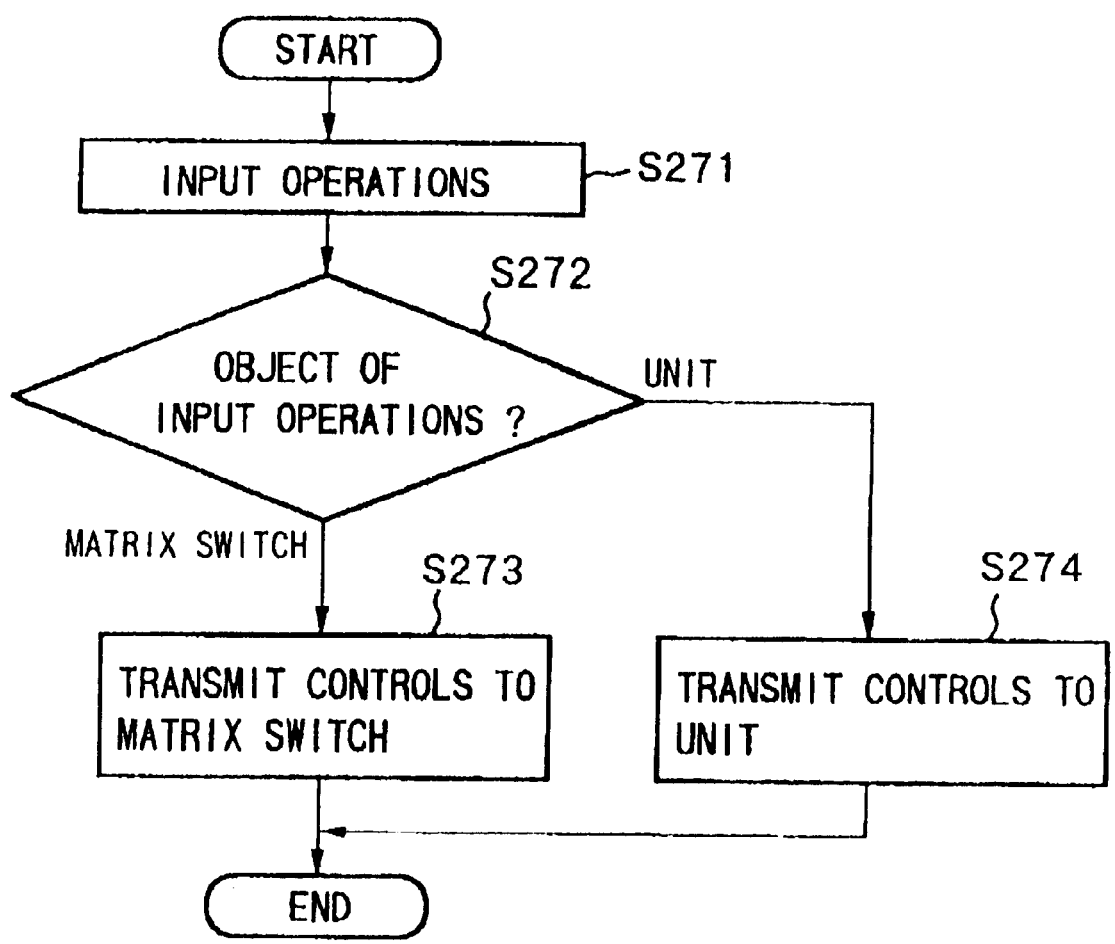
FIG. 63 is a flow chart of operations of matrix switch control and unit control by using the operator console.

FIG. 63 is a flow chart of operations of control of the matrix switch 106 and units 102 to 105 by using the operator console 261c.

At step S271, an input operation from an operator is received.

At step S272, the processing branches according to the object of the input operation. If the object of the input operation is the unit 102 to 105, the routine proceeds to step S274, while if the object of the input operation is the matrix switch 106, the routine proceeds to step S273.

At step S273, control commands for the matrix switch 106 are transmitted.

At step S274, control commands for units 102 to 105 are transmitted.

The assignment managing means 263 transmits the communication from the operator consoles 261a, 261b, and 261c to the units that have been assigned to the transmitting operator consoles if the control commands are for units, while to the matrix switch 106 if the control commands are for the matrix switch.

An operator console provided with a mechanism for control of the matrix switch 106 is able to operate the matrix switch 106 in addition to being able to control the video signal processing units.

Preferably, when the matrix switch 106 is being controlled, operation of the video signal processing units is suspended. When the control is completed and the settings of the matrix switch are updated, the operation of the video signal processing units assigned by the assignment managing means 262 may be resumed.

In the configuration shown in FIG. 62, there is only one operator console including a matrix control mechanism, but use may also be made of a configuration comprising a number of operator consoles each including a matrix control mechanism.

14th Embodiment

Figure 64:
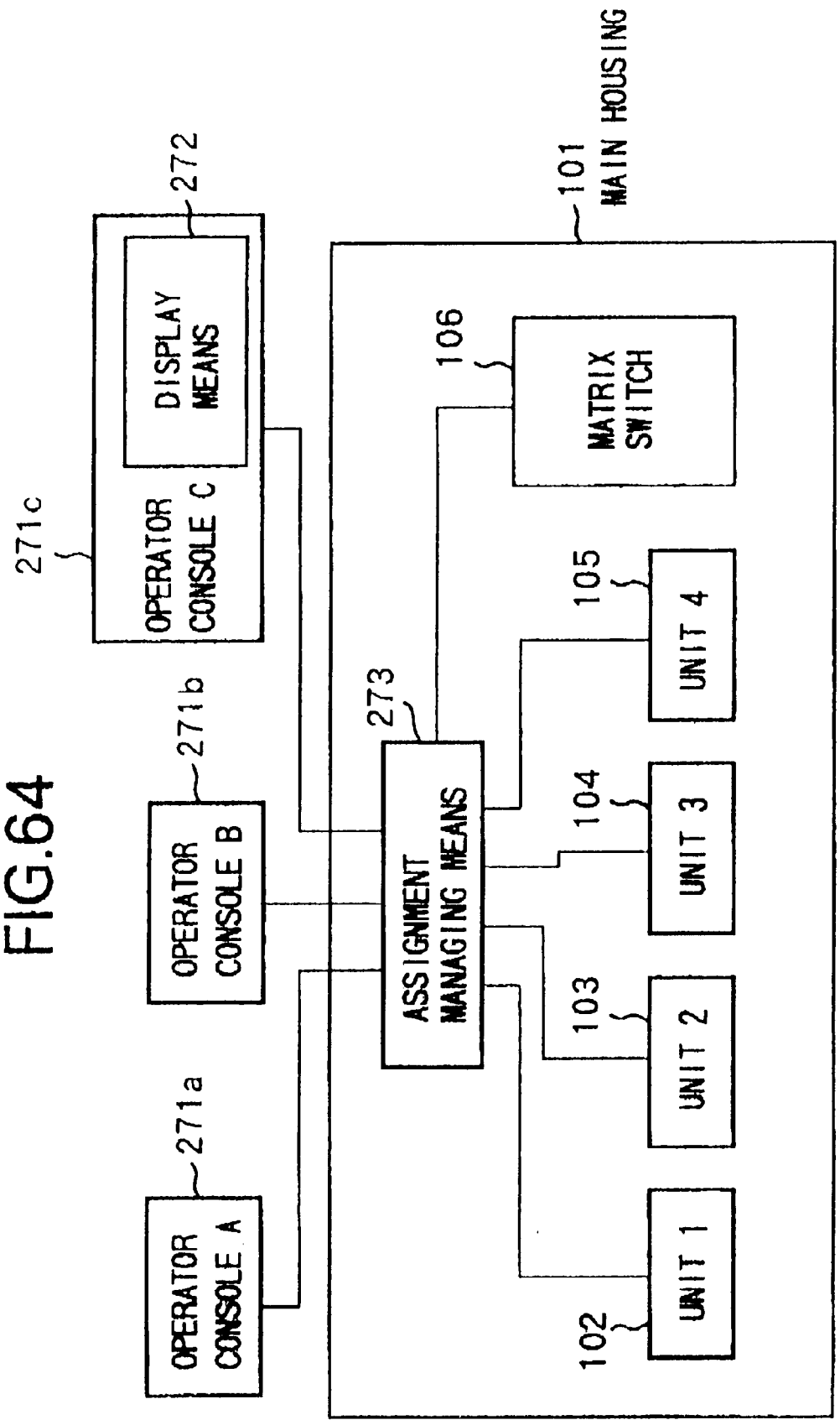
FIG. 64 is a schematic view of the characterizing portion of a 14th embodiment.

FIG. 64 is a schematic view of the characterizing portion of a 14th embodiment.

According to the 14th embodiment, outside the main housing 101, provision is made of operator consoles 271a, 271b that have operational functions of units in a video signal processing apparatus and a operator console 271c including a display means 272 in addition to the operational functions of units 102 to 105. Inside the main housing 101, there is provided an assignment managing means 273.

The display means 272 displays information on the state of settings of the matrix switch 106.

The assignment managing means 273 has the function of assigning operator consoles to units, and the function of relaying/transmitting/ transferring communication from the operator console 271c to the matrix switch 106.

Figures 65, 66:
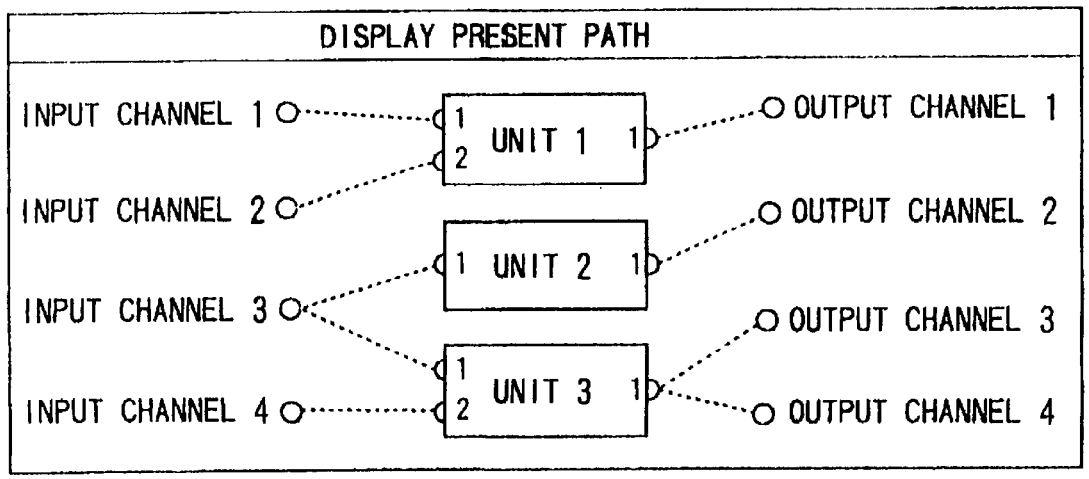
FIG. 65 is a view of an example of display of the settings of the matrix switch.
FIG. 66 is a view of an example of display of paths constructed by using the matrix switch.

FIG. 65 is a view of an example of a display of the settings of the matrix switch.

FIG. 65 shows an example of a display by the display means 272. In this example, settings of intersections of the matrix switch 106 are displayed as they are. Namely, for each output, which input is selected is displayed in a tabular format.

FIG. 66 is a view of an example of display of paths connected using the matrix switch.

The example shown in FIG. 66 is another example of a display by the display means 272. The broken lines are connections achieved by the matrix switch 106.

The display of paths in FIG. 66 relates to paths determined by the settings of the intersections of the matrix switch 106. Specifically, paths from input channels to output channels are shown by using information of the input channels, output channels, and inputs and outputs of all units connected to the matrix switch 106.

Details of the method of generating the displayed graphics will be omitted since this is possible by the known GUI technique.

If there is no such display, an operator cannot determine the present settings of the matrix switch. Consequently, it is impossible to predict how what output channel of a video signal processing apparatus will change due to the effects of the units operated. One had to either know the present settings in advance and store them or write them down.

By provision of such a display on a operator console, an operator can determine the effects on outputs due to operated units, hence the operability is raised.

Although the display of the display means 272 is shown continuously, it is also possible for an operator to start up the display function for display only when necessary. The display of the display means 272 is updated by notification when the settings of the matrix switch 106 are changed. It is also possible to inquire at regular time intervals for update from the operator console 271c including the display means 272.

15th Embodiment

Figure 67:
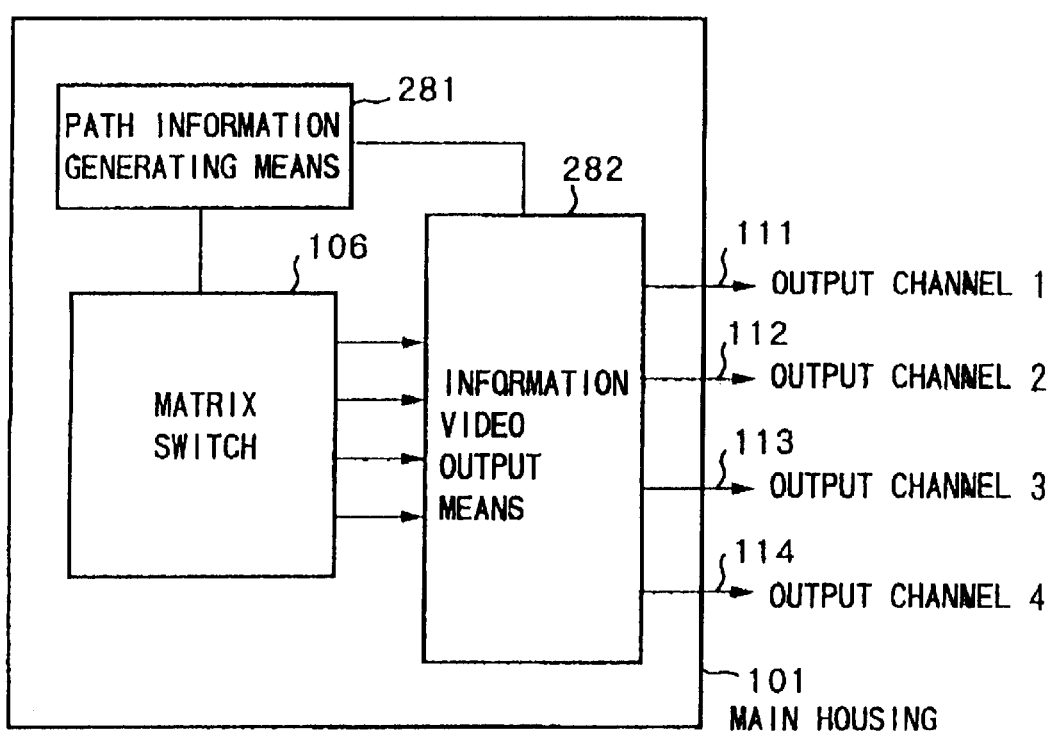
FIG. 67 is a schematic view of the characterizing portion of a 15th embodiment.

FIG. 67 is a schematic view of the characterizing portion of a 15th embodiment.

The video signal processing apparatus according to the 15th embodiment comprises a path information generating means 281 connected to the matrix switch 106 and an information image output means 282 connected to the matrix switch 106 and the path information generating means 281.

The path information generating means 281 generates information on units and input channels in a path leading to an output channel. The information video output means 282 outputs images of characters or symbols to each output channel.

The path information generating means 281 generates information of the paths leading to each output channel from the settings of the intersections of the matrix switch and the information of units and input channels connected. The information image output means 282 receives path information from the path information generating means 281, generates images of characters etc., and outputs the same to each output channel. Images of information of paths leading to each output channel are output to the same output channel.

When necessary, as a different configuration, information on paths related to two or more or all output channels, rather than a single output channel, may be output.

Figure 68:
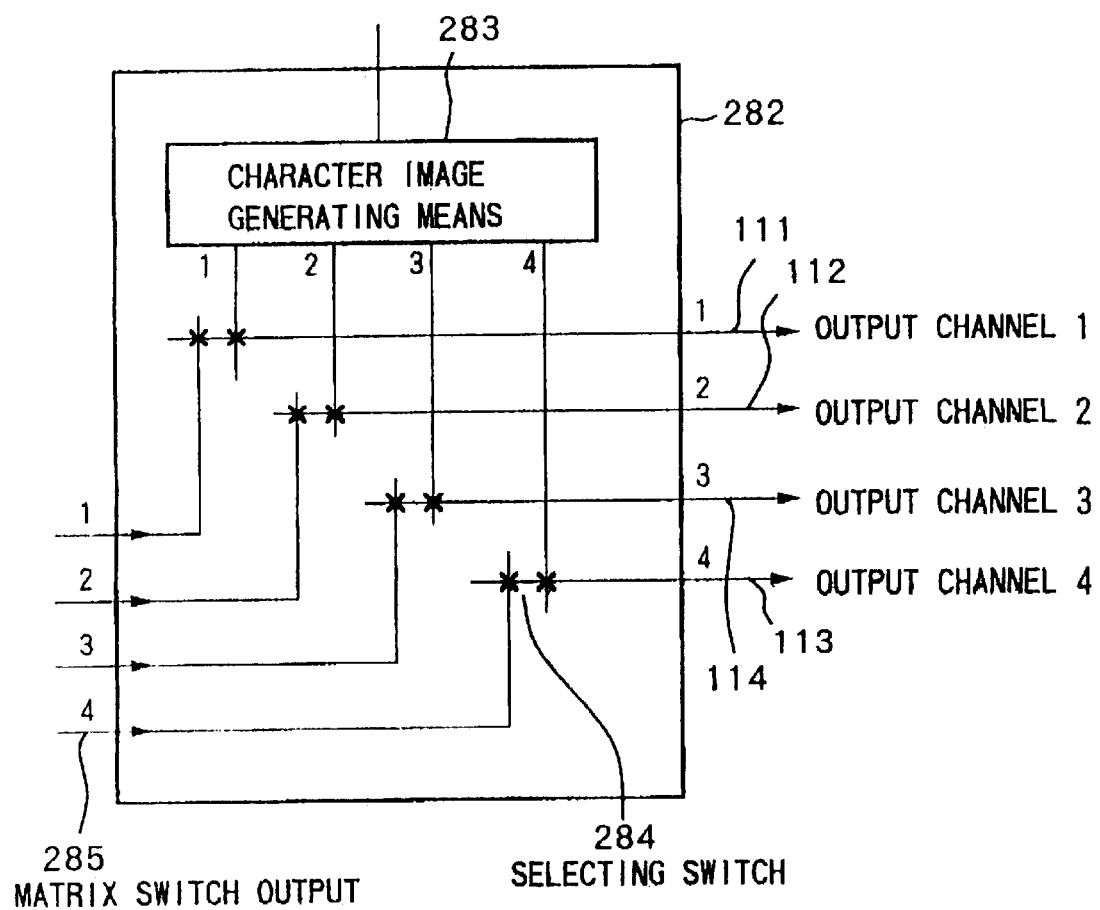
FIG. 68 is a view of an example of the configuration of the information video output means.

FIG. 68 is a view of an example of the configuration of the information image output means 282.

According to the example of the configuration of the information image output means 282 shown in FIG. 68, the information image output means 282 includes a character image generating means 283. This character image generating means 283 generates information including a series of characters from information obtained from the path information generating means 281 and outputs the same to the outputs corresponding to the output channels 111 to 114 (output 1 to 4 in FIG. 68) as image signals.

The matrix switch output 285 of the output side of the matrix switch 106 and the output of the character video generating means 283 are connected to the output channels 111 to 114 of the information video output means 282 by using the selecting switch 284 provided for the output channels.

The selecting switch 284 selects either the matrix switch output 285 or the output of the character image generating means 283 and output images to the output channels 111 to 114.

When necessary, an operator of the video signal processing apparatus controls the selecting switch 284 to output an image showing the path information by a character string instead of the normal output video.

For example, for the output channel 1, when the input channel 1 and 2 are input to the unit 1 and the output of the unit 1 is connected to the output channel 1, the following character strings are output as images.

"output channel 1: output 1 of unit 1,
"input 1 of unit 1: input channel 1,
"input 2 of unit 1: input channel 2"

Figure 69:
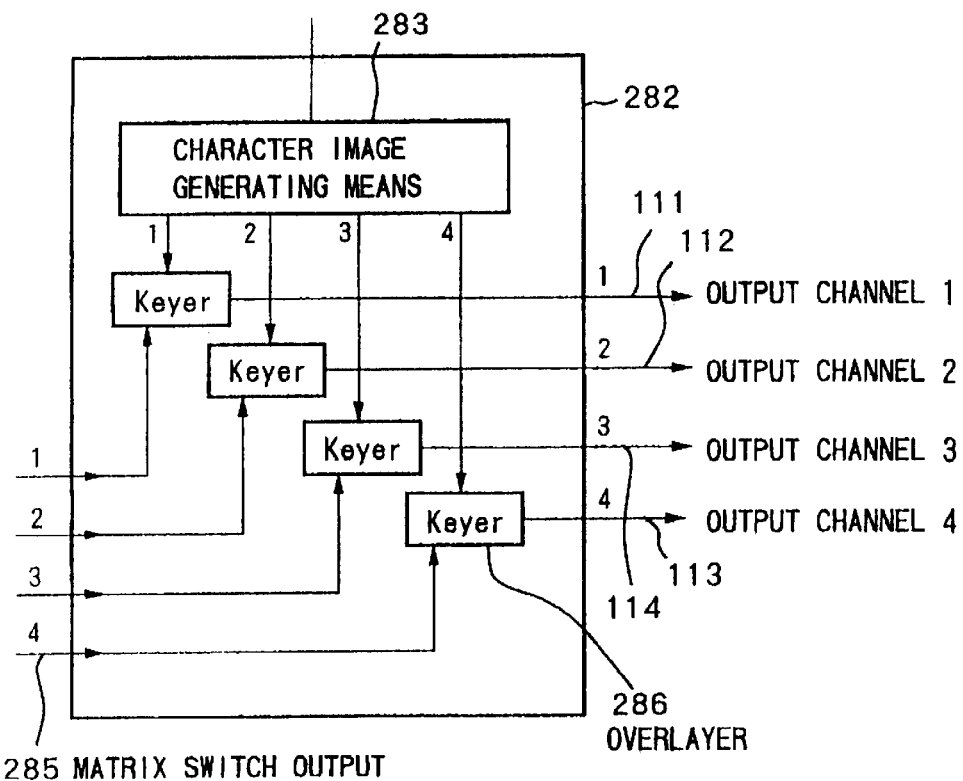
FIG. 69 is a view of another example of the configuration of the information video output means.

FIG. 69 is a view of another example of the configuration of the information image output means 282.

In the configuration of the information video output means 282 as shown in FIG. 69, as the video of the output channel, the matrix switch output 285 and the output of the character image generating means 283 are superposed and output rather than output by switching them.

Accordingly, the information image output means 282 has a superposing unit 286 in each of the output channels 111 to 114. The superposing unit 283 has the function of superposing the output of the character image generating means 283 on the matrix switch output 285 for output. In a non-superposed state, the video of the matrix switch 285 is output to the corresponding output channel as it is.

The operator of a video signal processing apparatus operates the superposing unit 286 when necessary.

In the above, the explanation was given of use of characters as the image generated by the information image output means 282, but it is also possible to determine symbols, graphics, images, etc. for each unit and input channel and output images of them as path information.

Furthermore, preferably, an image of the path information having the form as shown in FIG. 66 may be prepared and output.

According to the present invention, by outputting or superposing information of the processing path to or on the output video itself, it becomes possible for an operator to understand the path information without mistake.

16th Embodiment

Figure 70:
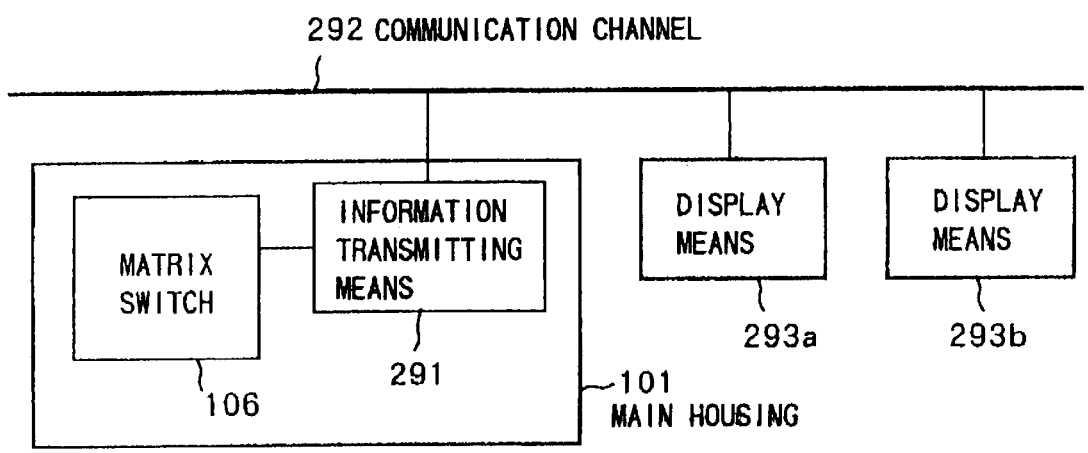
FIG. 70 is a schematic view of the characterizing portion of a 16th embodiment.

FIG. 70 is a schematic view of the characterizing portion of a 16th embodiment.

In FIG. 70, reference numeral 291 indicates an information transmitting means which transmits information of the present settings of the matrix switch 106, namely, the state of the intersections, or information on paths resulting from the former. A communication channel 292 is connected to the information transmitting means 291, and a number of display means 293a and 293b are connected to the communication channel 292.

The information sent from the information transmitting means 291 is received by the display means 293a and 293b through the communication channel 292, whereupon the display means 293a and 293b display the same.

The content displayed is the same as that of the display means 272 in the 14th embodiment. For example, it can be made the example in FIG. 65 or FIG. 66.

Two display means are connected to the communication channel 292 in the example in FIG. 70, but the invention is not restricted to this. Any are possible. Preferably, a cable is employed as the communication channel 292, but the invention is not limited to this. A radio wave may also be employed.

In addition, the plurality of display means may include ones different in the form or content of display. Furthermore, different information may be sent to each display means from the information transmitting means 291. Alternatively, the content received may be selected and processed at the display means.

According to the present embodiment, by displaying path information on the display means 293a, 293b through the communication channel 292, even at locations distant from a video signal processing apparatus or the operator console thereof, information of the source of the present output video and processing can be obtained.

17th Embodiment

Figure 71:
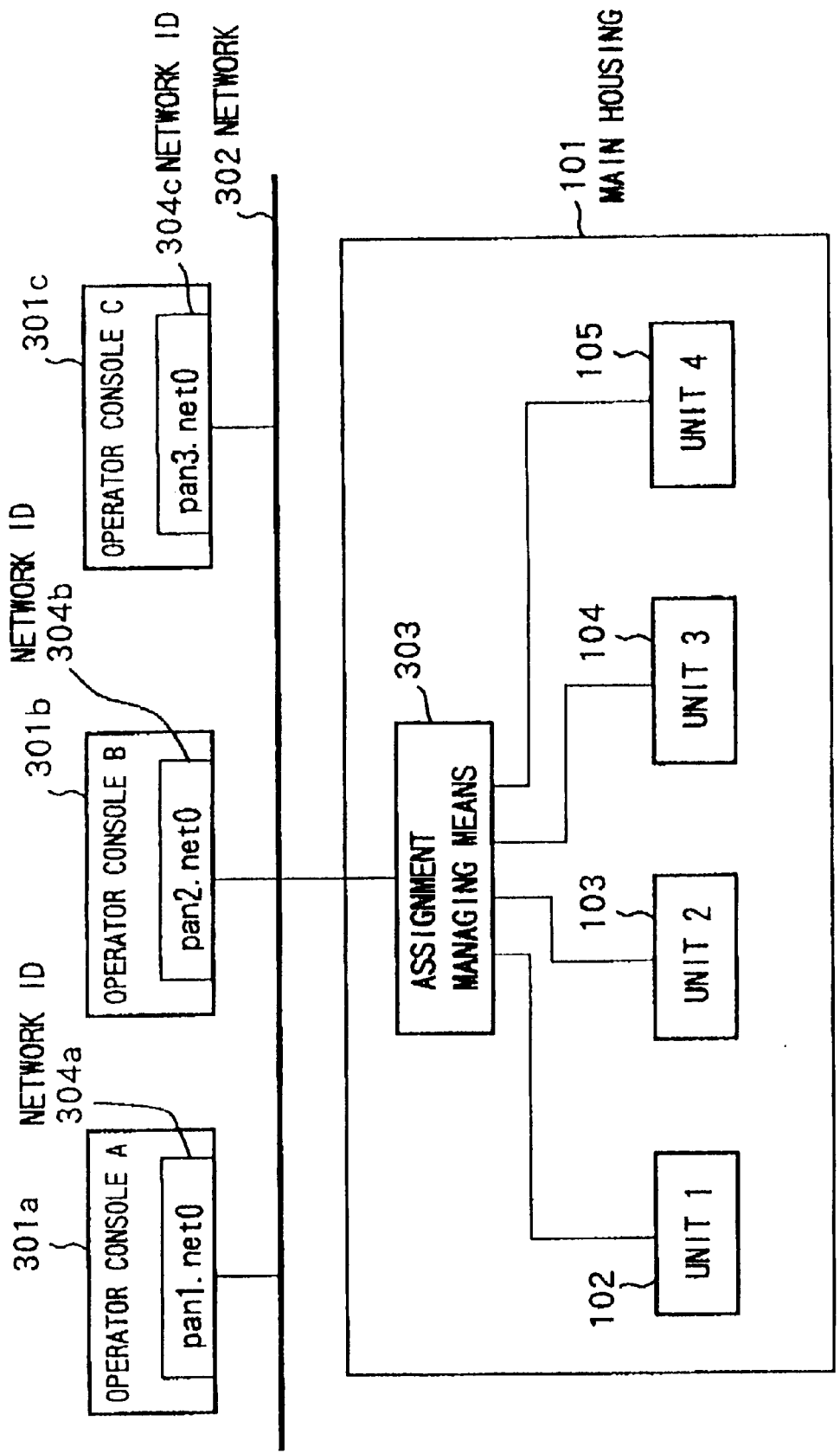
FIG. 71 is a schematic view of the characterizing portion of a 17th embodiment.

FIG. 71 is a schematic view of the characterizing portion of a 17th embodiment.

In FIG. 71, operator consoles 301a, 301b, and 301c are connected to the assignment managing means 303 via a network (LAN: Local Area Network) 302. The operator consoles 301a, 301b, and 301c are provided with network identifiers 304a, 304b, and 304c, respectively, which represent identifiers of the operator consoles as nodes of the network 302.

In the example in the FIG. 71, "pan1.net0" is provided as the network identifier 304a of the operator console 301a, "pan2.net0" as the network identifier 304b of the operator console 301b, and "pan3.net0" as the network identifier 304c of the operator console 301c.

The assignment managing means 303 is also connected to the network 302, so it is also given a network identifier.

The assignment managing means 303 include a transfer table that holds the assignments of operator consoles to units using the network identifiers of the operator consoles. An example of the transfer table is shown in FIG. 72.

FIG. 72 is a view of an example of a transfer table of the assignment managing means.

According to the example of the transfer table shown in FIG. 72, the operator console 301a of FIG. 71 (operator console A) is assigned to the unit 102 (unit 1) and unit 103 (unit 2), the operator console 301b (operator console B) is assigned to the unit 104 (unit 3), and the operator console 301c (operator console C) is assigned to the unit 105 (unit 4).

FIG. 73 is a flow chart of the operation of processing of the assignment managing means for transmission from a unit to an operator console.

At step S281, transmission data is received from the unit side. The transmitting unit number is made N.

At step S282, the transfer table is referred to by the unit number N to obtain the network identifier of the corresponding operator console. For example, when N is 4, in the example of FIG. 72, the network identifier "pan3.net0" is obtained.

At step S283, the transmission data received from the unit is transferred via the network using an address the network identifier obtained at step S282.

FIG. 74 is a flow chart of the operation of the processing of the assignment managing means for transmission from an operator console to a unit.

At step S291, transmission data from an operator console is received through the network. The transmitting operator console network identifier is made S.

At step S292, the transfer table is referred to using the operator console network identifier S to obtain the corresponding unit numbers. For example, when the operator console network identifier S is "pan1.net0", in the example of FIG. 72, "1" and "2" are obtained as unit numbers.

At step S293, the data received at step S291 is transferred to the corresponding units. In the above example, the assignment managing means 303 transfers the data received from the operator console 301a (operator console A) to both the unit 102 (unit 1) and the unit 103 (unit 2).

Figure 75:
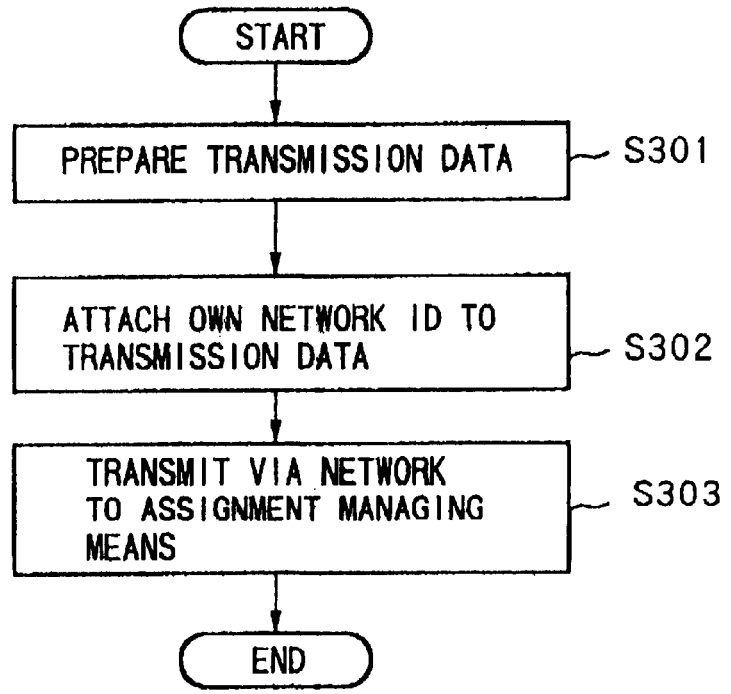
FIG. 75 is a flow chart of the processing in an operator console for transmitting to an assignment managing means.

FIG. 75 is a flow chart of the processing for transmission from an operator console to the assignment managing means.

At step S301, data to be transmitted is prepared by operational input of an operator.

At step S302, the network identifier of the operator console itself is added to the transmitted data.

At step S303, the data is transmitted to the assignment managing means 303 through the network.

In the above example, there was only one operator console assigned to any one unit, but it is also possible to allow assignment of several operator consoles. At that time, the transmission from a unit to an operator console is transferred to all operator consoles assigned.

According to this embodiment, there is no longer a need for laying a communication cable from the main housing to each of the operator consoles. By inserting the operator consoles into a network, it is possible to provide a plurality of operator consoles without the need for extra wiring. Further, in such a case, it is possible to freely set the assignments of the operator consoles to the units and possible to process signals without crosstalk.

18th Embodiment

The configuration of the characterizing portion of the 18th embodiment is the same as the configuration shown in FIG. 71 in the same way as the 17th embodiment.

In the 17th embodiment, the assignment managing means 303 held the correspondence between the operator consoles and units in a transfer table for processing. In the 18th embodiment, the system is designed to notify the units corresponding to the operator consoles in advance and to transmit data by designating the destination units from the operator consoles.

Here, an explanation will be given of the operation referring to FIG. 71 assuming that the number of each unit is set as its identifier.

Figure 76:
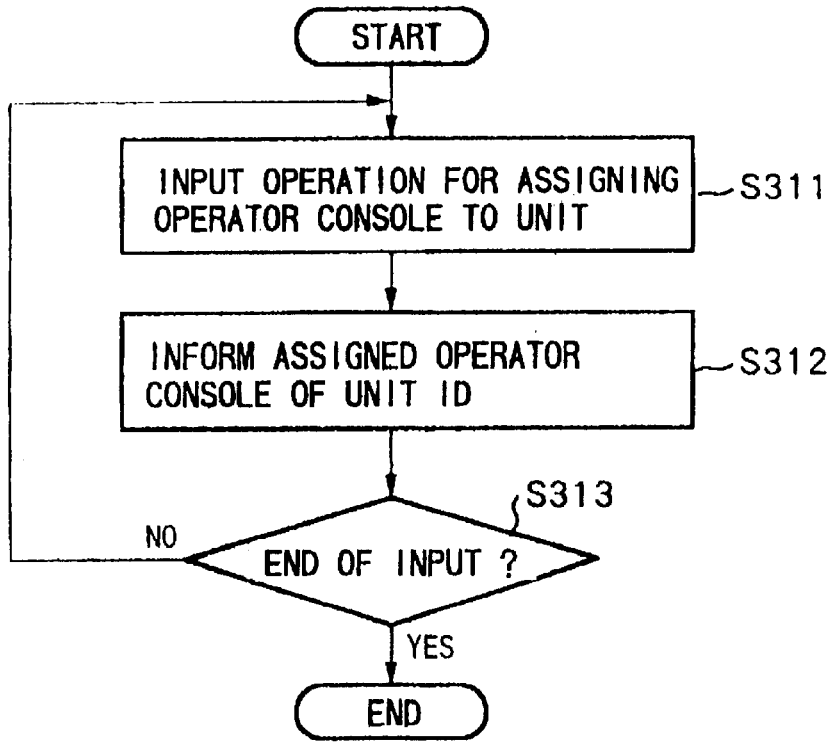
FIG. 76 is a flow chart of the operation of assignment of an assignment managing means.

FIG. 76 is a flow chart of the operation for assignment of the assignment managing means 303.

At step S311, an operation for instructing assignment of an operator console to a unit is input by an operator. The input itself may be performed from for example one of the operator consoles.

At step S312, the identifier of each unit is notified (sent) to the operator console assigned to that unit. The operator console stores the notified identifier. At step S313, it is judged if the input by the operator has ended. If there is continued input, the routine returns to step S311.

Figure 77:
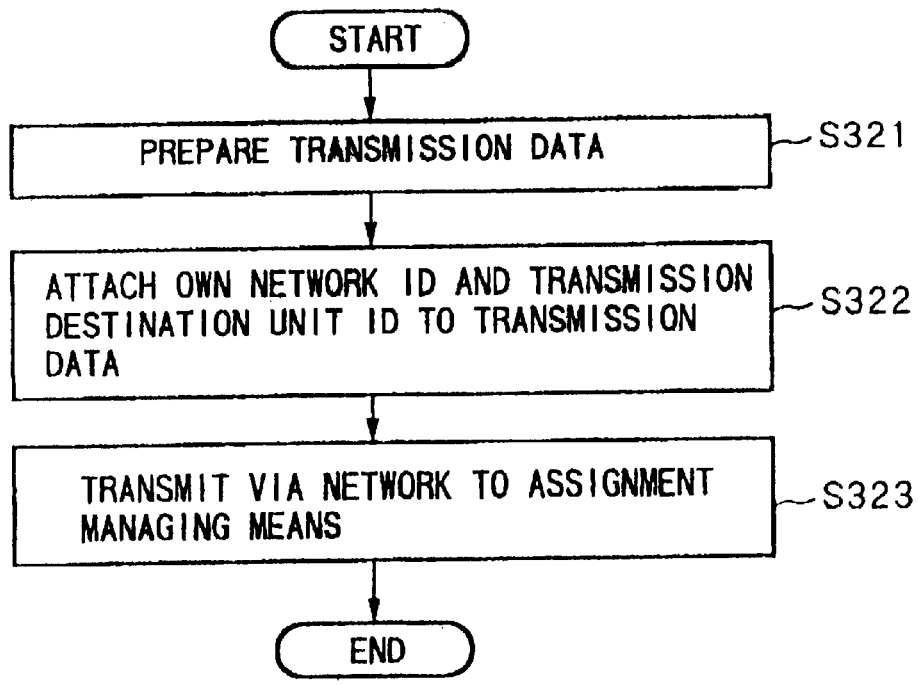
FIG. 77 is a flow chart of the operation of an operator console during transmission to a unit from an operator console.

FIG. 77 is a flow chart of the operation of the operator console at the time of processing for transmission from the operator console to a unit.

At step S321, transmission data is prepared by operational input by an operator.

At step S322, the network identifier of the operator console itself and the identifier of the unit notified in advance (unit number) are added to the transmission data.

At step S323, the data is transmitted to the assignment managing means 303 through the network.

Figure 78:
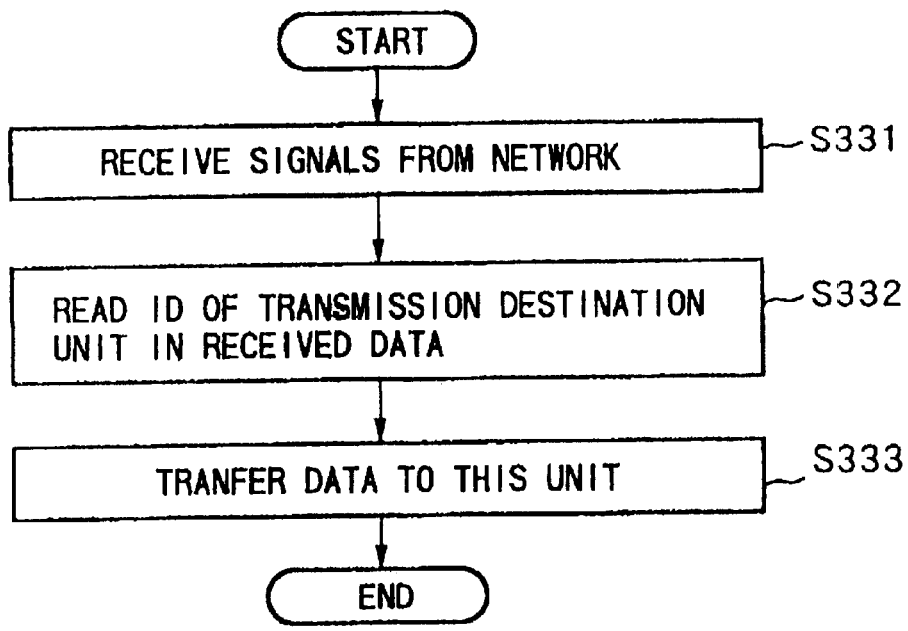
FIG. 78 is a flow chart of the operation of an assignment managing means during transmission to a unit from an operator console.

FIG. 78 is a flow chart of the operation of the assignment managing means 303 at the time of processing for transmission from an operator console to a unit.

At step S331, transmission data from an operator console is received through the network.

At step S332, the identifier of the transmission destination unit in the received data is read.

At step S333, the received data is transferred to the corresponding unit.

The processing for transmission from a unit to an operator console is performed in the same way, so an explanation will be omitted. The communication between an operator console and unit starts by transmission from the operator console to the unit. At this time, the network identifier of the operator console itself is added to the transmission data, so the unit can obtain the network identifier of the assigned (transmitting) operator console.

Figure 79:
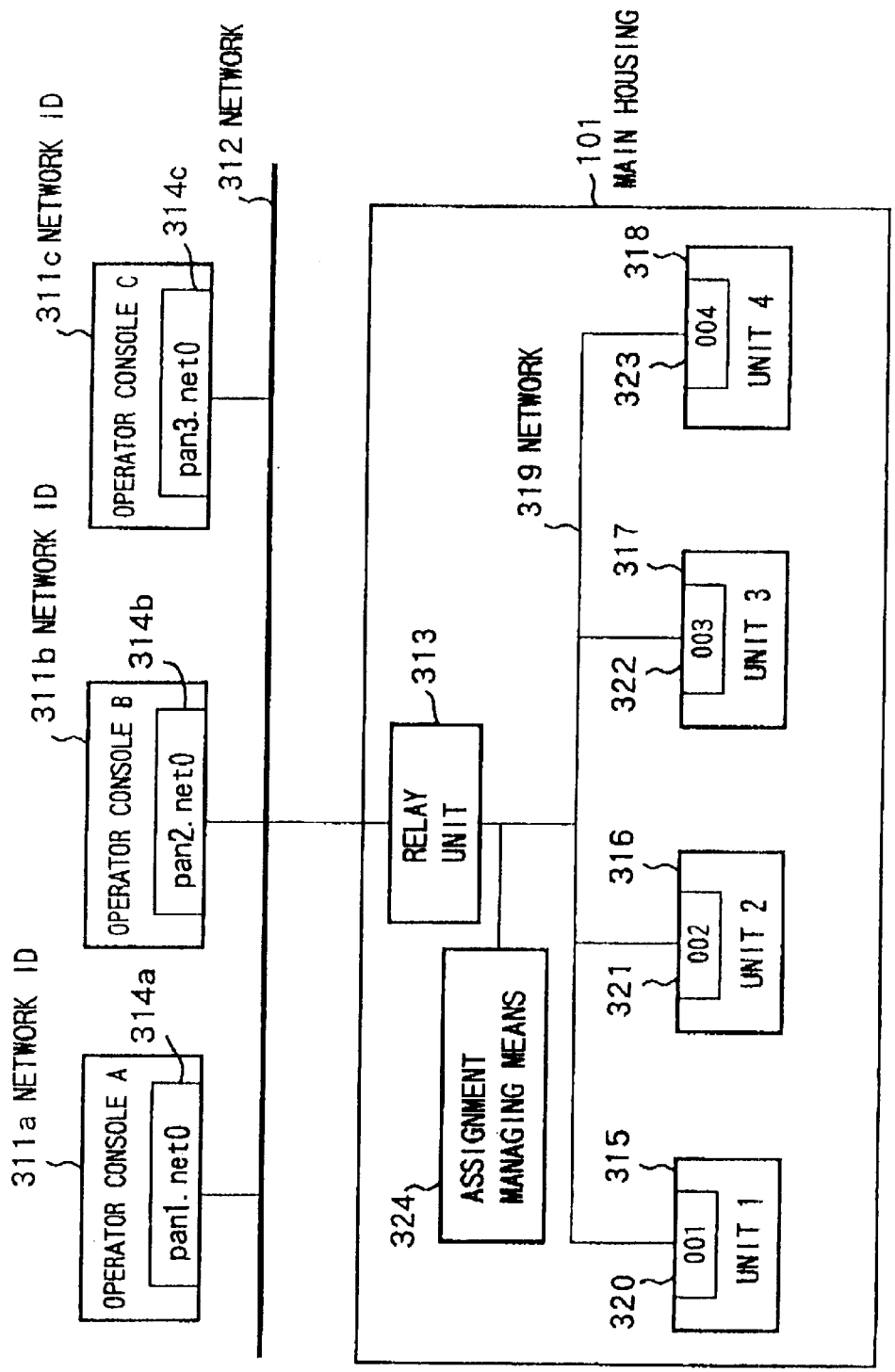
FIG. 79 is a schematic view of the characterizing portion of another example of the configuration according to the 18th embodiment.

FIG. 79 is a view of the characterizing portion of another example of the configuration of the 18th embodiment.

According to this other configuration of the 18th embodiment, operator consoles 311a, 311b, and 311c are connected to a relay unit 313 through a network (LAN) 312. The operator consoles 311a, 311b, and 311c are assigned network identifiers 314a, 314b, and 314c representing the identifiers of the operator consoles as nodes on the network 312.

Inside the main housing 101, the units 315, 316, 317, and 318 are connected to an internal network. The units 315, 316, 317, and 318 are assigned unit identifiers 320, 321, 322, and 323 for identifying units as nodes of the internal network 319. Further, the internal network 319 is connected to the relay unit 313 and an assignment managing means 324.

The relay unit 313 connects the network 312 and the internal network 319. The relay unit 313 only transfers communications and does not process the content etc.

Note that when realizing the present embodiment, it is also possible to make the network 312 and the internal network 319 the same types of networks and eliminate the relay unit 313.

In the configuration of FIG. 79, communication between the operator consoles 311a, 311b, and 311c and the units 315 to 318 is performed directly through the network 312 and the internal network 319 without going through the assignment managing means 324 each time.

Further, in the configuration of FIG. 79, the assignment operation of the assignment managing means 324 is performed in accordance with the flow chart as shown in FIG. 76.

Further, in the configuration of FIG. 79, the assignment managing means 324 does not have to be at any special location on the network. Further, there is no problem in the assignment operation of FIG. 76 no matter which component (node) in the network performs the function.

Figure 80:
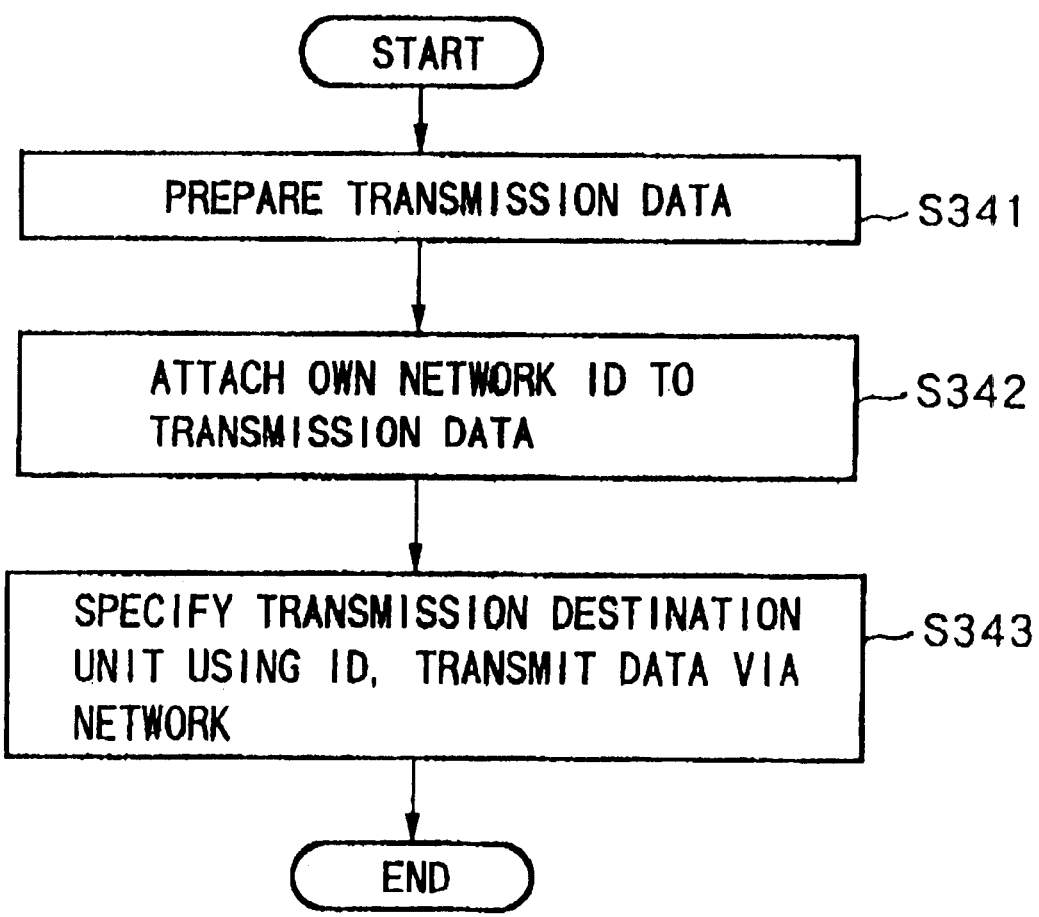
FIG. 80 is a flow chart of the operation of an operator console transmitting to a unit in the configuration shown in FIG. 79.

FIG. 80 is a flow chart of the operation of a operator console for transmission to a unit by the configuration of FIG. 79.

At step S341, transmission data is prepared.

At step S342, the network identifier of the operator console itself is added to the transmission data.

At step S343, communication is performed designating the transmission destination through the network by a preset unit identifier. The transmitted data is received by the destination unit without going through the assignment managing means 324.

Note that in the present embodiment, the units 315, 316, 317, and 318 and the housing 101 holding them do not have to be all integral. They may be physically separated into several sections and connected by a network. In this case, it is possible to specify a location on the network by an identifier.

Further, the transmissions from the operator consoles 311a, 311b, and 311c may also include the network identifiers of the operator consoles themselves in preparation for a need for response or retransmission due to a problem in the network.

19th Embodiment

Figure 81:
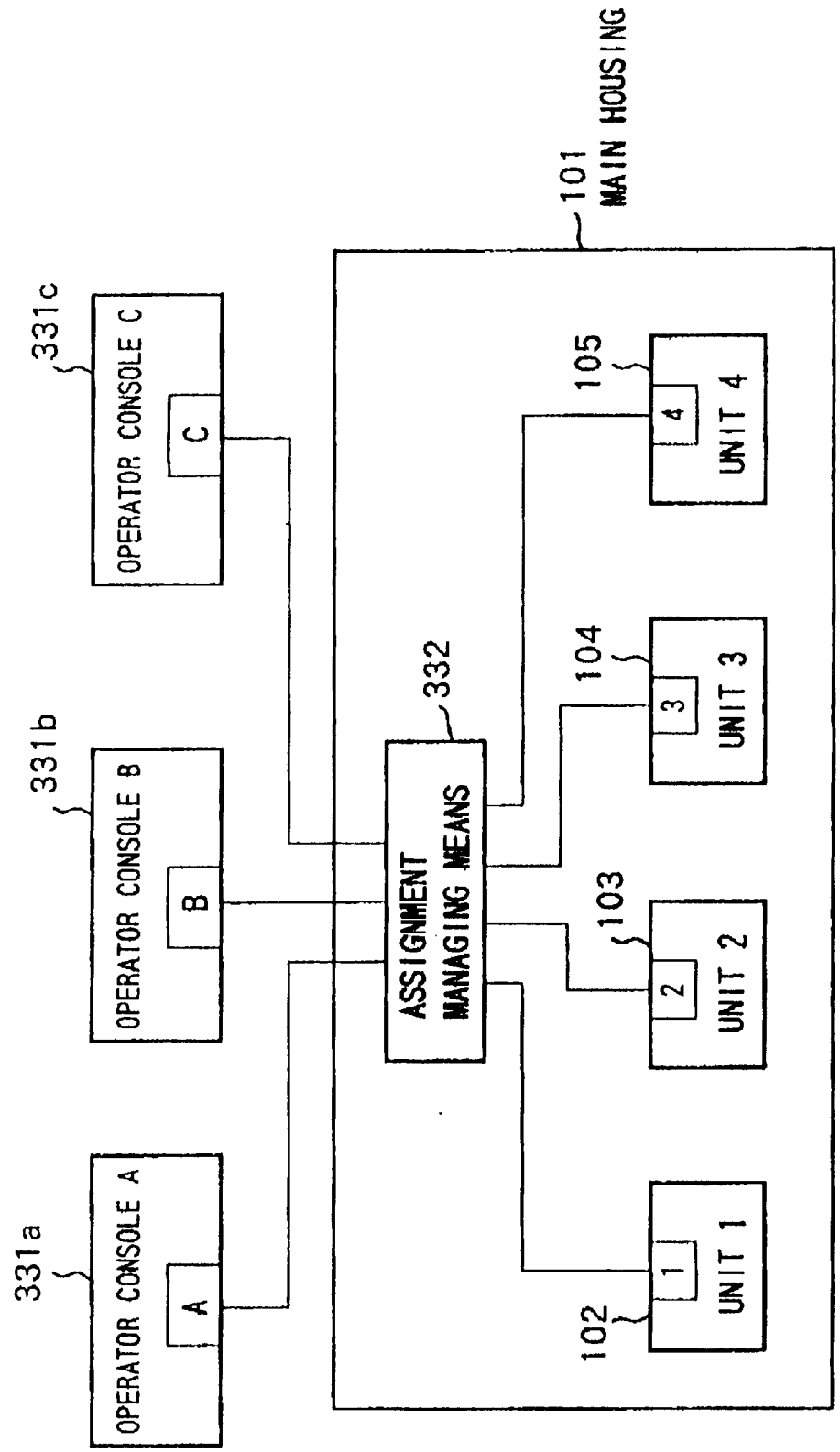
FIG. 81 is a schematic view of the characterizing portion of a 19th embodiment.

FIG. 81 is a view of the characterizing portion of a 19th embodiment.

In the 19th embodiment, operator consoles 331a, 331b, and 331c are connected to units 102 to 105 through an assignment managing means 332. The operator consoles 331a, 331b, and 331c are assigned operator console identifiers (A, B, and C). The units 102 to 105 are assigned numbers (1, 2, 3, and 4) as identifiers and are specified by these.

Note that in the configuration of FIG. 81, the operator consoles 331a, 331b, and 331c are connected to the assignment managing means 331, but they may also be connected through a network.

Next, an explanation will be given of the operation characterizing the assignment managing means 332.

Figure 82:
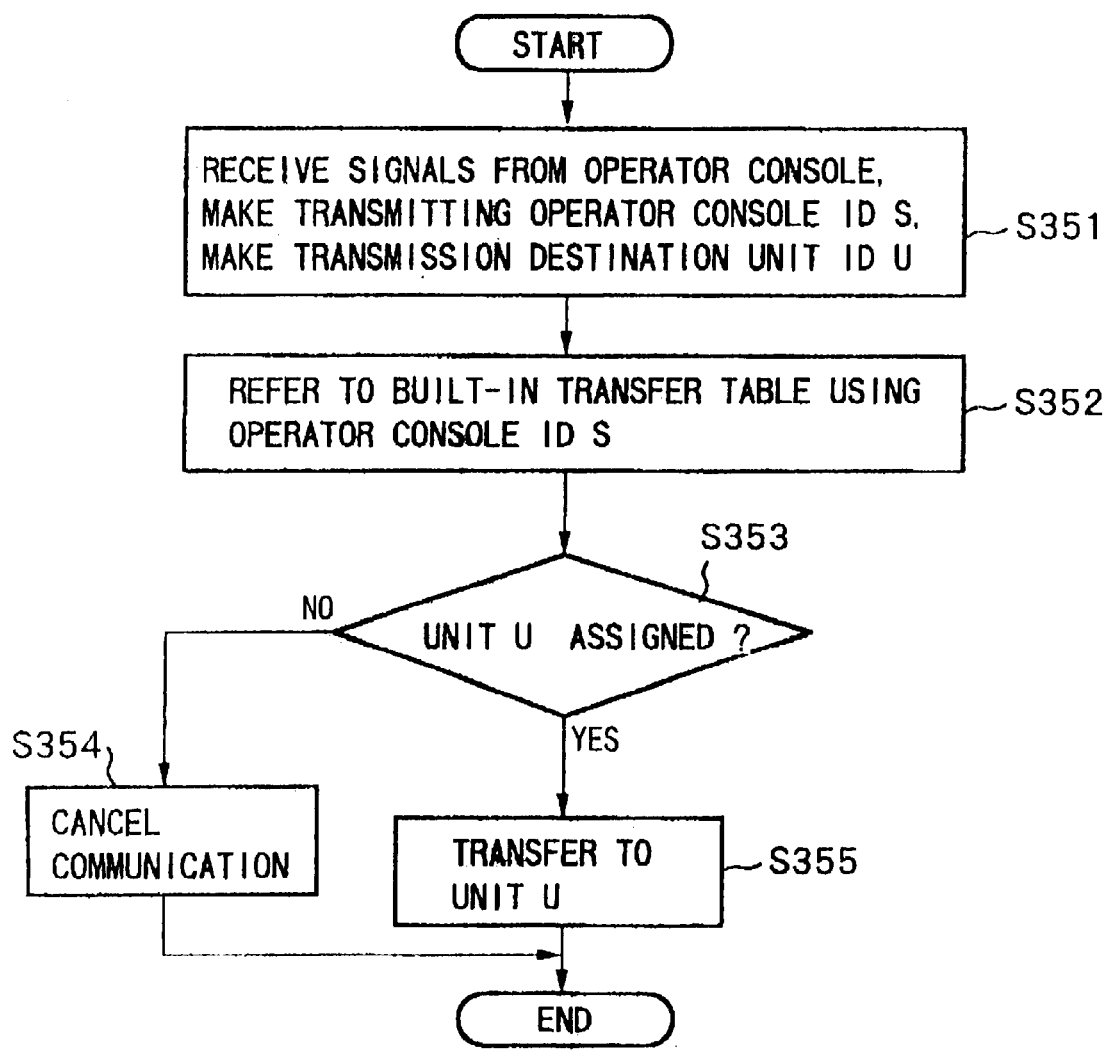
FIG. 82 is a flow chart of processing for transmitting to a unit from an operator console.

FIG. 82 is a flow chart of the processing for transmission from an operator console to a unit.

At step S351, transmission data is received from the operator consoles 331a, 331b, and 331c. The operator console identifier of the source of transmission is designated as S and the identifier of the unit of the destination of transmission is made U. The operator console identifiers are A, B, and C in FIG. 81. The identifiers of the units are 1, 2, 3, and 4 in FIG. 81.

In the present embodiment, the information is included in the received data. Here, the communication data, as shown in FIG. 83, is comprised of the destination unit identifier 333, the transmitting operator console identifier 334, and the transmission data 335.

At step S352, the assignment managing means 332 refers to the built-in transfer table using the operator console identifier S as a key.

Figures 83, 84:
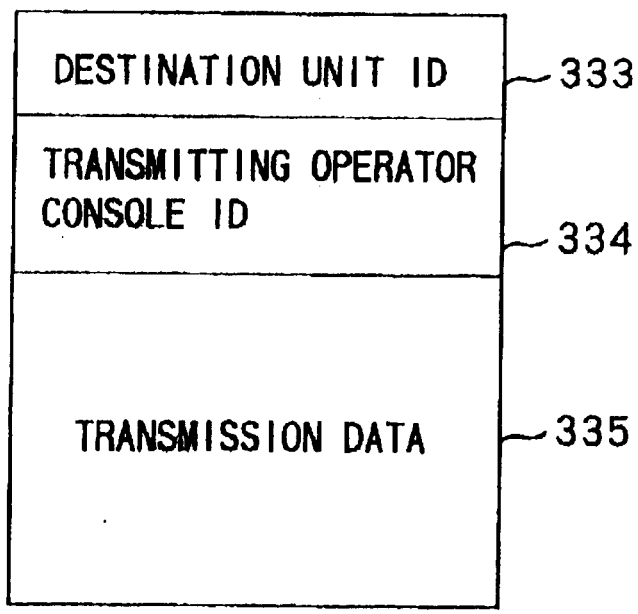
FIG. 83 is a view of the format of the communication data.
FIG. 84 is a view of an example of a transfer table.

The transfer table, as shown in FIG. 84, stores the operator consoles assigned for the units by operator console identifiers. The communication data here includes the destination unit identifier, but this is not transferred on but is compared with the content of the transfer table.

At step S353, it is judged if the transmitting operator console identifier S is assigned to a unit of the identifier U. If it has been assigned, the routine proceeds to step 355. If not, the routine proceeds to step S354.

At step S354, the transmitting operator console identifier S has not been assigned to a unit of the identifier U, so the communication is aborted and the processing ended.

At step S355, the transmitting operator console identifier S has been assigned to a unit of the identifier U, so the communication data is transferred to the unit of the identifier U.

For example, when the transmitting operator console identifier S is "A" and the identifier U of the unit is "1" at step S353, there is a match in the assignments in the transfer table of FIG. 84, so the received data is transferred to the unit 102 (unit 1).

If the transmitting operator console identifier S is "A" and the identifier U is "3" at step S353, there is no match in the assignments in the transfer table of FIG. 84, so the received data is not transferred and is discarded as it is.

According to the embodiment explained above, control from an operator console other than an assigned operator console becomes impossible. Even if an operator console is additionally connected after assignments are determined, units cannot be controlled from that operator console.

Further, the present embodiment can be applied in almost the same manner for the configuration of FIG. 71.

Note that to realize the effects of the present embodiment, the following other configurations are also possible.

That is, an identifier of the communicating (that is, assigned) operator console may be stored in advance in each unit. The units and the operator consoles may also be connected through a network.

When there is a transmission from an operator console to a unit, the receiving unit investigates if the transmitting operator console matches a pre-stored operator console. If matching, it then processes the received data. If not matching, it discards the received data without processing it.

Several identifiers of operator consoles may be stored in advance in each unit. In this case, the unite investigates if the transmitting console matches one of these.

Next, an explanation will be given of a video processing system comprising a plurality of video signal processing apparatuses.

20th Embodiment

Figure 85:
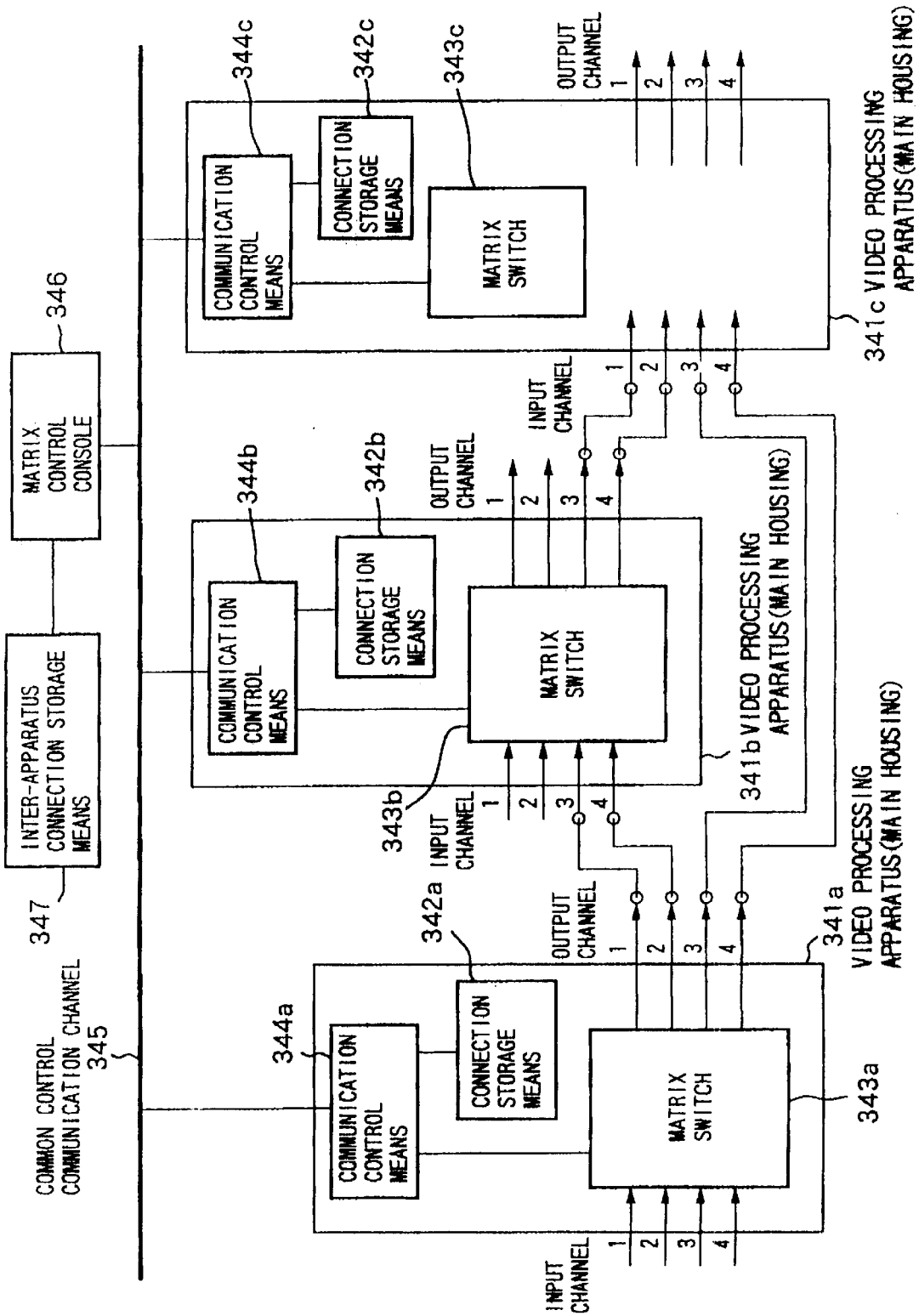
FIG. 85 is a schematic view of the characterizing portion of a 20th embodiment.

FIG. 85 is a view of the characterizing portion of a 20th embodiment.

According to the 20th embodiment, provision is made of a plurality of video signal processing apparatuses 341a, 341b, and 341c. These are provided with connection storage means 342a, 342b, and 342c, matrix switches 343a, 343b, and 343c, and communication control means 344a, 344b, and 344c. The video signal processing apparatuses 341a, 341b, and 341c are connected with each other by a common control communication channel 345. The common control communication channel 345 has connected to it a matrix control console 346. The matrix control console 346 has connected to it an inter-apparatus connection storage means 347.

The inter-apparatus connection storage means 347 stores the connections among the video signal processing apparatuses 341a, 341b, and 341c.

The matrix control console 346 controls the matrix switches 343a, 343b, and 343c of the video signal processing apparatuses 341a, 341b, and 341c. The stored information of the inter-apparatus connection storage means 347 is read by the matrix control console 346.

The connection storage means 342a, 342b, and 342c of the video signal processing apparatuses 341a, 341b, and 341c store the objects connected to the inputs and outputs of the matrix switches 343a, 343b, and 343c. The objects are the inputs and outputs of the units in the video signal processing apparatuses and the input channels and output channels. The communication control means 344a, 344b, and 344c form connection ports to the common control communication channel 345.

In the above configuration, the video signal processing apparatuses 341a, 341b, and 341c are assumed to be assigned apparatus numbers. Here, the video signal processing apparatus 341a is assigned the apparatus number "1", the video signal processing apparatus 341b the apparatus number "2", and the video signal processing apparatus 341c the apparatus number "3".

In the example of FIG. 85, there are several connections between the output channels of a video signal processing apparatus and the input channels of another video signal processing apparatus.

By configuring the system in this way, more complicated processing of video becomes possible than with processing by a single video signal processing apparatus. Further, by moving the video signal processing apparatuses to separate locations for separate use or combining them for use together as in FIG. 85, it becomes possible to eliminate the cost of preparing surplus apparatuses and realize various systems.

One object of the present invention is to improve the operability of such a system. It enables the different video signal processing apparatuses to be centrally controlled rather than separately controlled.

The matrix control console 346 refers to the stored information in the inter-apparatus connection storage means 347 and provides control operational functions based on the paths of the video as a whole resulting from control of the matrix switches. The matrix control console is provided with the functions of a GUI display and operational input.

The output channels "1" and "2" of the video signal processing apparatus 341a are connected to the input channels "3" and "4" of the video signal processing apparatus 341b. Further, the output channels "3" and "4" of the video signal processing apparatus 341a are connected to the input channels "3" and "4" of the video signal processing apparatus 341c. The output channels "3" and "4" of the video signal processing apparatus 341b are connected to the input channels "1" and "2" of the video signal processing apparatus 341c. The information on these connections is stored in the inter-apparatus connection storage means 347.

Figures 86, 87:
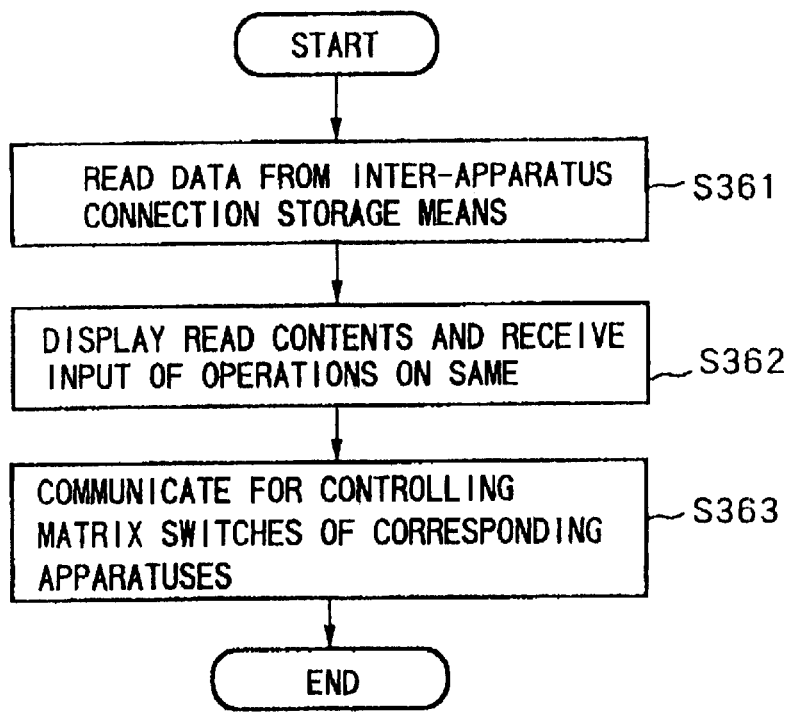
FIG. 86 is a view of an example of stored information in an inter-apparatus connection storage means.
FIG. 87 is a flow chart illustrating the operation of a matrix control console.

FIG. 86 is a view of an example of the stored information of the inter-apparatus connection storage means 347.

The inter-apparatus connection storage means 347 stores information on the connections among video signal processing apparatuses in a tabular form as illustrated. In the table, each row shows one connection. The table provides at the left the information on the video signal processing apparatus of the source of the video and its output channel, while the table provides at the right information on the video signal processing apparatus of the destination of the video signal (receiving side) and its input channel.

The example of the stored information of FIG. 86 shows the example of connections of FIG. 85.

FIG. 87 is a flow chart explaining the operation of the matrix control console 346.

At step S361, the matrix control console 346 reads the inter-apparatus connections from the inter-apparatus connection storage means 347.

At step S362, the information read at step S361 is used to display a GUI screen for receiving operational input for controlling the matrix switches of the video signal processing apparatuses. The operational inputs for the same are then received.

At step S363, the apparatuses concerned are communicated with for controlling their matrix switches in accordance with the operational inputs. This communication is performed with the video signal processing apparatuses concerned through the common control communication channel 345.

Figure 88:
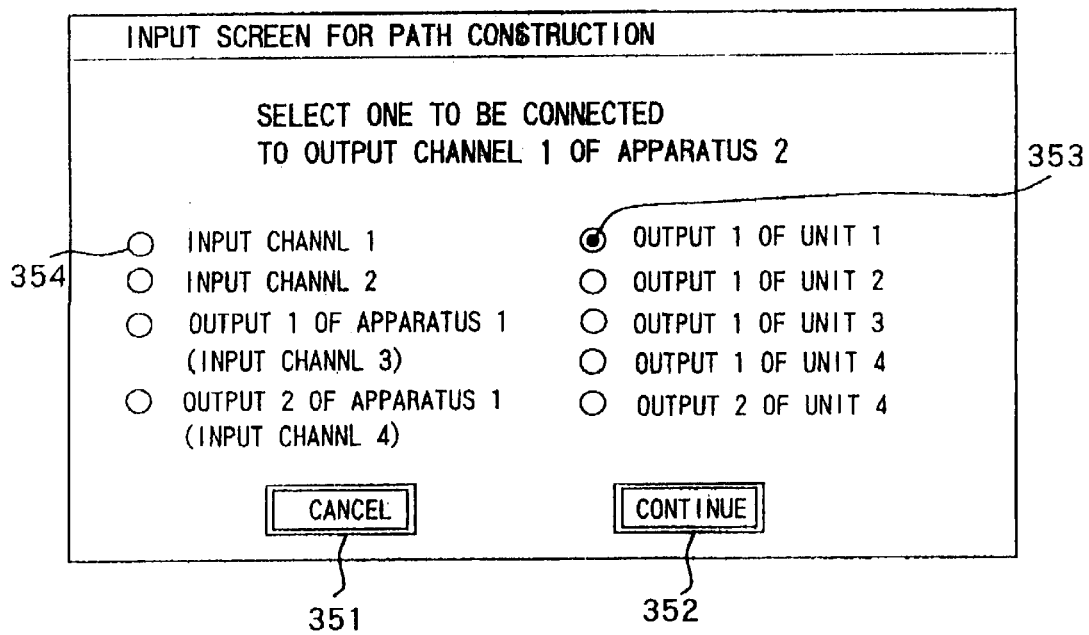
FIG. 88 is a view of an example of a GUI screen for input operation.

FIG. 88 is a view of an example of an operational input GUI screen.

The screen illustrated in FIG. 88 is provided by referring to the inter-apparatus connection storage means 347. The screen displays "SELECT ONE TO BE CONNECTED TO OUTPUT CHANNEL 1 OF APPARATUS 2". The screen shows input of control for the matrix switch 343b of the video signal processing apparatus 341 of the apparatus number "2". That is, the video source to the output channel 1 of the video signal processing apparatus 341b is selected.

This screen is provided with a cancel button 351 and a continue button 352. These are GUI buttons for inputting a cancel or continue command for the processing.

Further, reference numerals 353 and 354 show radio buttons. These are designed so that only one of them may be selected at any one time. The radio buttons 353 and 354 correspond to the video sources which can be used by the video signal processing apparatus 341b, so enable selection of one of the outputs of the internal units or an input channel of the video signal processing apparatus 341b. In the illustrated example, the radio button 353 for "UNIT OUTPUT 1" is selected.

Here, as will be understood from FIG. 85 or FIG. 86, the input channels "3" and "4" of the video signal processing apparatus 341b are connected to the output channels "1" and "2" of the video signal processing apparatus 341a. This information is stored in the inter-apparatus connection storage means 347 in the format as shown in FIG. 86.

The matrix control console 346 uses this information to display the output channels "1" and "2" of the video signal processing apparatus 341a (apparatus number "1") on the display screen of FIG. 88 instead of (or together with) the display of the input channels "3" and "4".

When the operator selects "OUTPUT 2 of APPARATUS 1" in the GUI of FIG. 88, the matrix switch 343b is controlled to "CONNECT INPUT CHANNEL 4 TO OUTPUT CHANNEL 1".

The above processing for operational input is performed at the output sides of the matrix switches. The intersections are set in the connection storage means.

According to this embodiment, as explained above, the operator can confirm the connections among the video signal processing apparatuses and control the matrix switches of the video signal processing apparatuses.

Figure 89:
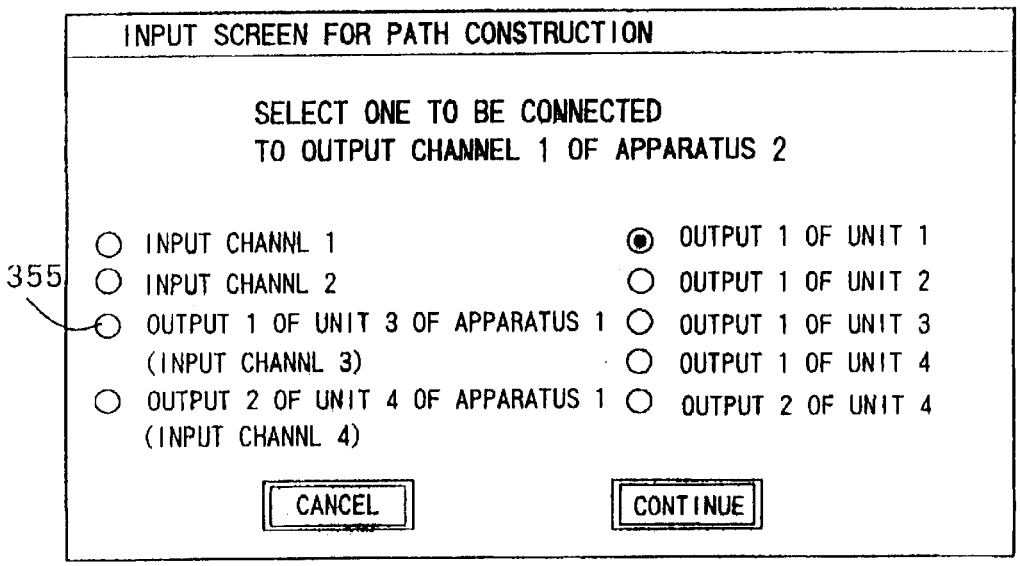
FIG. 89 is a view of an example of a modification of the screen for input operation.

FIG. 89 is a view of a modification of the operational input screen.

When displaying this operational input screen, the matrix control console 346 acquires the content of the connection storage means 342a for use for the display.

The radio button 354 of FIG. 88 is given the explanatory text "OUTPUT 1 OF APPARATUS 1". The matrix control console 346 acquires the destination to which the "OUTPUT CHANNEL 1 OF APPARATUS 1" is already connected. Here, this is assumed to the "OUTPUT 1 OF UNIT 3 IN APPARATUS 1". This is displayed as the explanatory text of the radio button 355.

In the same way, for "OUTPUT 2 OF APPARATUS 1", in FIG. 89, "OUTPUT 2 OF UNIT 4 OF APPARATUS 1" is displayed.

In the operational input screen explained above, the example was shown of designating settings from the output sides of the matrix switches, but the invention is not limited to this. It is also possible to use a user interface which designates paths from the input sides.

Further, it is also possible to simultaneously display several screens such as FIG. 88 to create an environment enabling the paths of the system as a whole to be understood more easily.

Further, it is possible to provide a more graphical input screen and connect paths by dragging on them with a pointing device. For example, it is possible to show the display shown in FIG. 32 together with connections of a plurality of video processing means and input connections through intersections of the matrix switches by a pointing device.

Further, in the example of FIG. 85, the case was shown of a single matrix control console 346 in the system, but it is also possible to provide a plurality of them to enable operation of the matrix switches from several locations.

The display obtained by referring to the inter-apparatus connection storage means 347 is not limited to only the case of operational input. It is also possible to provide various types of displays constantly or as needed for the purpose of provision of information to the operator.

Information may be written into the inter-apparatus connection storage means 347 by manual input by the operator when working to connect the video signal processing apparatuses.

Preferably, by designing the system so as to control all of the video signal processing apparatuses from the matrix control console etc., make a test signal be output from only a certain output channel of a certain video signal processing apparatus, and detect the reception of the signal at the input channels of all of the video signal processing apparatuses, it is possible to detect the connections among the video signal processing apparatuses automatically. If this operation is repeated for all of the output channels of all of the video signal processing apparatuses, it is possible to detect all of the connections. The results may be collected at the matrix control console and written into the inter-apparatus connection storage means 347.

The inter-apparatus connection storage means 347 does not have to store information from the startup of the system. It is also possible to write the connection information of the video signal processing apparatuses first when that information is needed at the matrix control console. The present invention can be realized and a central control environment for the matrix switches of a plurality of video signal processing apparatuses constructed even if configuring the inter-apparatus connection storage means 347 for temporary storage.

In the above explanation, the case of providing the matrix control console with a GUI was illustrated, but it may also be configured without a GUI. It is also possible to realize the invention so long as there are labeled areas in addition to switches on the console.

As an alternative to the connection storage means, it is also possible to provide a means for investigating the units connected to the inputs of the matrix switch upon request using a signal line connected to other than the video signal and answering back with the results.

21st Embodiment

Figure 90:
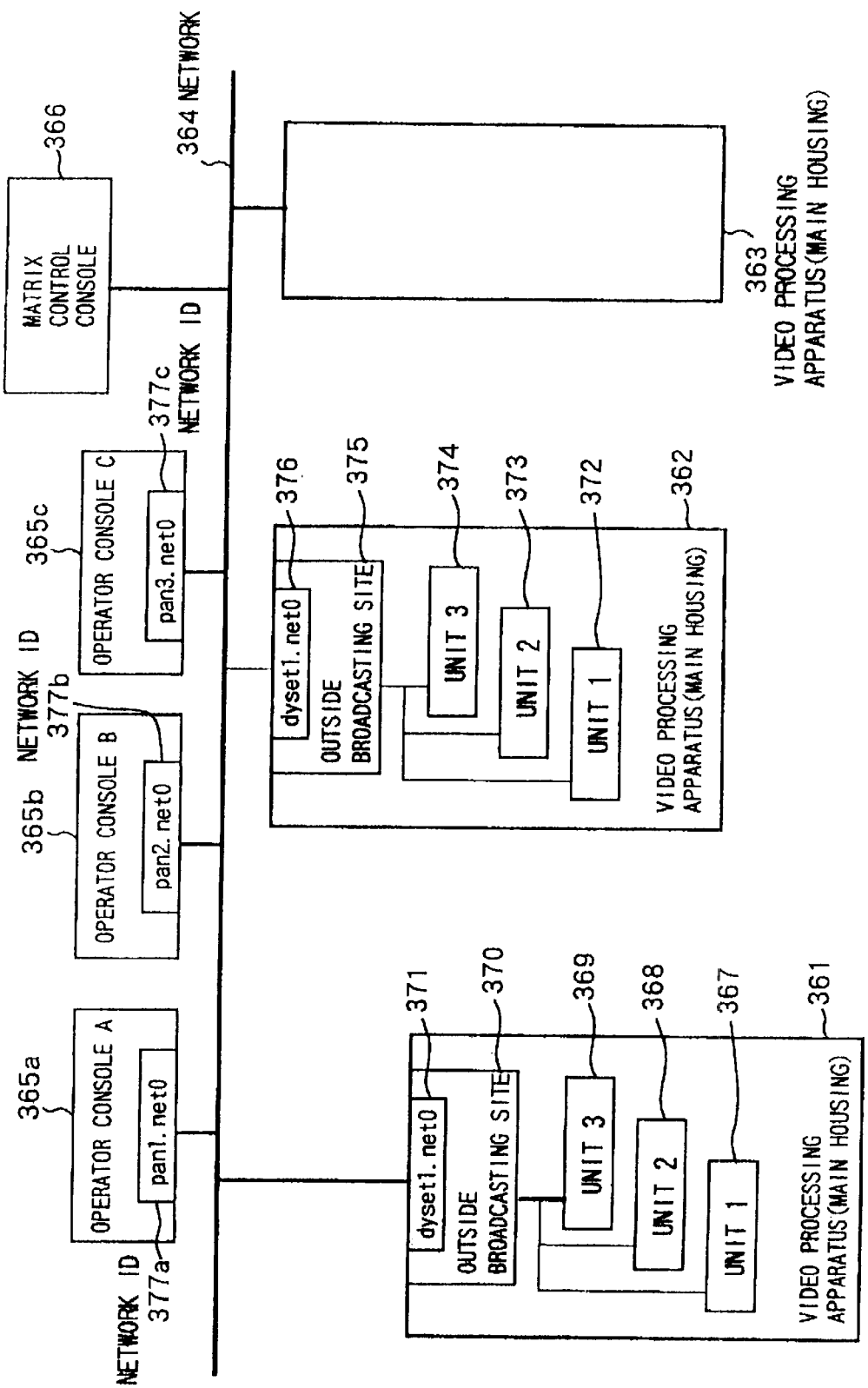
FIG. 90 is a schematic view of the characterizing portion of a 21st embodiment.

FIG. 90 is a view of the characterizing portion of a 21st embodiment.

In the 21st embodiment, the video signal processing apparatuses 361, 362, and 363 are connected to each other through a network 364. Further, the network 364 has connected to it a plurality of operator consoles 365a, 365b, and 365c and a matrix control console 366.

The video signal processing apparatus 361 is provided with a plurality of units 367, 368, and 369 and a relay unit 370. The relay unit 370 is given a network identifier 371 for identifying the video signal processing apparatus 361 on the network 364. The video signal processing apparatus 362 is provided with a plurality of units 372, 373, and 374 and a relay unit 375. The relay unit 375 is given a network identifier 376 for identifying the video signal processing apparatus 362. The video signal processing apparatus 363 has a similar configuration.

The units of the video signal processing apparatuses 361, 362, and 363 are given identifiers enabling them to be specified in the video signal processing apparatuses to which they belong. Here, the numbers "1", "2", and "3" are used as identifiers.

The relay units of the video signal processing apparatuses 361, 362, and 363 are connected to the network 364 and relay connections to the insides of the video signal processing apparatuses.

The matrix control console 366 controls the matrix switches of the video signal processing apparatuses 361, 362, and 363.

The operator consoles 365a, 365b, and 365c are given network identifiers 377a, 377b, and 377c. The operator consoles provide operational functions for the specified units of the specified video signal processing apparatuses. To specify them, the network identifier of the video signal processing apparatus and the identifier of the unit concerned in the same are input. The network identifiers of the video signal processing apparatuses and the identifiers of the units concerned in the same are stored in the operator consoles.

Figure 91:
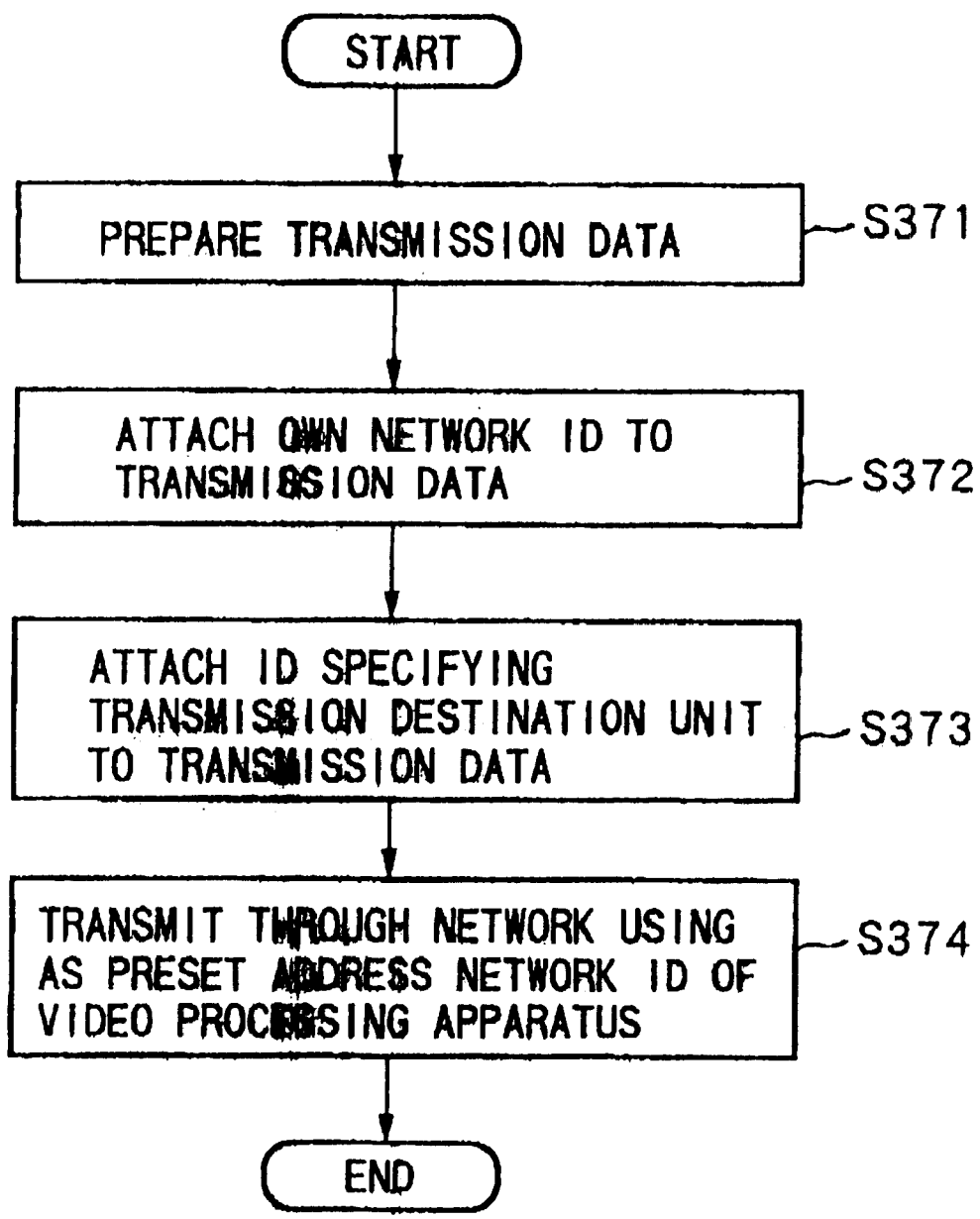
FIG. 91 is a flow chart of the operation of transmitting to a unit of a video signal processing apparatus from a operator console.

FIG. 91 is a flow chart of the operation for transmission from an operator console to a unit of a video signal processing apparatus.

At step S371, the transmission data is prepared.

At step S372, the network identifier of the operator console itself is added to the transmission data.

At step S373, the unit identifier specifying the transmission destination unit is added to the transmission data.

At step S374, the transmission data given the network identifier and the unit identifier is transmitted through the network 364 using as an address the preset network identifier of the video signal processing apparatus of the transmission destination.

According to this embodiment, in a system comprised of a plurality of video signal processing apparatuses connected together, it becomes possible to obtain a flexible system configuration enabling the combination of assignments of the operator consoles and the video signal processing apparatuses to be freely changed.

By configuring the system in this way, more complicated processing of video becomes possible than with processing by a single video signal processing apparatus. Further, by moving the video signal processing apparatuses to separate locations for separate use or combining them for use together, it becomes possible to eliminate the cost of preparing extra apparatuses and realize various systems.

The operator consoles are not fixed exclusively for any specific video signal processing apparatuses, so a user-friendly environment can be constructed. Since the operator consoles are connected to the network, there is no need for a large number of cables. The consoles may be freely placed physically and can communicate with all of the video signal processing apparatuses.

22nd Embodiment

Figure 92:
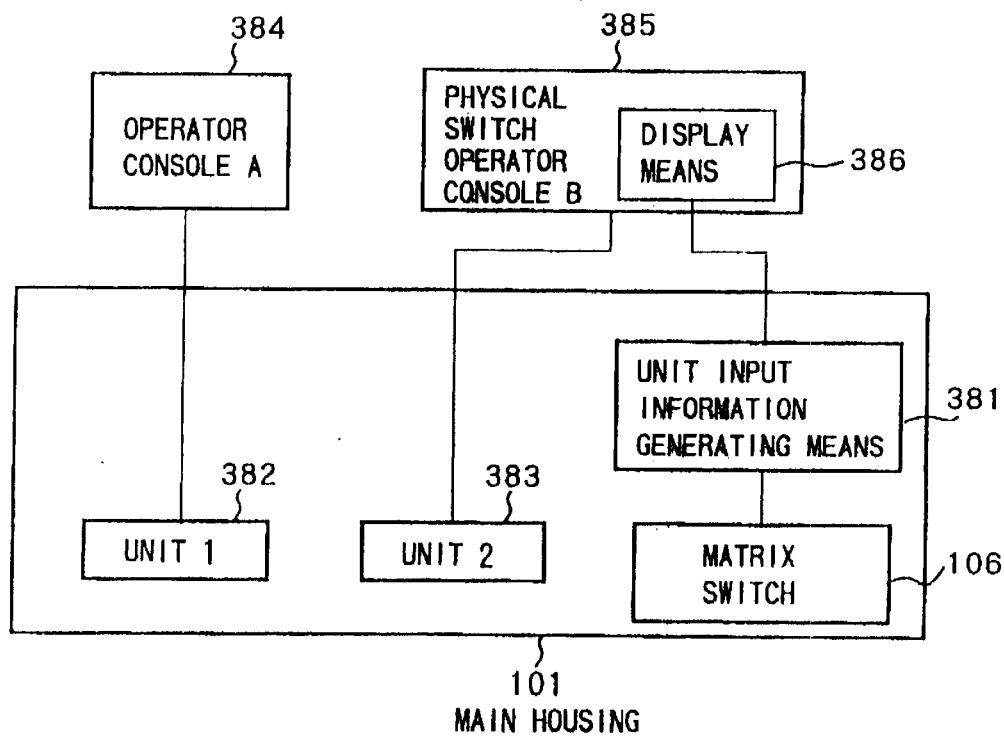
FIG. 92 is a schematic view of the characterizing portion of a 22nd embodiment.

FIG. 92 is a view of the characterizing portion of a 22nd embodiment.

According to the 22nd embodiment, the main housing 101 contains a unit input information generating means 381 and units 382 and 383. The unit input information generating means 381 generates information of the source of the video for input to the units from the matrix switch 106.

The unit 382 is connected to an operator console 384. The operator console 384 provides operational functions of the unit by a GUI. The unit 383 is connected to a physical switch operator console 385. The physical switch operator console 385 has a surface on which pushbutton switches etc. are arranged. Further, the physical switch operator console 385 has a display means 386 for displaying information obtained from the unit input information generating means 381. This display means 386 is arranged on the surface of the physical switch operator console 385. Here, the unit 383 is assumed to have a plurality of inputs.

Figure 93:
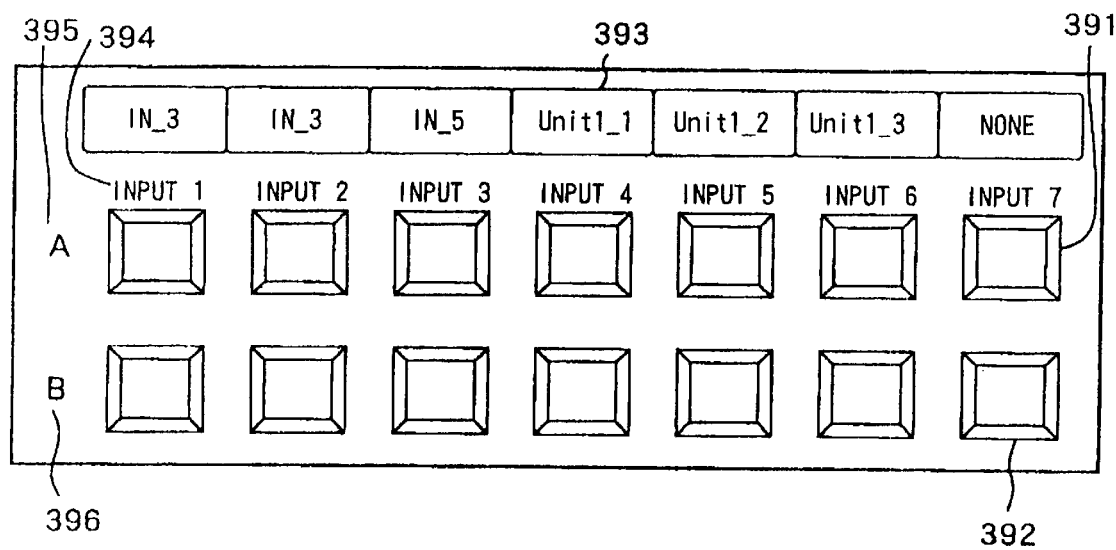
FIG. 93 is a view of an example of the surface of a physical switch operator console.

FIG. 93 is a view of the surface of the physical switch operator console 385.

The surface of the physical switch operator console 385 is provided with input selection use pushbutton switches 391 and 392 arranged in two rows and a display screen 393 of the display means 386.

Labels 394, 395, and 396 are printed on the surface of the physical switch operator console 385 corresponding to the pushbutton switches 391 and 392. The labels 394 show the inputs of the units being operated. The corresponding inputs are selected by the pushbutton switches under them. The labels 395 and 396 show the internal buses of in the units being operated.

Here, the unit being operated, that is, the unit 383 in FIG. 92, is assumed to processing video between the internal bus A and internal bus B to generate output. The input supplied to the internal bus A or the internal bus B is selected by the pushbutton switches 391 and 392.

The display screen 393 of the display means 386 displays information relating to the sources of input. The information is generated by the unit input information generating means 381 based on the settings of the matrix switch 106.

Figures 94, 95:
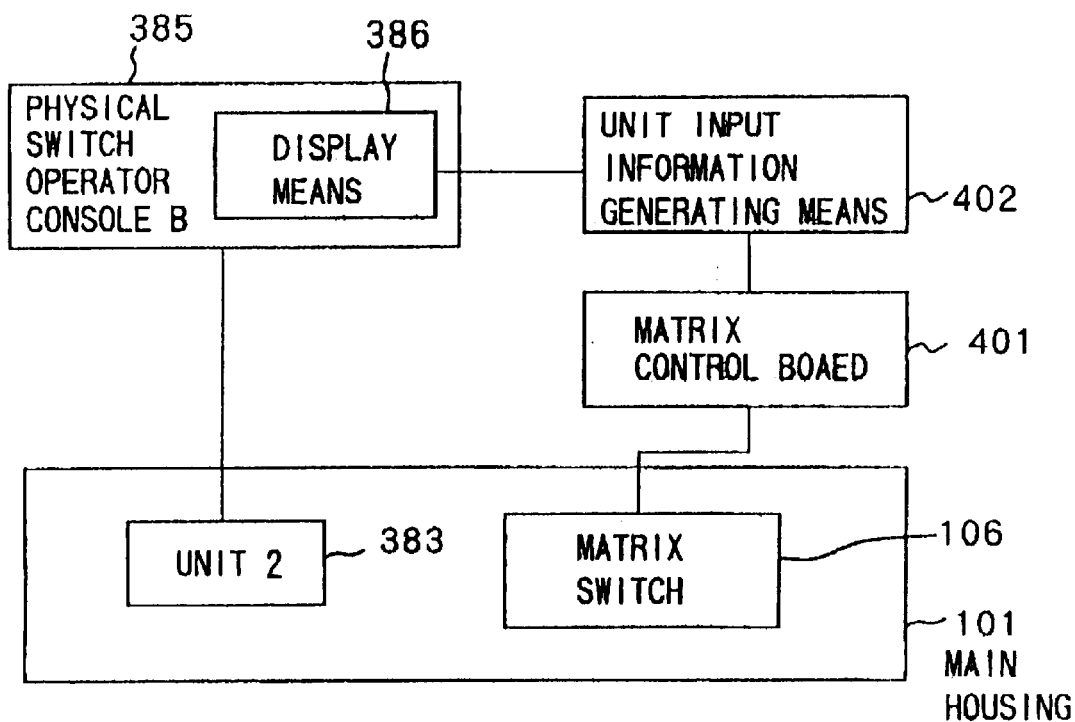
FIG. 94 is a view showing the information transmitted from a unit input information generating means.
FIG. 95 is a schematic view of the characterizing portion of a modification of the 22nd embodiment.

FIG. 94 is a view of an example of the information transmitted from the unit input information generating means 381.

The unit input information generating means 381 generates pairs of numbers of inputs and character strings relating to their sources for the unit concerned as in the illustrated table and transmits the same to the display means 386 of the physical switch operator console 385.

The operator operates the console while viewing the displayed information and thereby can confirm the source of the video connected to the input of the unit and perform operations on it.

The information is transmitted from the unit input information generating means 381 to the display means 386 at the time of startup by powering up the apparatus, at the time of connection of a transmission channel, at the changing the settings of the matrix switch 106, etc.

The physical switch operator console 385 does not necessarily have to be used at all times. When starting it up for use according to need, it is possible to request information from the unit input information generating means 381 at the time of startup and obtain information by its response.

The physical switch operator console 385 is not limited to use for operating any specific plurality of input units. When there are a plurality of input units able to be operated, it is also possible to use the console for any one or more of the same.

Further, it is also possible to provide a plurality of physical switch operator consoles in the system and transmit information from the unit input information generating means to them.

FIG. 95 is a view of the characterizing portion of a modification of the 22nd embodiment.

According to this modification, the matrix control console 401 is configured to control the matrix switch 106 and to obtain the state of the settings of the matrix switch 106.

The unit input information generating means 402 obtains the state of the settings of the matrix switch 106 from the matrix control console 401, generates information on the source of the video input to each unit, and transmits it to the display means 386 of the physical switch operator console 385.

The rest of the components are similar to those shown in FIG. 92.

By supplying information of the input to the unit by the matrix switch 106 to the display means 386 for display in this way, it is possible to make the physical switch operator console 385 operate more effectively and improve its operability.

In the above explanation, the case of handling a video signal was shown, but the same effect can be obtained by a similar configuration for the case where an audio signal is superposed on the video signal as well. Due to this, it is possible to realize a video and audio processing apparatus with units which can process both a video signal and audio signal. Further, the same effect can be obtained by a similar configuration for an apparatus handling only an audio signal.

Next, the hardware configuration of an embodiment of the present invention will be shown. The embodiment explained above is realized by a program on a board computer in the hardware shown below.

FIG. 96 is a view of the hardware configuration of an embodiment of a video signal processing apparatus to which the present invention is applied.

According to the illustrated hardware configuration of the video processing system, the Ethernet 411 transmits control communications between the apparatuses of the system. An operator console 412 connected to the Ethernet 411, as illustrated, is constructed by an x86 single board computer, a floppy disk drive, a PCMCIA (Personal Computer Memory Card International Association) slot, a touch panel LCD (liquid crystal display) display panel, a mouse, etc.

An operator console 413 connected to the Ethernet 411 is the same in internal configuration as the operator console 412. A physical switch operator console 414 is connected to it.

A display device 415 connected to the Ethernet 411 includes a control use board computer and a character display LED (light emitting diode) display. Information received from the Ethernet 411 is displayed by the LED.

A video signal processing apparatus 416 is also connected to the Ethernet 411. The video signal processing apparatus 416 is housed in a housing 417. The housing 417 is of a 6U Compact PCI size and houses several boards. The boards housed in the housing 417 include, as illustrated, a board computer, matrix switch, combining processing unit, digital processing unit, synchronization adjustment unit, disk storage device, format conversion unit, etc. These board computer, matrix switch, and other units are connected with each other by an internal network 418. An Ethernet is used for the internal network 418. The matrix switch is connected to the different units by a video signal channel 419. The video signal processing apparatus 416 also has connected to it a plurality of output channels 420 and a plurality of input channels 421.

Further, video signal processing apparatuses 422 and 423 are connected to the Ethernet 411. These have similar configurations to the video signal processing apparatus 416.

Each board computer is provided with a CPU, ROM, RAM, various inputs and outputs, network interface, timer, etc.

The operator console 412 has operational functions of the internal units of one of the video signal processing apparatuses and operational functions of the matrix switch. The operator console 412 uses an X-Window system as the GUI to provide various operation screens, but of course it is also possible to use other GUI systems.

The GUI can be operated by the touch panel functions provided by the LCD and can be operated supplementarily by mouse as well.

The operator console 412 is provided with a volatile memory and nonvolatile memory on the internal x86 single board computer and stores various settings etc. there. Due to this, it becomes possible to hold various setting data even after power is cut. Further, the various settings stored in the memories can be stored in a disk medium of the DOS format by the floppy disk drive. Further, it is possible to insert a storage medium into the PCMCIA slot and store various settings in it.

The operator console 413 is provided with an interface compatible with the communications interface of a physical switch operator console 414.

The physical switch operator console 414 acquires the necessary information for display from the operator console 413 and communicates with the video signal processing apparatus through the operator console 413.

Any number of operator consoles and display devices may be provided so long as they share the network of the Ethernet 411.

In the video signal processing apparatus 416, the internal board computer is connected to an outside and inside network, controls communications with the outside, and controls the internal components. Further, the board computer relays communications between the inside and outside. The board computer is provided with a volatile memory and a nonvolatile memory which store various settings etc.

Note that the Ethernet 411 and the internal network 418 may be replaced by communication channels etc. of the IEEE1394.

The units in the video signal processing apparatus 416 may also include ones which handle video signals of different signal formats. When there are units handling different signal formats, the units of different signal formats are controlled so as not to be connected with each other.

The program operating on the operator console is usually stored in the ROM of the board computer, but it is also possible to partially rewrite this electrically. It is possible to rewrite the program from a medium loaded in the floppy disk drive or PCMCIA slot.

Preferably, the program of the board computer of the video signal processing apparatus is rewritten from a medium loaded in the floppy disk drive or PCMCIA slot of the operator console. This enables construction of a system superior in ease of maintenance, improvement of function, modifiability, and customization to the operating environment.

Summarizing the effects of the present invention, as described above, in the present invention, there is provided a video signal processing apparatus configured so that the setting of the intersections of a matrix switch is stored and is able to be reproduced. Therefore, an operator no longer has to repeat an operation for setting each and every intersection and can set a plurality of intersections into the desired states by just reproducing the stored settings.

In addition, even when a plurality of settings are used repeatedly, by making the storage means store the plurality of settings, the desired settings can be obtained by just instructing the reproducing means to select the stored settings.

In addition, it is possible to store and reproduce the settings for only a part of the intersections and therefore reset part of the intersections to previous states without changing the settings of other intersections.

If a nonvolatile memory or hard disk drive is used as the storage means, even after the power is once turned off, the settings stored can be reproduced when the power of the device is turned on again to operate the apparatus.

In addition, according to the present invention, there is provided a video signal processing apparatus configured so that the contents of a setting means are stored using files.

Therefore, the settings can be stored in an inexpensive nonvolatile medium, and the settings can be reproduced even after it is turned off once.

Even when the video processing apparatus itself is changed for repair etc., if the storage medium storing the settings is used in the new video apparatus, the same settings as before the change can be used.

In addition, according to the present invention, there is provided a video signal processing apparatus configured so that assignments of operator consoles are stored. Therefore, although each video signal processing unit is operated by an operator console, the correspondence between them is not fixed and can be changed freely by the assignment managing means.

Since assignments of operator consoles can be stored and reproduced, the work of re-assigning operator consoles can be eliminated, and it is possible to quickly deal with the situation.

In addition, according to the present invention, there is provided a video signal processing apparatus configured so that each of the operator consoles controlling a video signal processing unit is set to correspond to an output channel. Therefore, the establishment of the correspondence of an operator console to each output channel can be achieved quickly, and a more user-friendly environment is able to be provided.

In addition, according to the present invention, there is provided a video signal processing apparatus configured so that the correspondence between an output channel and an operator console is stored. Therefore, same operational environment can be reproduced easily at a later time, and the operability can be raised.

In addition, by making the correspondence storing means store a plurality of correspondences, even when a plurality of correspondences are used repeatedly, the desired correspondence can be obtained by selecting and specifying the stored information.

In addition, according to the present invention, there is provided a video signal processing apparatus configured so that the control relevant to a path is shared by a number of operator consoles. Therefore, the path setting can be made quickly. Owing to the assignment of operator consoles independent path-by-path, it is possible to make a number of operator consoles operate more effectively for a large number of control objects relevant to a path.

In addition, according to the present invention, there is provided a video signal processing apparatus configured so that operator consoles are separately assigned to each of the functions of a video signal processing unit that has a number of functions. Therefore, an environment capable of identifying functions and superior in operability can be realized. Further, by storing and reproducing the assignments, the work of repeat assignment can be eliminated.

In addition, according to the present invention, there is provided a video signal processing apparatus configured so that a unit connected to a matrix switch and having a unique name can be specified using the name. Therefore, an operational environment can be provided, which does not require operators to have knowledge of the structure of the matrix switch and the connection conditions, and enables easy selection of connection destinations and realization of desired configuration.

In addition, according to the present invention, there is provided a video signal processing apparatus configured so that execution of erroneous settings is refused, or a warning is given against the erroneous settings. Therefore, execution of erroneous settings on the matrix switch is prevented, and an operator is given a chance to reset the setting, so an apparatus superior in operability and safety can be achieved.

In addition, according to the present invention, there is provided a video signal processing apparatus configured so that units mounted on a slot having a check means are identified, and a warning is given against erroneous settings. Therefore, since the units are removable and changeable, even for apparatuses having various unit configurations, execution of erroneous settings is prevented at the time of operation, so an apparatus superior in operability and safety can be achieved.

In addition, according to the present invention, there is provided a video signal processing apparatus configured so that keys are provided for a matrix control console. Therefore, even though a system is operated by a number of persons, and each of them operates the operator consoles he is responsible for, a person who does not have a key cannot operate the matrix switch, therefore enabling prevention of any intended or careless operations from causing serious adverse influences on the system.

In addition, according to the present invention, there is provided a video signal processing apparatus configured so that a matrix switch can be controlled by operator consoles. Therefore, it is not necessary to provide a matrix control console in addition to the operator consoles, and an operational environment advantageous for use of space can be achieved.

In addition, according to the present invention, there is provided a video signal processing apparatus configured so that the configuration information representing settings of a matrix switch is displayed on an operator console. Therefore, operators are able to know the effects of operational units on an output, hence the operability is raised.

In addition, according to the present invention, there is provided a video signal processing apparatus configured so that information of a processing path is output or superposed to or on the output video itself, therefore, it becomes possible for an operator to understand the path information without mistake.

In addition, because information is output only when it is necessary, an environment can be provided in which information is displayed without a monitor being provided separately.

In addition, according to the present invention, there is provided a video signal processing apparatus configured so that path information is displayed on the display means through the communication channel. Therefore, even at locations distant from a video processing apparatus or an operator console thereof, information of the source of the present output video and processing can be obtained.

In addition, according to the present invention, there is provided a video signal processing apparatus configured so that operator consoles are connected into a network. Therefore, there is no longer a need for laying a communication cable from the main housing to each of the operator consoles. By inserting the operator consoles into a network, it is possible to provide a plurality of operator consoles without the need for extra wiring. Further, in such a case, it is possible to freely set the assignments of the operator consoles to the units and possible to process signals without crosstalk.

In addition, according to the present invention, there is provided a video signal processing apparatus configured so that a number of operator consoles each are assigned to at least one unit. Therefore, control is not enabled for operator consoles that are not assigned. Even after an assignment is decided, and an operator console is connected additionally, operations on units from that operator console is not enabled. Accordingly, operations from incorrect connections or a preset operator console are refused, and it becomes possible to prevent any adverse influences on the system.

In addition, according to the present invention, there is provided a video processing system comprising a plurality of video processing apparatuses and configured so that control communication can be performed between a single operator console and the matrix switches of all video signal processing apparatuses. Therefore, in a system comprised of a plurality of video signal processing apparatuses connected together, an operator can confirm the connections among the video signal processing apparatuses and control the matrix switches of the video signal processing apparatuses.

By configuring such a system, more complicated processing of video becomes possible than with processing by a single video signal processing apparatus. Further, by moving the video signal processing apparatuses to separate locations for separate use or combining them for use together, it becomes possible to eliminate the cost of preparing surplus apparatuses and realize various systems.

In addition, according to the present invention, there is provided a video processing system comprising a plurality of video processing apparatuses and configured so that operator consoles are not fixed exclusively for any specific video signal processing apparatuses, and can communicate with video signal processing units of all video signal processing apparatuses.

Therefore, in a system comprised of a plurality of video signal processing apparatuses connected together, it becomes possible to obtain a flexible system configuration enabling the combination of assignments of the operator consoles and units of the video signal processing apparatuses to be freely changed.

And according to the present invention, there is provided a video processing system configured so that a physical switch operator console is applicable. Therefore, by supplying information of the input to the unit using the matrix switch to the display means on the physical switch operator console, it is possible to make the physical switch operator console operate more effectively and improve its operability.

What is claimed is:

1. A video signal processing apparatus comprising:
a plurality of video signal processing units;
a plurality of video signal input channels;
a plurality of video signal output channels;
a matrix switch, having at least four input channels, at least two of which are connected to an output of said plurality of video signal processing units and at least one of which is connected to said plurality of video signal input channels, and having at least four output channels, at least two of which are connected to an input of said plurality of video signal processing units and at least one of which is connected to said plurality of video signal output channels;
wherein two of said at least four video signal input channels input a matrixed input to said matrix switch from said plurality of video signal processing units in a parallel configuration and two of said at least four video signal output channels output a matrixed output from said matrix switch to said plurality of video signal processing units in a parallel configuration; and
wherein said plurality of video signal processing units perform video signal processing operations before outputting said matrixed output;
a storage means for storing data indicative of a setting of part or all of the states of intersections of the matrix switch; and an intersection reproducing means for setting the states of the intersections of the matrix switch according to the data stored in the storage means indicative of the settings of part or all of the states of the intersections of the matrix switch.

2. The video signal processing apparatus as set forth in claim 1, further comprising:
an external storage device, said external storage device writing data to and reading data from said storage means, said storage means comprising one or more removable and changeable storage medium, said external storage device assigning one or more identifiers to each of said removable and changeable storage media corresponding to the data indicative of the setting of the states of the intersections of the matrix switch stored thereon.

3. The video signal processing apparatus as set forth in claim 1, further comprising:
at least one operator console for operating said plurality of video signal processing units;
an assignment managing means for assigning each of said at least one operator console to said plurality of video signal processing units;
an assignment storage means for storing information of an assignment of said at least one operator console made by the assignment managing means and for enabling reproduction of the assignment of said at least one operator console according to the stored data.

4. The video signal processing apparatus as set forth in claim 1, comprising:
at least one operator console for operating said plurality of video signal processing units;
a specific output related unit discriminating means for discriminating said plurality of video signal processing units from other video signal processing units according to settings of the states of the intersections of said matrix switch, said plurality of video signal processing units being arranged in a path leading to said plurality of video signal output channels; and
an operation correspondence means for establishing correspondence of said at least one operator console to said plurality of video signal output channels;
wherein the operation correspondence means employs the specific output related unit discriminating means to assign a specified said at least one operator console to said plurality of video signal processing units arranged in a path leading to a specified said plurality of video signal output channels.

5. The video signal processing apparatus as set forth in claim 4, further comprising:
a correspondence storage means for storing data of correspondence between said at least one operator console and said plurality of video signal output channels obtained by said operation correspondence means.

6. The video signal processing apparatus as set forth in claim 4, wherein said operation correspondence means establishes correspondence of said at least one operator console to said plurality of video signal output channels and assigns any of the specified said at least one operator console to said plurality of video signal processing units arranged in a path leading to the specified said plurality of video signal output channels.

7. The video signal processing apparatus as set forth in claim 1, further comprising:
at least one operator console for operating said plurality of video signal processing units;

an assignment managing means for assigning each of said at least one operator console to each of a plurality of functions of said plurality of video signal processing units; and an assignment storage means for storing information of an assignment;

wherein the assignment managing means assigns said at least one operator console, stores information of the assignment in the assignment storage means, and reproduces the assignment of said at least one operator console according to data of the assignment storage means.

8. The video signal processing apparatus as set forth in claim 1, further comprising:

a connection storage means for storing and holding the states of the plurality of inputs and outputs of said plurality of video signal processing units, said plurality of video signal input channels, and said plurality of video signal output channels connected to said plurality of input and output channels of said matrix switch; and a matrix control console for displaying identification information of data provided on said plurality of video signal input channels, identification information of data provided on said plurality of video signal output channels, and identification information of data provided on said plurality of video signal processing units, receiving status of the connections with respect to the identification information, and controlling the states of the intersections of the matrix switch.

9. The video signal processing apparatus as set forth in claim 1, further comprising:

a connection storage means for storing and holding the states of the plurality of inputs and outputs of said plurality of video signal processing units, said plurality of video signal input channels, and said plurality of video signal output channels connected to said plurality of input and output channels of said matrix switch; and a check means for checking paths after control operations controlling the matrix switch have been performed, and rejecting control operations and issuing warnings regarding these rejected control operations when conflicts and recurrence would occur in the paths upon performance of these rejected control operations.

10. The video signal processing apparatus as set forth in claim 1, further comprising:

a connection storage means for storing and holding said plurality of video signal input channels, and said plurality of video signal output channels connected to said plurality of input and output channels of said matrix switch; and a check means for checking paths after control operations controlling the matrix switch have been performed, and rejecting control operations and issuing warnings regarding these rejected control operations when conflicts and recurrence would occur in the paths upon performance of these rejected control operations;

a connection means for enabling mounting or dismounting of said plurality of video signal processing units to a housing and electrically connecting said plurality of video signal processing units to the matrix switch by contacts through the housing or directly at the time of mounting;

wherein at the time of checking, the check means identifies said plurality of video signal processing units connected to the connection means and checks the paths using the identified information.

11. The video signal processing apparatus as set forth in claim 1, further comprising:

a matrix control console for controlling the states of the intersections of said matrix switch; and a lock for enabling operation of the matrix control console only when unlocked with a key.

12. The video signal processing apparatus as set forth in claim 1, further comprising:

a matrix control console for controlling the states of the intersections of said matrix switch; and a password input means for enabling operation of the matrix control console only when a correct password is input.

13. The video signal processing apparatus as set forth in claim 1, further comprising:

at least one operator console for operating said plurality of video signal processing units;

an assignment managing means for assigning each of said at least one operator console to said plurality of video signal processing units; and a matrix control means provided at said at least one operator console for controlling the states of the intersections of said matrix switch.

14. The video signal processing apparatus as set forth in claim 1, further comprising:

at least one operator console for operating said plurality of video signal processing units; and a display means provided at said at least one operator console for displaying information on states of the intersections of said matrix switch or on paths as the result thereof.

15. The video signal processing apparatus as set forth in claim 1, further comprising:

a path information generating means for generating information on said plurality of video signal input channels and said plurality of video signal processing units connected to paths leading to each of said plurality of video signal output channels due to said matrix switch; and an information video output means for outputting a video of path information generated by the path information generating means to each of said plurality of video signal output channels in place of each output video or superposed on the output video.

16. The video signal processing apparatus as set forth in claim 1, further comprising:

an information transmitting means for transmitting information on states of intersections of said matrix switch or on paths of the results thereof;

a communication channel; and a display means for receiving and displaying the information transmitted from the information transmitting means via the communication channel.

17. A video signal processing apparatus comprising:

a plurality of video signal processing units;

a plurality of video signal input channels;

a plurality of video signal output channels;

a matrix switch, an input side of which is connected to an output of said plurality of video signal processing units and to said plurality of video signal input channels, and an output side of which is connected to an input of said plurality of video signal processing units and to said plurality of video signal output channels;

wherein two of said video signal input channels input a matrixed input to said matrix switch from said plurality of video signal processing units in a parallel configuration and two of said video signal output channels output a matrixed output from said matrix switch to said plurality of video signal processing units in a parallel configuration; and wherein said plurality of video signal processing units perform video signal processing operations before outputting said matrixed output;

a storage means for storing data of part or all of intersections of the matrix switch;

an intersection reproducing means for setting the intersections of the matrix switch according to the data of the storage means;

at least one operator console each of which has a unique network identifier and adds its own network identifier to control transmission for operating said plurality of video signal processing units;

a network to which said at least one operator console is connected; and an assignment managing means for assigning said at least one operator console to said plurality of video signal processing units and transferring a control transmission arriving via the network from said at least one operator console to said plurality of video signal processing units corresponding to the network identifier.

18. A video signal processing apparatus comprising:

a plurality of video signal processing units;

a plurality of video signal input channels;

a plurality of video signal output channels;

a matrix switch, an input side of which is connected to an output of said plurality of video signal processing units and to said plurality of video signal input channels, and an output side of which is connected to an input of said plurality of video signal processing units and to said plurality of video signal output channels;

wherein two of said video signal input channels input a matrixed input to said matrix switch from said plurality of video signal processing units in a parallel configuration and two of said video signal output channels output a matrixed output from said matrix switch to said plurality of video signal processing units in a parallel configuration; and wherein said plurality of video signal processing units perform video signal processing operations before outputting said matrixed output;

a storage means for storing data of part or all of intersections of the matrix switch;

an intersection reproducing means for setting the intersections of the matrix switch according to the data of the storage means;

at least one operator console each of which has a unique network identifier and adds a unique identifier to said plurality of video signal processing units informed to it and stored in advance and its own network identifier to control transmission for operating said plurality of video signal processing units;

a network to which said at least one operator console and a housing are connected; and an assignment managing means for assigning said at least one operator console to said plurality of video signal processing units and informing the assigned identifier of said plurality of video signal processing units to said at least one operator console.

19. A video signal processing apparatus comprising:

a plurality of video signal processing units;

a plurality of video signal input channels;

a plurality of video signal output channels;

a matrix switch, an input side of which is connected to an output of said plurality of video signal processing units and to said plurality of video signal input channels, and an output side of which is connected to an input of said plurality of video signal processing units and to said plurality of video signal output channels;

wherein two of said video signal input channels input a matrixed input to said matrix switch from said plurality of video signal processing units in a parallel configuration and two of said video signal output channels output a matrixed output from said matrix switch to said plurality of video signal processing units in a parallel configuration; and wherein said plurality of video signal processing units perform video signal processing operations before outputting said matrixed output;

a storage means for storing data of part or all of intersections of the matrix switch;

an intersection reproducing means for setting the intersections of the matrix switch according to the data of the storage means;

at least one operator console each of which has a unique operator console identifier and adds a unique identifier of said plurality of video signal processing units and its own operator console identifier to control transmission for operating said plurality of video signal processing units; and an assignment managing means for assigning said at least one operator console to said plurality of video signal processing units and transferring control transmission to said plurality of video signal processing units only when the operator console identifier from said at least one operator console is that of said at least one operator console assigned to said plurality of video signal processing units.

20. A video processing system comprising:

a plurality of video signal processing apparatuses each comprising a plurality of video signal processing units, housing holding communication channels located between said units, a plurality of video signal input channels, a plurality of video signal output channels, a matrix switch, wherein two of said video signal input channels input a matrixed input to said matrix switch from said plurality of video signal processing units in a parallel configuration and two of said video signal output channels output a matrixed output from said matrix switch to said plurality of video signal processing units in a parallel configuration; and wherein said plurality of video signal processing units perform video signal processing operations before outputting said matrixed output; and a connection storage means for storing and holding information of the states of a plurality of inputs and outputs of the units, of the plurality of video signal input channels and of the plurality of video signal output channels that are connected to a plurality of inputs and outputs of the matrix switch, wherein the status of the plurality of inputs and outputs of said plurality of video signal processing units, said plurality of video signal input channels, and said plurality of video signal output channels are provided to said plurality of input and output channels of the matrix switch;

at least one matrix control console for controlling the states of the intersections of matrix switches of the plurality of video signal processing apparatuses;

a common control communication channel for transmitting control communication of a matrix switch operator console; and an inter-apparatus connection storage means for storing information of the connections among all the plurality of video signal processing apparatuses in operation;

wherein the matrix switch operator console reads data from the inter-apparatus connection storage means and controls the states of the intersections of the matrix switches of all the plurality of video signal processing apparatuses in operation via the common control communication channel so that said plurality of video signal output channels of one video signal processing apparatus and said plurality of video signal input channels of another video signal processing apparatus are connected so that the plurality of video signal processing apparatuses are arranged in a video path and operated together.

21. A video processing system comprising:

a plurality of video signal processing apparatuses each comprising a plurality of video signal processing units having a unique unit identifier, a housing holding communication channel located between the units, a plurality of video signal input channels, a plurality of video signal output channels, and a matrix switch, wherein two of said video signal input channels input a matrixed input to said matrix switch from said plurality of video signal processing units in a parallel configuration and two of said video signal output channels output a matrixed output from said matrix switch to said plurality of video signal processing units in a parallel configuration; and wherein said plurality of video signal processing units perform video signal processing operations before outputting said matrixed output;

wherein a plurality of inputs and outputs of said plurality of video signal processing units, said plurality of video signal input channels, and said plurality of video signal output channels are connected to the matrix switch and wherein there are unique network identifiers for each of said plurality of video signal processing apparatuses;

a storage means for storing data indicative of a setting of part or all of the states of intersections of the matrix switch and said unique identifiers associated with the plurality of input and output channels thereof;

at least one operator console for operating a specified video signal processing unit of a specified video signal processing apparatus each of the specified video signal processing units having a unique network identifier for said at least one operator console; and a network for transmitting control communication of said at least one operator console to the plurality of video signal processing apparatuses.

22. The video signal processing apparatus as set forth in claim 1, further comprising:

a plurality of input units constituting a plurality of video signal processing units and having a plurality of input channels;

a physical switch operator console capable of selecting switches corresponding to the plurality of input channels of the plurality of input units being operated and a display function for displaying information of video sources connected to each input of the plurality of input units of the matrix switch; and a unit input information generating means for generating and transmitting to the physical switch operator console the information of said video sources connected to each input of the plurality of input units based on settings of the matrix switch.

* * * * *